US 12,209,366 B2

(12) United States Patent
Combs et al.

(10) Patent No.: US 12,209,366 B2
(45) Date of Patent: Jan. 28, 2025

(54) RAIL TIE PLATE FLIPPING ASSEMBLY

(71) Applicant: Herzog Railroad Services, Inc., St. Joseph, MO (US)

(72) Inventors: Matthew L. Combs, Agency, MO (US); Jacob P. DiVilbiss, Kansas City, MO (US); Daniel L. Wilcoxson, Savannah, MO (US); Alex Jensen, Fort Worth, TX (US)

(73) Assignee: Herzog Railroad Services, Inc., St. Joseph, MO (US)

( * ) Notice: Subject to any disclaimer, the term of this patent is extended or adjusted under 35 U.S.C. 154(b) by 0 days.

(21) Appl. No.: 18/414,166

(22) Filed: Jan. 16, 2024

(65) Prior Publication Data

US 2024/0150974 A1 May 9, 2024

Related U.S. Application Data

(63) Continuation-in-part of application No. 18/462,131, filed on Sep. 6, 2023.
(Continued)

(51) Int. Cl.
*E01B 29/32* (2006.01)
*B65G 15/30* (2006.01)
*B65G 47/14* (2006.01)

(52) U.S. Cl.
CPC .............. *E01B 29/32* (2013.01); *B65G 15/30* (2013.01); *B65G 47/14* (2013.01)

(58) Field of Classification Search
CPC . E01B 29/00; E01B 29/32; E01B 9/02; E01B 9/40; B65G 15/30; B65G 47/14
See application file for complete search history.

(56) References Cited

U.S. PATENT DOCUMENTS 1,048,748 A    12/1912  Seaman
3,943,858 A     3/1976  Dieringer et al.
(Continued)

FOREIGN PATENT DOCUMENTS

WO    2020006066 A1    1/2020

OTHER PUBLICATIONS

Admitted prior art comprising a still image from a video published on YouTube at youtube.com/watch?v=baxGrANg1WM at least as early as Mar. 26, 2015 by StreamTech Engineering, LLC showing of a singluating conveyor.

*Primary Examiner* — Robert J McCarry, Jr.
(74) *Attorney, Agent, or Firm* — AVEK IP, LLC; Kent R. Erickson

(57) ABSTRACT

A system for orienting and distributing tie plates along a section of railroad track includes a tie plate flipping assembly. The tie plate flipping assembly flips shoulder-side down tie plates into a shoulder-side up orientation while maintaining shoulder-side up tie plates in the shoulder-side up orientation. One embodiment of the tie plate flipping assembly includes a launch conveyor for launching tie plates against a dampening slide spaced apart from the launch conveyor at a spacing which results in shoulder-side down tie plates flipping over while shoulder-side up tie plates remain shoulder-side up. An alternative tie plate flipping assembly advances tie plates on a longitudinal edge through a vertical guide and past a centered wedge which engages a shoulder side surface of the tie plates conveyed past the wedge causing the tie plates to tip outward and onto a bottom surface.

19 Claims, 38 Drawing Sheets

Related U.S. Application Data

(60) Provisional application No. 63/480,076, filed on Jan. 16, 2023, provisional application No. 63/375,131, filed on Sep. 9, 2022.

(56) References Cited

U.S. PATENT DOCUMENTS

| | | |
|---|---|---|
| 4,241,663 A | 12/1980 | Lund et al. |
| 4,280,613 A | 7/1981 | Stewart |
| 4,691,639 A | 9/1987 | Holley |
| 4,727,989 A | 3/1988 | Cotic et al. |
| 4,907,686 A | 3/1990 | Cotic |
| 4,909,375 A | 3/1990 | Cotic et al. |
| 4,942,822 A | 7/1990 | Cotic |
| 4,974,518 A | 12/1990 | Cotic et al. |
| 5,067,412 A | 11/1991 | Theurer et al. |
| 5,275,051 A | 1/1994 | Beer |
| 5,331,899 A | 7/1994 | Holley |
| 5,487,341 A | 1/1996 | Newman et al. |
| 5,655,455 A | 8/1997 | Smith |
| 5,671,679 A | 9/1997 | Straub et al. |
| 5,722,325 A | 3/1998 | Glomski et al. |
| 5,904,098 A | 5/1999 | Theurer et al. |
| 6,158,353 A | 12/2000 | Theurer |
| 6,301,763 B1 | 10/2001 | Pryor |
| 6,317,953 B1 | 11/2001 | Pryor |
| 6,807,909 B1 | 10/2004 | Coots |
| 7,386,367 B2 | 6/2008 | Watanabe et al. |
| 7,497,166 B2 | 3/2009 | Fuerst et al. |
| 7,658,152 B2 | 2/2010 | Brenny et al. |
| 7,827,916 B2 | 11/2010 | Coots, Jr. |
| 8,042,473 B2 | 10/2011 | Buckley et al. |
| 8,070,409 B2 | 12/2011 | Burke et al. |
| 8,082,852 B2 | 12/2011 | Plyler et al. |
| 8,132,512 B2 | 3/2012 | Helmick |
| 8,166,883 B1 | 5/2012 | Coots |
| 8,171,855 B2 | 5/2012 | Noll et al. |
| 8,220,397 B2 | 7/2012 | Sperling |
| 8,316,774 B1 | 11/2012 | Coots |
| 8,326,460 B2 | 12/2012 | Ban et al. |
| 8,365,673 B2 * | 2/2013 | Plyler ..................... B03C 1/20 171/16 |
| 8,443,733 B2 | 5/2013 | Coots |
| 8,468,948 B2 | 6/2013 | Delmonico et al. |
| 8,474,597 B2 | 7/2013 | Pier et al. |
| 8,528,484 B2 | 9/2013 | Helmick |
| 8,534,195 B2 | 9/2013 | Noll et al. |
| 8,625,878 B2 | 1/2014 | Haas et al. |
| 8,724,904 B2 | 5/2014 | Fujiki et al. |
| 8,954,183 B2 | 2/2015 | Kayani et al. |
| 9,016,208 B2 | 4/2015 | Coots |
| 9,036,025 B2 | 5/2015 | Haas et al. |
| 9,038,542 B2 * | 5/2015 | Coots ..................... E01B 29/32 104/16 |
| 9,047,668 B2 | 6/2015 | Haas et al. |
| 9,050,984 B2 | 6/2015 | Li et al. |
| 9,156,623 B1 * | 10/2015 | Buzdum ................ E01B 29/32 |
| 9,260,122 B2 | 2/2016 | Haas et al. |
| 9,428,867 B2 | 8/2016 | Harman et al. |
| 9,441,956 B2 | 9/2016 | Kainer et al. |
| 9,745,132 B2 | 8/2017 | Coots et al. |
| 9,745,150 B2 | 8/2017 | Coots et al. |
| 9,752,286 B2 | 9/2017 | Coots et al. |
| 10,094,071 B2 * | 10/2018 | Coots ..................... B65G 37/00 |
| 10,112,215 B1 | 10/2018 | Coots |
| 10,427,876 B2 | 10/2019 | Coots et al. |
| 10,487,458 B2 | 11/2019 | Harman et al. |
| 10,745,208 B1 * | 8/2020 | Coots ..................... B65G 13/02 |
| 11,136,726 B1 * | 10/2021 | Coots ..................... E01B 29/32 |
| 11,572,660 B2 | 2/2023 | Coots |
| 2011/0100248 A1 * | 5/2011 | Buckley ................. E01B 29/32 104/16 |
| 2011/0113981 A1 | 5/2011 | Coots |
| 2011/0146527 A1 * | 6/2011 | Plyler ..................... E01B 29/32 104/16 |
| 2011/0239893 A1 | 10/2011 | Delmonico et al. |
| 2011/0274232 A1 | 11/2011 | Doll |
| 2011/0301741 A1 | 12/2011 | Kayani et al. |
| 2012/0192756 A1 | 8/2012 | Miller et al. |
| 2012/0204752 A1 | 8/2012 | Helmick |
| 2012/0204753 A1 | 8/2012 | Noll et al. |
| 2012/0209415 A1 | 8/2012 | Casanelles et al. |
| 2012/0240811 A1 | 9/2012 | Pier et al. |
| 2013/0247793 A1 | 9/2013 | Coots |
| 2014/0260643 A1 | 9/2014 | Delmonico |
| 2016/0249040 A1 | 8/2016 | Mesher |
| 2019/0382962 A1 | 12/2019 | Coots |
| 2020/0131713 A1 | 4/2020 | Sperling et al. |
| 2020/0131714 A1 | 4/2020 | Sperling et al. |
| 2020/0131715 A1 | 4/2020 | Sperling et al. |
| 2020/0141065 A1 | 5/2020 | Coots |
| 2020/0332475 A1 | 10/2020 | Harman et al. |
| 2021/0269986 A1 | 9/2021 | Helmick |
| 2022/0010499 A1 | 1/2022 | Coots |

* cited by examiner

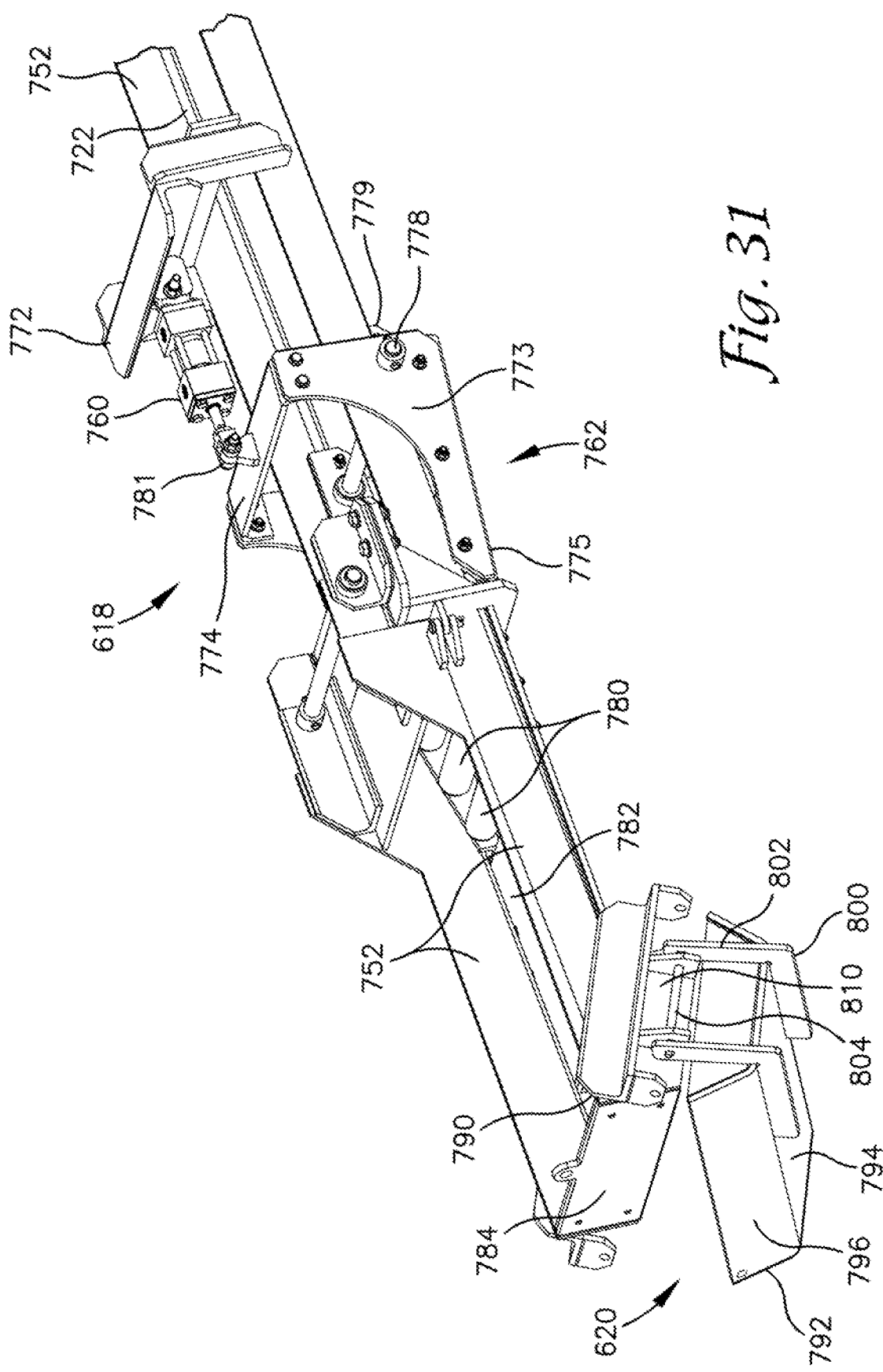

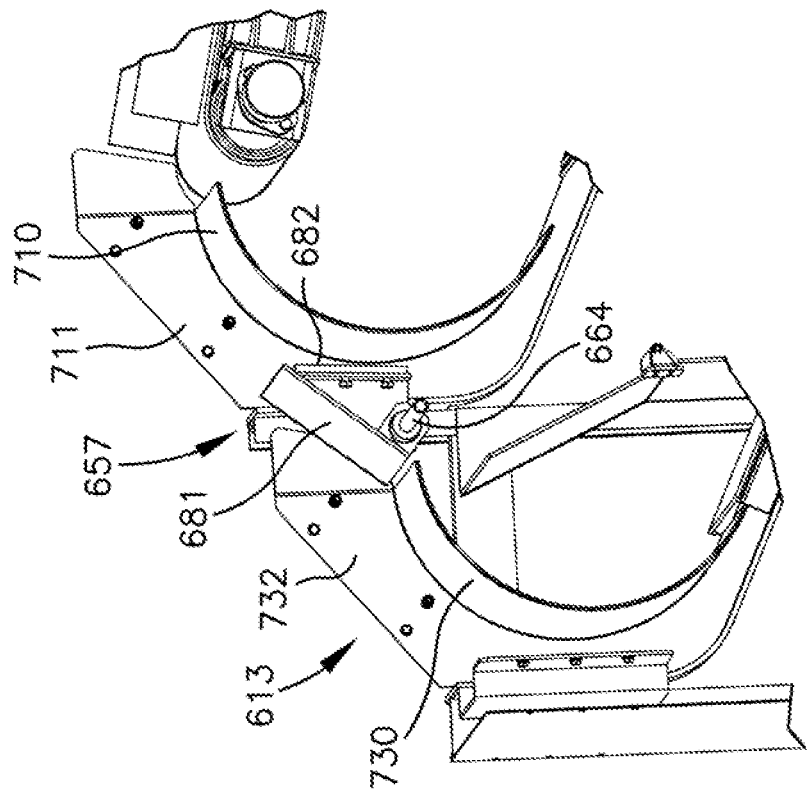
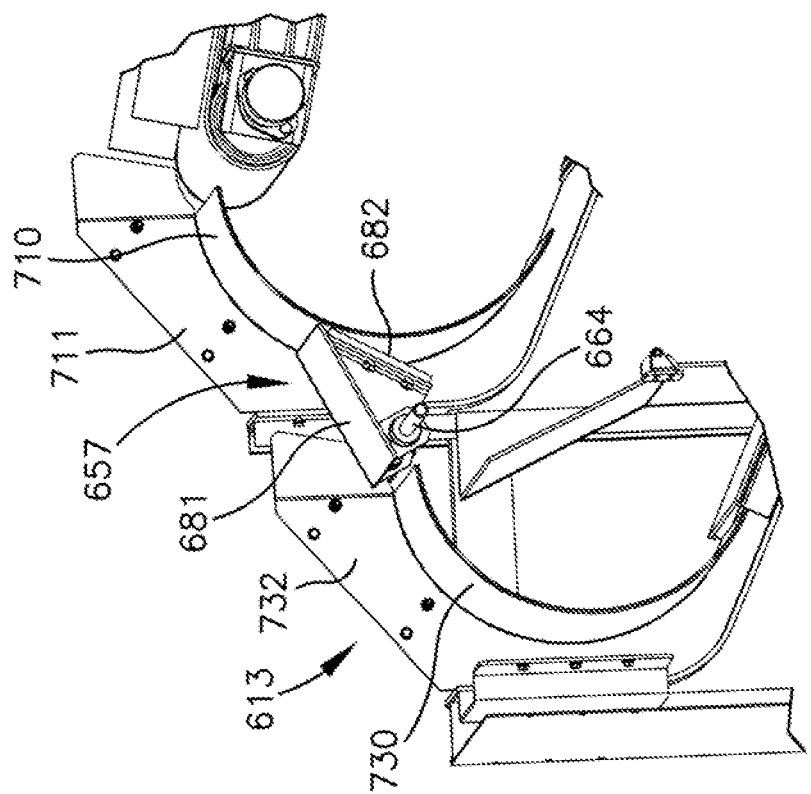

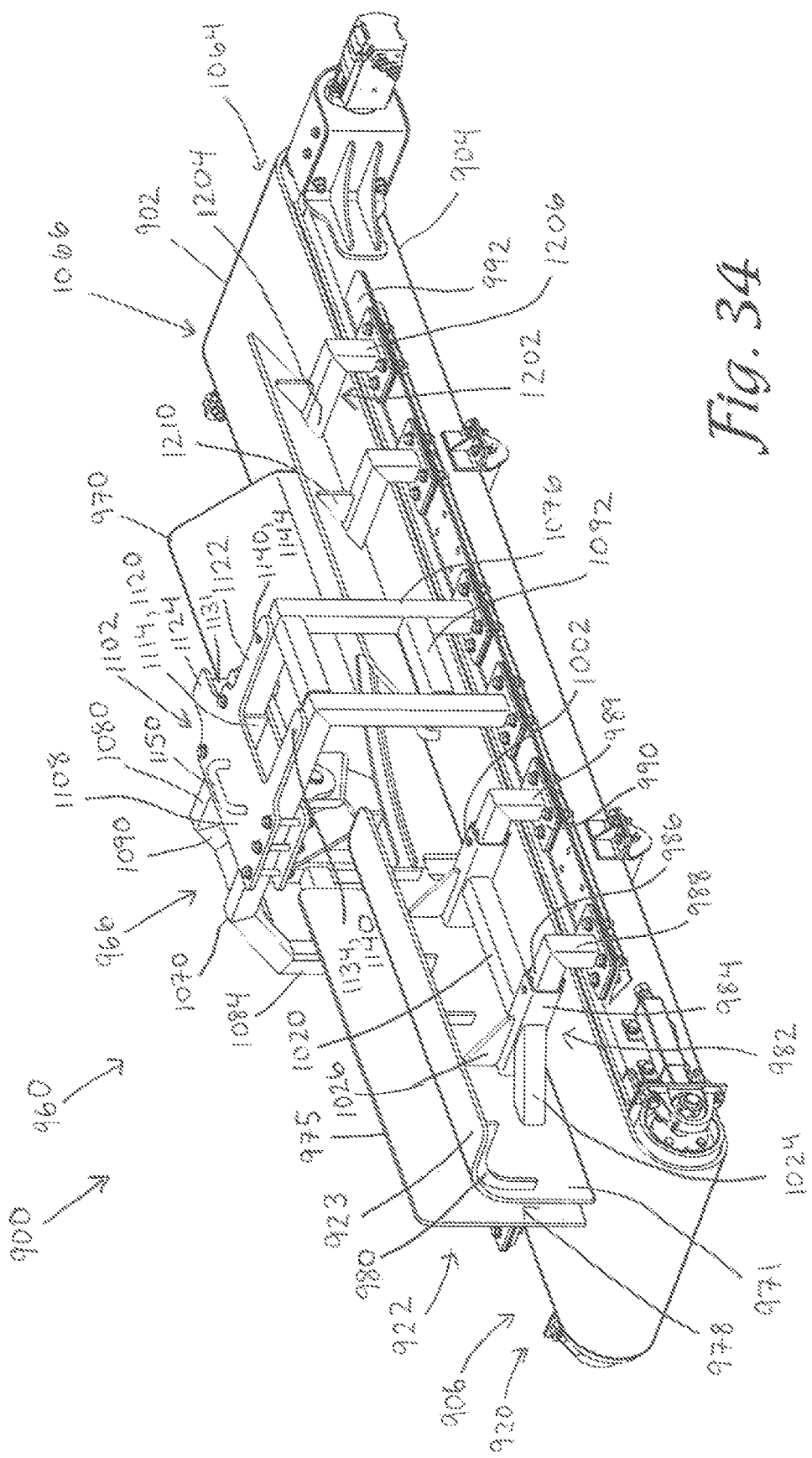

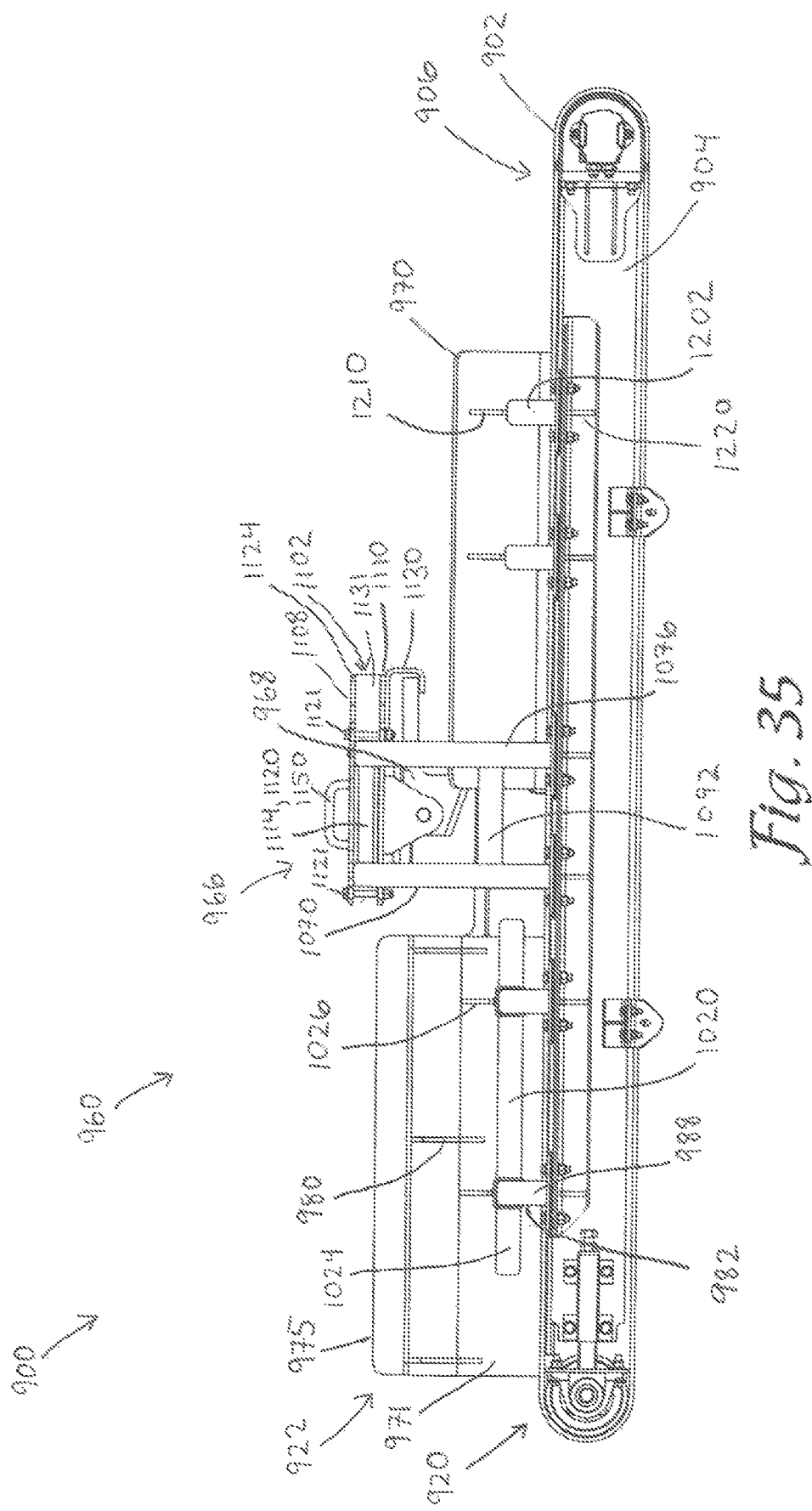

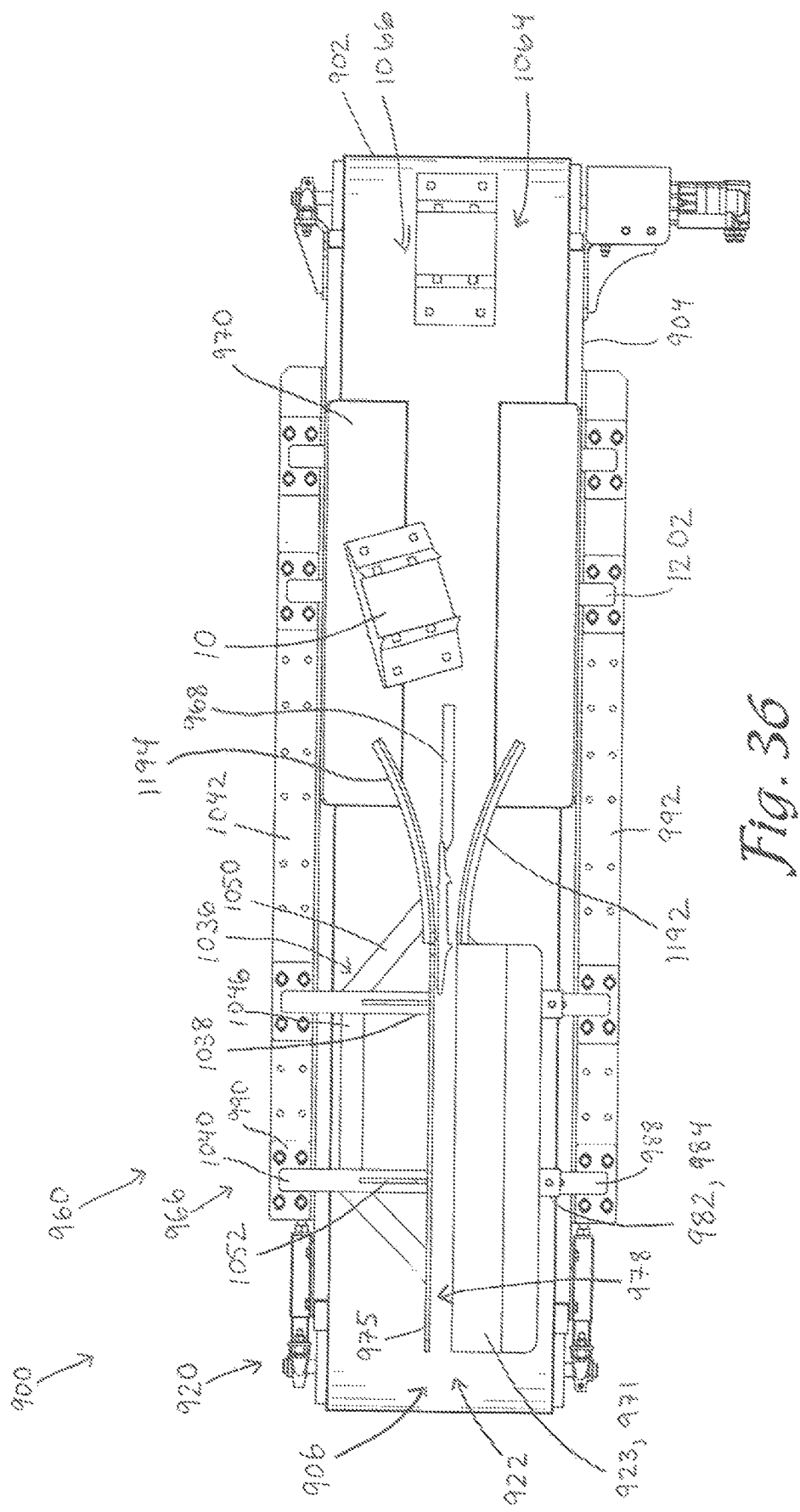

Fig. 40

RAIL TIE PLATE FLIPPING ASSEMBLY

CROSS-REFERENCE TO RELATED APPLICATIONS

This application is a continuation-in-part of U.S. patent application Ser. No. 18/462,131 filed Sep. 6, 2023 which claims the benefit of U.S. Provisional Patent Application Ser. No. 63/375,131 filed Sep. 9, 2022 and this application claims the benefit of U.S. Provisional Patent Application Ser. No. 63/480,076, filed Jan. 16, 2023, the disclosures of which are incorporated herein in their entirety by reference.

BACKGROUND OF THE INVENTION

Field of the Invention

This invention relates to machines for singulating and orienting rail tie plates for distribution along a section of track of a railroad.

Background

Rail tie plates 10 are used to connect a rail 11 to a railroad tie or crosstie 12 and are typically made of iron or steel. A tie plate 10 provides a proper cant to the rail and distributes the load transferred through the rail 11 to the crosstie 12 over a larger area to protect the crosstie 12 against undue wear. An example of a conventional, double shoulder rail tie plate 10 is shown in FIGS. 1 and 2. A section of railroad track having rails 11 secured to crossties 12 by tie plates 10 is shown in FIG. 5. The tie plate 10 is rectangular and includes a generally planar, rectangular bottom surface 14 with a pair of shoulders 15 and 16 extending upward from an upper surface or shoulder side surface 17 of the tie plate 10 transverse to a longitudinal axis of the tie plate 10. The shoulders 15 and 16 are spaced apart a distance between which the base of the rail 11 will fit.

In the embodiment of the tie plate 10 shown, the upper surface 17 of the tie plate 17 slopes upward from shoulder 15 to shoulder 16 to provide the desired cant to a rail 11 secured thereto between shoulders 15 and 16. The portion of the tie plate 10 extending outward from the shoulder 15, which may be referred to as the short end 18, is shorter in length than the portion of the tie plate 10 extending outward from the shoulder 16, which may be referred to as the long end 19. The height of shoulder 15 relative to the bottom surface 14 is lower than the height of shoulder 16 relative to the bottom surface 14. The short end 18 may also be referred to as the gauge side end 18 and the long end may also be referred to as the field side end 19.

Railroad ties 12 are occasionally replaced due to wear. After a tie 12 is replaced, tie plates 10 are provided between the rail 11 and the tie 12 so that the rail 11 may be properly secured to the tie 12. Additionally, it is desirable, at times, to replace tie plates 10 during the same procedure that rail 11 is replaced. A variety of machines or systems have been developed for singulating a plurality of rail tie plates 10, orienting the rail tie plates 10 in desired orientation and then discharging the properly oriented tie plates 10 on selected rail ties 12. There remains a need for a rail tie plate singulating and distribution system having means for consistently providing a continuous supply of singulated rail tie plates 10 to equipment for properly orienting and distributing the rail tie plates 10 individually onto cross-ties along a section of track and at a desired rate.

SUMMARY OF THE DISCLOSED EMBODIMENTS

A rail tie plate orientation and distribution assembly for orienting and distributing rail tie plates along a section of track of a railroad comprises a rail tie plate singulating assembly, a rail tie plate flipping assembly, a rail tie plate quarter turn assembly, and a distribution assembly.

The rail tie plate singulating assembly comprises a singulating conveyor to which ties plates may be fed from a lift conveyor. The lift conveyor includes a lift conveyor run sloping upward from a lift conveyor inlet end toward a lift conveyor distal end. The singulating conveyor extends adjacent the lift conveyor and includes a singulating conveyor run extending from a singulating conveyor distal end to a singulating conveyor outlet end. An inner edge of the singulating conveyor extends longitudinally adjacent an outer edge of the lift conveyor. The lift conveyor run extends below the singulating conveyor run from the lift conveyor inlet end to a y-axis intercept between the lift conveyor run and the singulating conveyor run and the lift conveyor run extends at least level with or above the singulating conveyor run from the y-axis intercept to the lift conveyor distal end.

A conveyor transfer guide extends in spaced relation above the lift conveyor run in a spacing less than the height of a rail tie plate supported on the lift conveyor run. The conveyor transfer guide extends from a first position spaced inward from the lift conveyor outer edge, and proximate or past the y-axis intercept, toward the lift conveyor outer edge and toward the distal end of the lift conveyor such that at least some of the plurality of rail tie plates advanced up the lift conveyor run engage the conveyor transfer guide and are guided laterally toward and onto the singulating conveyor run past the y-axis intercept in a direction of conveyance of the lift conveyor run.

A singulating guide extends in spaced relation above the singulating conveyor run in a spacing less than the height of a rail tie plate supported on the singulating conveyor run. The singulating guide includes a first portion extending from an outer side of the singulating conveyor and past the y-axis intercept in a direction of conveyance of the singulating run toward the outlet end of the singulating conveyor and toward the singulating conveyor inner edge. A second portion of the singulating guide extends parallel to and spaced outward from the singulating conveyor inner edge a distance approximately equal to a width of a rail tie plate to form a reduced width conveying section on the singulating conveyor run. The second portion of the singulating guide extends toward the outlet end of the singulating conveyor such that at least some of the rail tie plates advanced onto the singulating conveyor from the lift conveyor are guided by the singulating guide into longitudinal alignment on the reduced width conveying section. Rail tie plates which are not advanced into longitudinal alignment with the reduced width conveying section are advanced off of the singulating conveyor past the y-axis intercept in the conveying direction and fall onto the lift conveyor.

A redirecting means, which may comprise a driven roller, is supported over the reduced width conveying section and is operable to engage a rail tie plate supported on top of another rail tie plate advancing longitudinally along the reduced width conveying section to advance the rail tie plate engaged by the redirecting means laterally towards and onto the lift conveyor. The driven roller, used as the redirecting means, may be mounted on the rail tie plate singulating machine so that the lower periphery of the driven roller is spaced above the singulating conveyor a height which is slightly greater than a maximum height of a rail tie plate supported on the singulating conveyor with a bottom of the rail tie plate supported generally or approximately flush on an upper surface of the singulating conveyor. Most or many rail tie plates have a generally flat bottom or bottom surface. However, as shown in FIGS. 1 and 2, some rail tie plates 10 may include ridges formed on a bottom surface 14 with the ridges adapted to be pressed into an upper surface of a rail tie on which they are placed to provide traction to resist lateral shifting of the tie plates 10. As used herein, an approximately or generally flush alignment includes an alignment in which the bottom surface of the tie plate includes ridges which space the rest of the bottom surface slightly above the singulating conveyor.

The rail tie plate singulating machine may also include a bin sized to receive and hold a plurality of rail tie plates. The bin may be mounted on the rail tie plate singulating machine proximate the distal end of the lift conveyor with a feed conveyor extending above the lift conveyor run and extending from proximate the bin toward an inlet end of the lift conveyor. A magnetic crane may be pivotably mounted proximate the bin and operable to lift a plurality of rail tie plates from the bin and release the plurality of rail tie plates onto the feed conveyor proximate the lift conveyor distal end. The plurality of rail tie plates released onto the feed conveyor are conveyed by the feed conveyor to an outlet end of the feed conveyor where the plurality of rail tie plates fall onto the lift conveyor proximate the lift conveyor inlet end.

The rail tie plate singulating machine may be supported on flanged wheels for movement on a railroad track. The rail tie plate singulating machine may be supported on a trailer having wheels adapted for travel on roads and retractable and extendable flanged wheels to facilitate travel on railroad rails.

The rail tie plate flipping assembly receives the rail tie plates from the singulating conveyor and flips rail tie plates with their shoulders facing downward, and which may be referred to as a shoulder-side down orientation, into a shoulder-side up orientation in which the shoulders of the rail tie plates face upward. The rail tie plate flipping assembly maintains shoulder-side up tie plates in the shoulder-side up orientation. In one embodiment, the rail tie plate flipping assembly includes a launch conveyor with a launch conveyor run extending from a launch conveyor inlet end that receives the plurality of singulated rail tie plates to a launch conveyor outlet end. A dampening slide is spaced apart from the launch conveyor outlet end and has an upper section, and a middle section and a lower section. The dampening slide curves downward toward a flipping assembly outlet section that extends under the launch conveyor. The dampening slide is formed from a dampening lining or layer and a resilient strip overlying the dampening layer that extend from the upper section to the lower section of the dampening slide. An adjustable paddle or support platform adjustably supports the middle section of the dampening slide. The spacing between the dampening slide and the distal end of the launch conveyor and the speed at which the launch conveyor is operated is selected such that rail tie plates oriented shoulder-side down rotate a sufficient degree after being launched off of the launch conveyor, and preferably at least ninety degrees such that after impacting the dampening slide, the rail tie plate further rotates to a shoulder-side up orientation as it exits the dampening slide and rail tie plates oriented shoulder-side up on the launch conveyor remain in a shoulder-side up orientation after impacting the dampening slide. As used herein, reference to a rail tie plate in a right-side up orientation may refer to a rail tie plate oriented with the shoulders extending upward or downward depending on the application or user preference. Similarly, reference to a rail tie plate in an upside down orientation may refer to a rail tie plate oriented with the shoulders extending downward or upward depending on the application or user preference. The launch conveyor and dampening slide comprises one means for flipping rail tie plates from a shoulder-side down orientation into a shoulder-side up orientation while maintaining rail tie plates in the shoulder-side up orientation in the shoulder-side up orientation.

An alternative rail tie plate flipping assembly includes a conveyor having a flipping conveyor run configured to receive and advance the plurality of rail tie plates fed to it successively from the singulating conveyor. The rail tie plates are conveyed on a longitudinal edge, successively by the flipping conveyor, through a vertical guide comprising first vertical guide and a second vertical guide. The first and second vertical guides extend in parallel spaced relation above the flipping conveyor run parallel to the direction of conveyance and spaced apart a distance to receive and support one of the plurality or rail tie plates in a substantially vertical orientation as the rail tie plate is conveyed therebetween by the flipping conveyor. A wedge is configured and positioned to engage a shoulder side surface of each of the plurality of rail tie plates advanced between and past the first and second vertical guides. Engagement of the shoulder side surface of each of the rail tie plates passing by the wedge tips the upper longitudinal edge of the rail tie plates outward and downward pivoting the rail tie plate into a shoulder-side up orientation on the flipping assembly conveyor downstream of the wedge. The flipping conveyor, vertical guide and wedge comprise an alternative means for flipping rail tie plates from a shoulder-side down orientation into a shoulder-side up orientation while maintaining rail tie plates in the shoulder-side up orientation in the shoulder-side up orientation.

The rail tie plates may be fed into the vertical guide from a chute connected at one end to the singulating conveyor and at an opposite end to the vertical guide such that the rail tie plates slide downward between the vertical guides and onto the flipping conveyor run on a longitudinal edge of the tie plate. Alternatively, the rail tie plates may be fed from the singulating conveyor through a connecting chute or directly from the end of the singulating conveyor onto an intake end of the flipping conveyor run with one longitudinal edge of each tie plate landing on a ramp and the other longitudinal edge landing on the flipping conveyor run. The ramp slopes upward and inward to one of the vertical guide panels to lift the edge of the tie plate on the ramp upward as the tie plate is conveyed toward the vertical guide by the flipping conveyor so that the tie plate advances into the space between the vertical guide plates in a vertical alignment.

A method for orienting rail tie plates to be distributed on or in close proximity to ties of a track using, for example, portions of the rail tie plate singulating, orienting and distribution machine disclosed herein may include an initial step of singulating a plurality of randomly oriented rail tie plates into a conveyed stream of individual rail tie plates oriented longitudinally relative to a direction of conveyance and conveyed successively in the direction of conveyance. The stream of singulated rail tie plates will include rail tie plates oriented shoulder side up and rail tie plates oriented shoulder side down. The rail tie plates are then conveyed successively through a tie plate flipping assembly flipping shoulder side down oriented rail tie plates into a shoulder side up orientation while maintaining shoulder side up oriented rail tie plates in the shoulder side up orientation.

The shoulder side up oriented rail tie plates may then be conveyed successively past a sensor in communication with a controller to determine the longitudinal orientation of the rail tie plates exiting the tie plate flipping assembly and directed through further handling equipment to orient and distribute the rail tie plates in a selected orientation along a section of a railroad track.

BRIEF DESCRIPTION OF THE DRAWINGS

FIG. 31 is a side perspective view of a discharge end broken away from the rail tie plate distribution assembly shown in FIG. 25.

FIG. 32 is an enlarged perspective view of the routing assembly with portions removed to show first and second curved guide panels and the router of the rail tie plate distribution assembly as shown in FIG. 25 with the router lowered to direct rail tie plates from the elevation conveyor to the second curved guide panel.

FIG. 33 is an enlarged perspective view of the routing assembly as in FIG. 32 with portions removed to show the router raised to direct rail tie plates from the elevation conveyor to the first curved guide panel.

FIG. 34 is perspective view of a rail tie plate edge flipping assembly shown separated from the rail car.

FIG. 35 is a right, side elevational view of the rail tie plate edge flipping assembly shown in FIG. 34.

FIG. 36 is a top plan view of the rail tie plate edge flipping assembly shown in FIG. 34, with portions removed to schematically show a path of conveyance of a rail tie plate as it is conveyed in a vertical orientation past a wedge that engages a shoulder-side surface of the rail tie plate and tips the rail tie plate toward one of the sides of the rail tie plate edge flipping assembly such that each rail tie plate exits the rail tie plate edge flipping assembly in a shoulder-side up orientation.

FIG. 40 is a perspective view of an alternative embodiment of a rail tie plate edge flipping assembly.

DETAILED DESCRIPTION OF THE PREFERRED EMBODIMENTS

Figure 1:
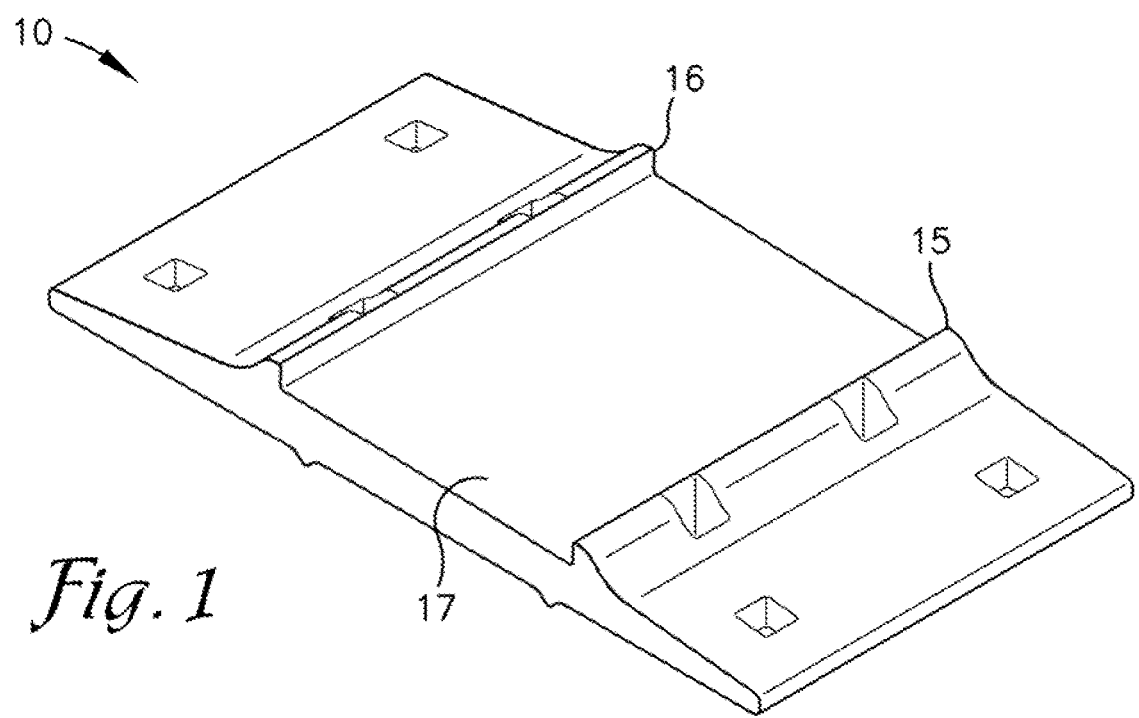
FIG. 1 is a perspective view of a rail tie plate.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, reference numeral 20 generally designates a rail tie plate singulating, orienting and distribution machine, which in the embodiment shown in FIGS. 3-6 is incorporated into a trailer 21 which can be connected to and towed by a tractor 22 to form a self-propelled vehicle 23. Machine 20 may also be referred to herein as a rail tie plate distribution machine 20. The tractor 22 includes a cab 24 mounted on a rigid, tractor frame 25. The tractor 22 is equipped with a conventional engine for propelling the vehicle, such as a gasoline or diesel engine. A trailer frame 27 is coupled to the tractor frame 25 by means of a conventional swivel or fifth-wheel coupling 28.

The tractor frame 25 and trailer frame 27 are each equipped with a plurality of conventional wheels and tires 30 of the type used on tractor-trailers for over-the-road travel along a roadway. Each tractor frame 25 and trailer frame 27 is also equipped with a plurality of flanged rail wheels 32 having flanges 33 on their inside edges. The rail wheels 32 may be of the type commonly used on rail cars so that the rail wheels 32 can travel on the rails of a railroad track such as the rails mounted on ties which are installed on a railway bed.

The rail wheels 32 are mounted to the tractor frame 25 and trailer frame 27 for vertical movement via actuators, such as hydraulic actuators (not shown). When the actuators are fully retracted, the rail wheels 32 are raised above the lowermost points of the tires 30, enabling the tires 30 to engage and roll along a roadway in an over-the-road mode or configuration of the vehicle 23. The actuators may be extended in order to lower the flanged wheels 32 onto the rails 11 such that the tractor frame 25 and trailer frame 27 are raised sufficiently to raise the tires 30 above the railway bed and rails and the weight of the vehicle 23 is borne by the railway wheels 32 riding on the rails. The flanged wheels 32 are spaced apart in pairs on opposite sides of the tractor frame 25 and trailer frame 27 at a standard spacing between the two rails of a standard railway line.

Figure 5:
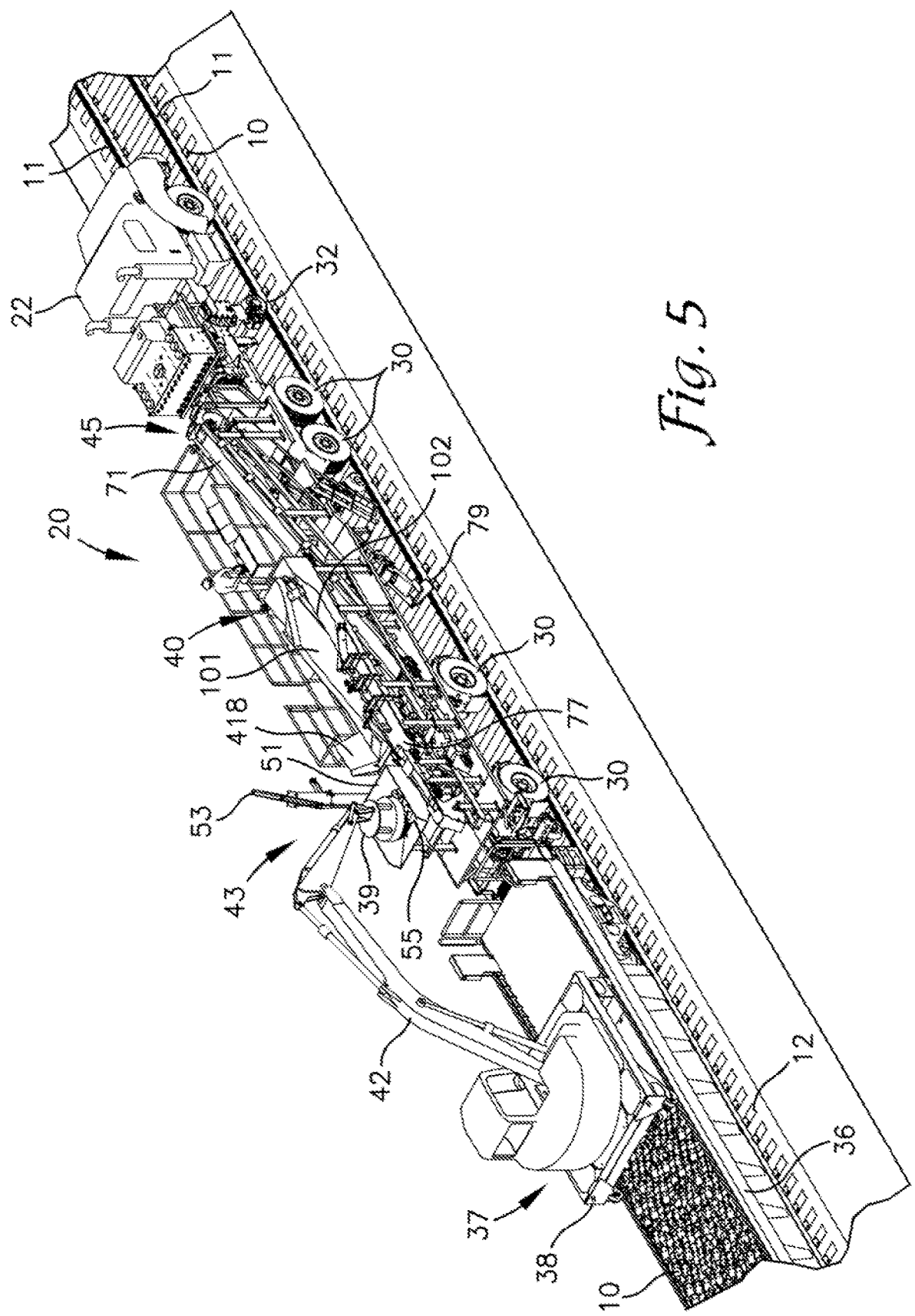
FIG. 5 is a front, perspective view of the rail tie plate distribution machine as shown in FIG. 3 in which the trailer is coupled to a gondola car and flanged wheels on the trailer and tractor are deployed to allow the machine to travel on a section of track relative to which rail tie plates are to be distributed.
Figure 6:
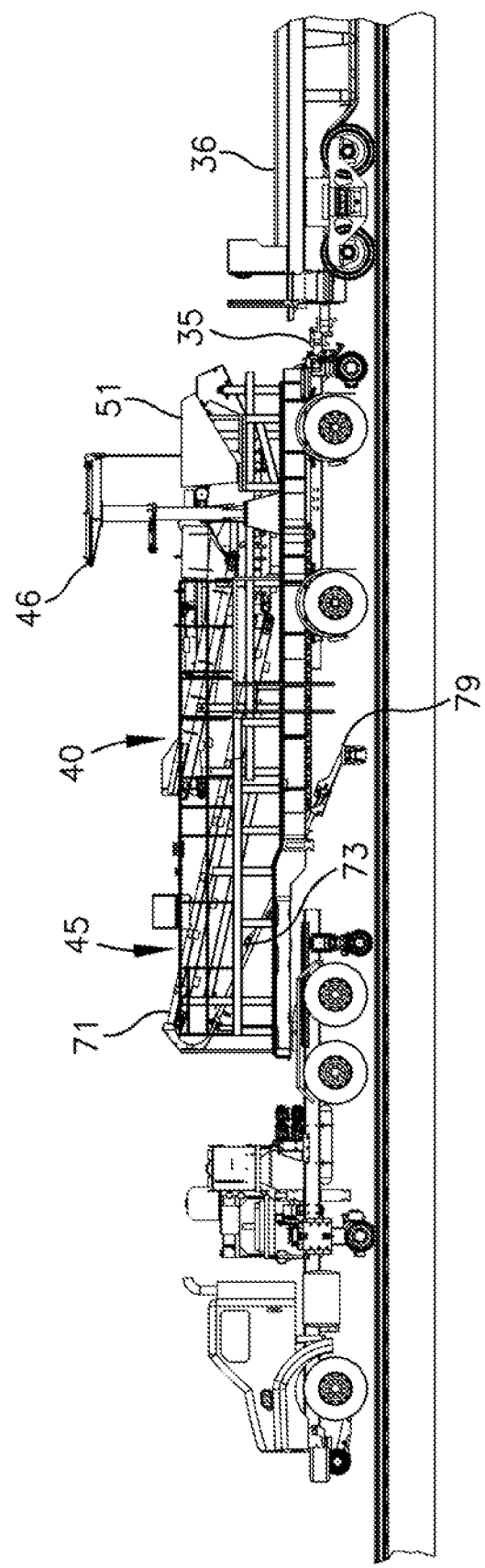
FIG. 6 is a right, side elevational view of the rail tie plate distribution machine coupled with a gondola car as shown in FIG. 5.

A coupler 35 may be connected to the trailer frame 27 at one or both ends to permit the trailer frame 27 to be coupled to a rail car, such as a gondola car 36 as generally shown in FIGS. 5 and 6 in which a relatively large quantity of rail tie plates 10 may be stored. The gondola car 36 may be part of a consist of gondola cars 36 adapted for traversal by a material loader 37 mounted on a flanged wheel bogey or carriage 38. An example of a material loader or material handling machine adapted to traverse the sidewalls of a gondola car or open top rail car 36 is shown in U.S. Pat. No. 6,561,742 of Crawford et al. and assigned to Herzog Contracting Corp. the contents of which are incorporated herein by reference. An electromagnetic head 39 or other tool for picking rail tie plates 10 out of the gondola cars 36 may be mounted on an end of a boom 42 for the material loader 37 for use in unloading rail tie plates 10 from the gondola car 36 and depositing them on the rail tie plate distribution machine 20. It is foreseen that the rail tie plate distribution machine 20 could be mounted on or formed as part of a dedicated rail car and coupled to a plurality of gondola cars 36 on which a material loader operates. The consist of rail cars incorporating the rail tie plate distribution machine 20 and a plurality of gondola cars 36 may be coupled to a locomotive or other prime mover to move the rail cars along the rails. As used herein the trailer 21 with or without the tractor 22 or a dedicated rail car on which the rail tie plate distribution machine may be mounted may be referred to as a vehicle configured for traveling on a railroad track.

Figure 7:
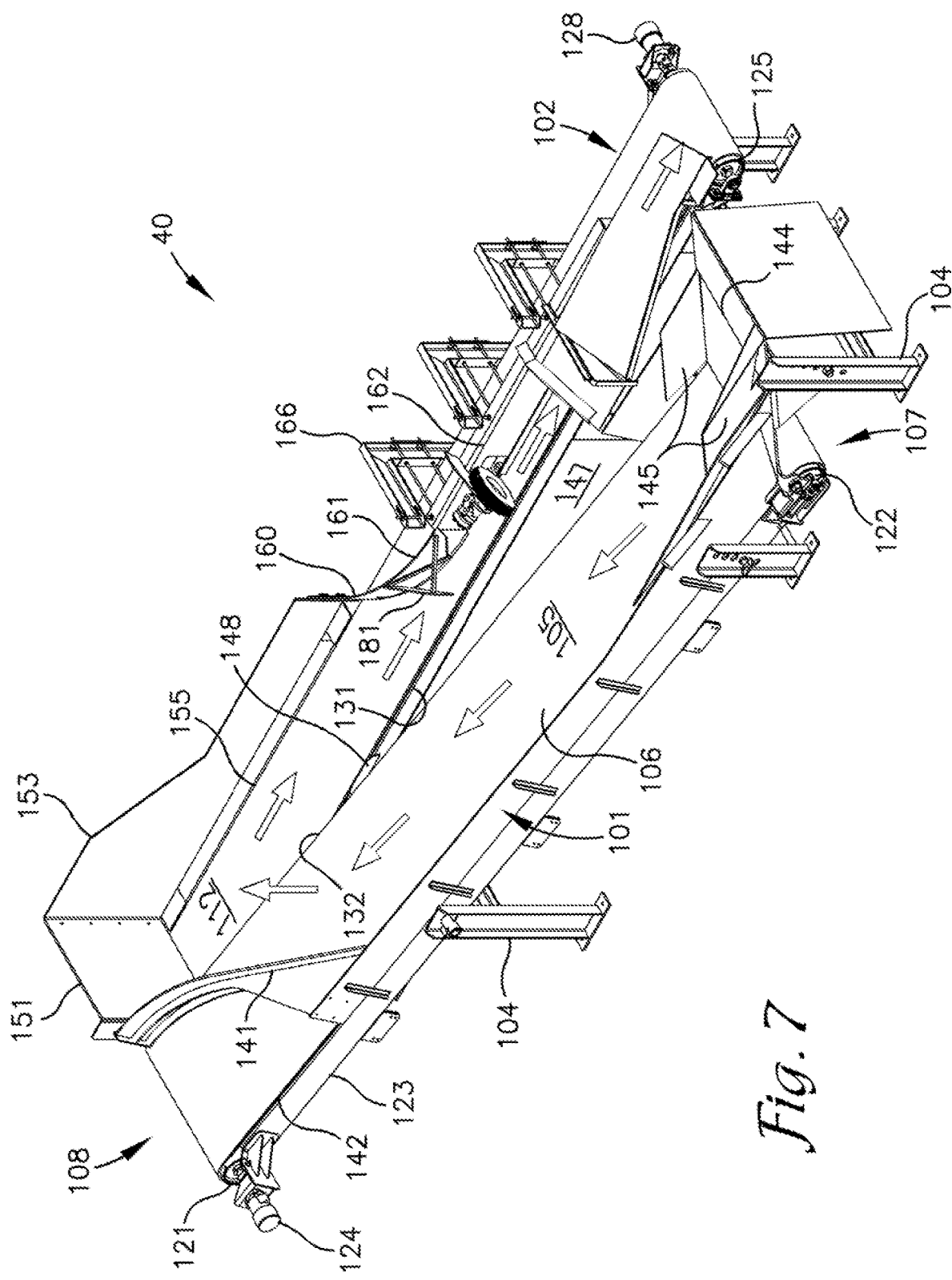
FIG. 7 is a perspective view of a rail tie plate singulating assembly shown separated from the rail car with arrows included to indicate a path of conveyance of rail tie plates through the rail tie plate singulating assembly.
Figure 8:
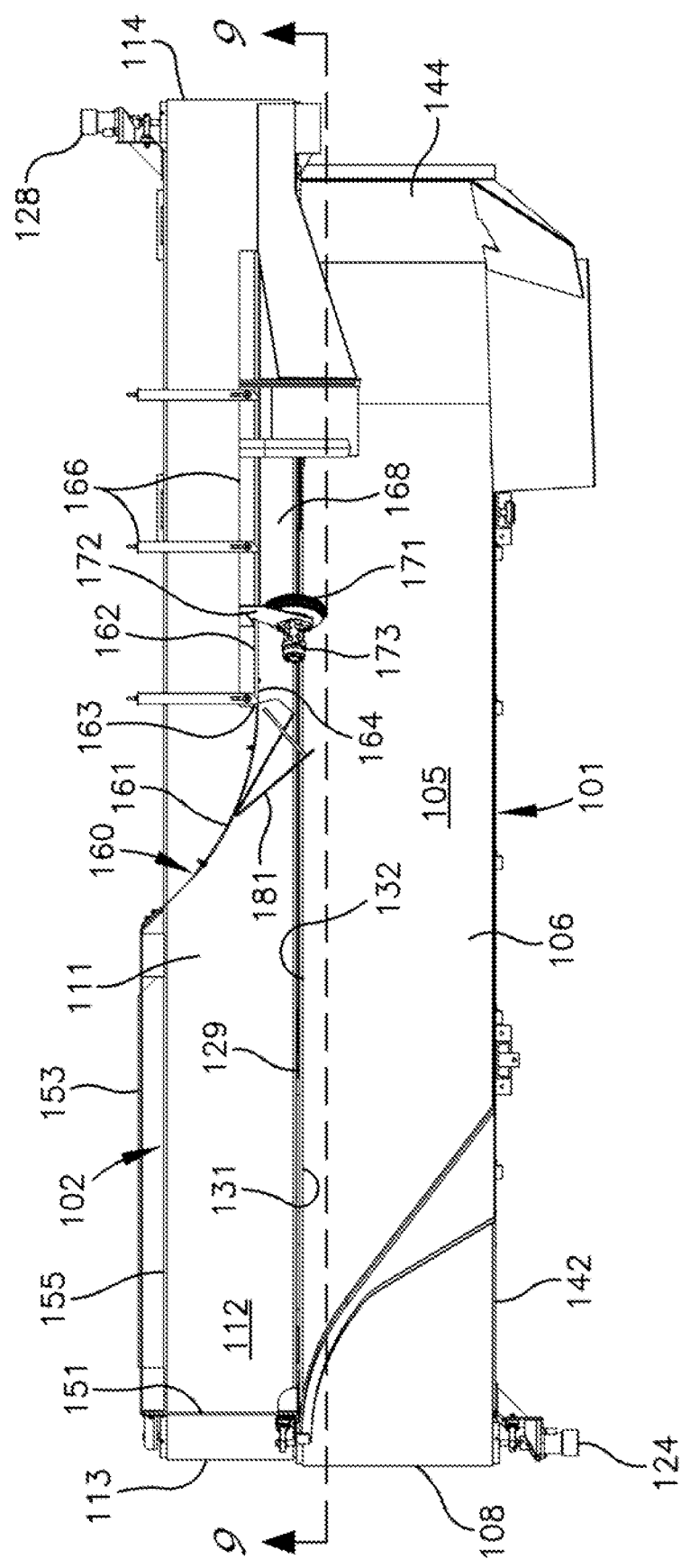
FIG. 8 is a top plan view of the rail tie plate singulating assembly as shown in FIG. 7.
Figure 9:
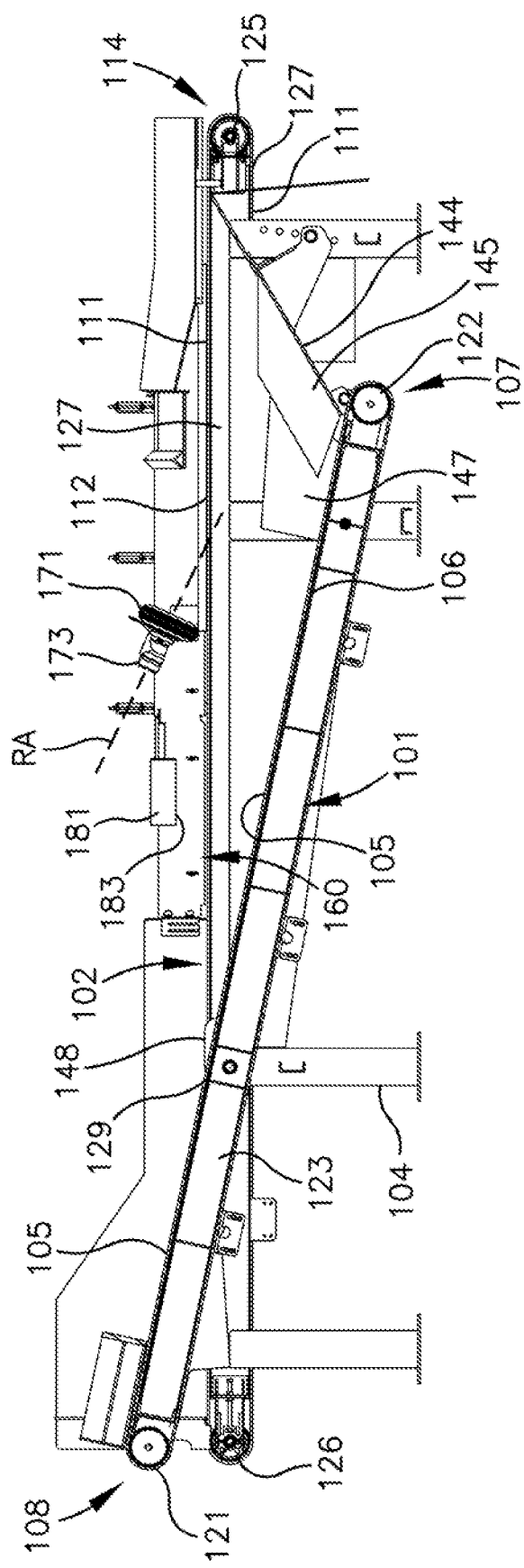
FIG. 9 is a cross-sectional view taken along line 9-9 of FIG. 8.
Figure 10:
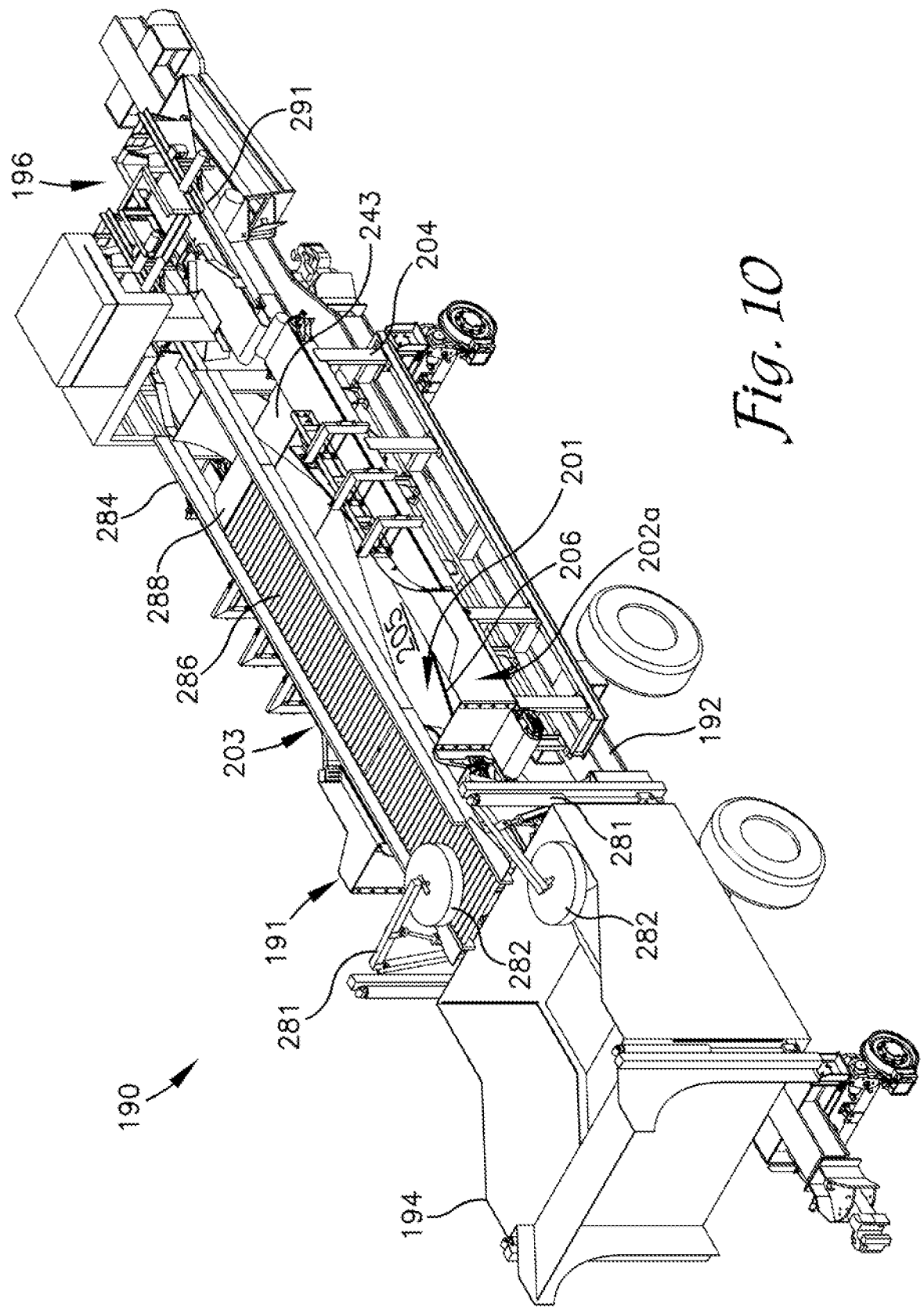
FIG. 10 is a rear, perspective view of an alternative embodiment of a rail tie distribution machine mounted on a trailer.
Figure 11:
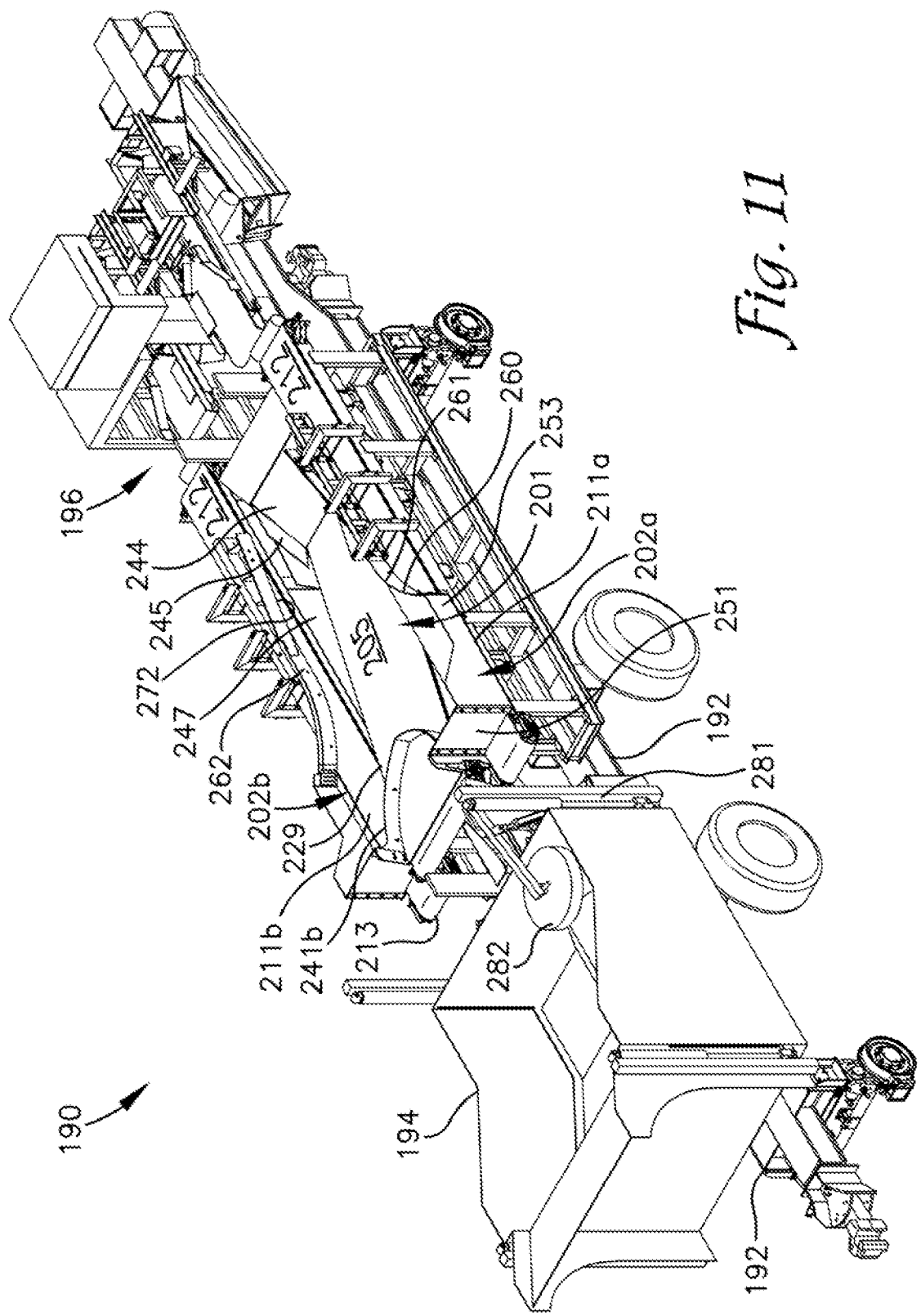
FIG. 11 as a rear, perspective view of the rail tie plate distribution machine on a trailer as in FIG. 10 with portions of the feed conveyor assembly removed to show detail.
Figure 12:
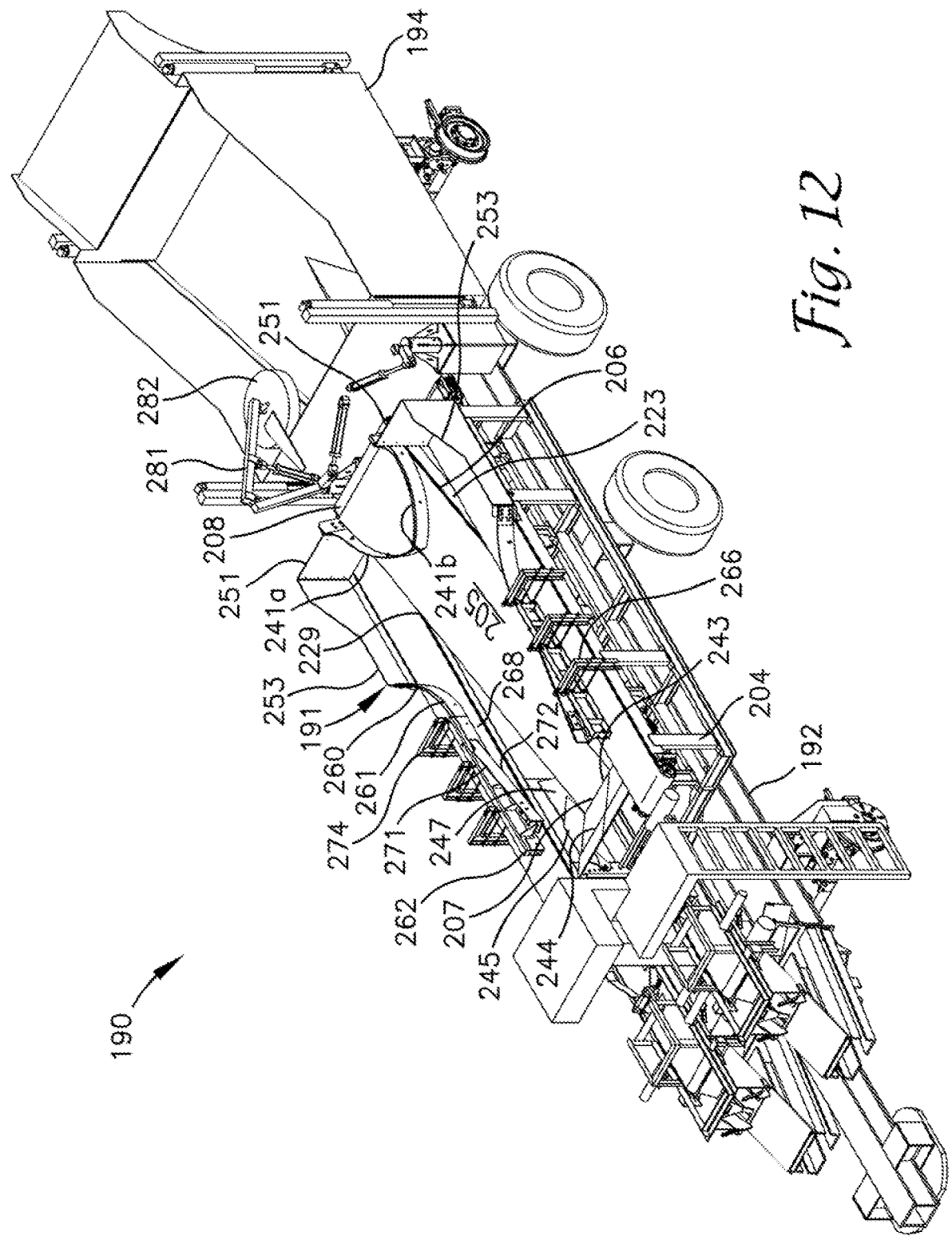
FIG. 12 is a front perspective view of the trail tie plate distribution machine as in FIG. 11 with portions of the feed conveyor assembly removed to show detail.

The rail tie plate distribution machine 20 includes a rail tie plate singulating assembly 40 as shown in FIGS. 7-9, mounted on the trailer frame 27 along with a rail tie plate feed assembly 43 and a rail tie plate orientation and distribution assembly 45. As discussed previously, the boom of the material handling machine may be outfitted with an electromagnetic head operable to attract and hold onto a plurality of rail tie plates 10 to lift the tie plates 10 from the gondola car 36 and then release and deposit the rail tie plates 10 into a bin 51 forming part of the rail tie plate feed assembly 43 on trailer 21.

The rail tie plate feed assembly 43 includes bin 51 and at least one material handling apparatus which in the embodiment shown comprises a crane 53 with an electromagnetic head 55 for transferring rail tie plates 10 from the bin 51 to an inlet end 61 of the singulating assembly 40.

The bin 51, which is sized for receiving and storing a quantity of rail tie plates 10, is mounted proximate a first end 65 of the trailer 21. Rail car coupler 35 for coupling the trailer 21 to a gondola car 36 is connected to the trailer frame 27 at the first end 65 of the trailer 21. The bin 51 may thereby be positioned in close proximity to the gondola car 36 to facilitate transfer of rail tie plates 10 into the bin 51 from a material handling machine operating on the gondola car 36. The rail tie plate singulating assembly 40 is shown supported on a trailer platform 67 proximate the bin 51 with the rail tie plate singulating assembly 40 extending from the side of the bin 51 extending toward the trailer coupler 28 and opposite the rail car coupler 35. In the embodiment shown, the singulating assembly 40 is shown mounted to one side of the trailer platform 67 with a worker platform 69 extending along the opposite side of the trailer platform 67 and adjacent to and along the singulating assembly 40.

Conveyors 71, chutes 73 and other equipment forming the rail tie plate orientation and distribution assembly 45 are mounted on the trailer platform 67 and trailer frame 27 and extend from an outlet end 77 of the singulating assembly 40 along the side of the bin 51, then back under and past the singulating assembly 40 and then back down below the trailer platform 67 to a discharge end 79 of the distribution assembly 45. Equipment mounted on the end of the last conveyor 71 or chute 73 is operable to selectively discharge rail tie plates 10 conveyed thereto by conveyors 71 and chutes 73 in a selected orientation.

The rail tie plate singulating assembly 40 is shown in greater detail in FIGS. 7-9. The rail tie plate singulating assembly 40 can be used separate from the rail tie plate distribution machine 20 and could, for example, be secured in place in a building or on a rail car in addition to the trailer mounting shown in FIGS. 3-6.

The rail tie plate singulating assembly 40, as shown in FIGS. 7-9, includes a lift conveyor 101 and a single singulating conveyor 102 mounted adjacent to the lift conveyor 101 on a singulator frame 104. In the embodiment shown, the singulating conveyor 102 is mounted to the right of the lift conveyor 101 relative to the direction of conveyance of the lift conveyor 101. An upper run or lift conveyor run 105 of a lift conveyor belt 106 slopes upward in a direction of conveyance from an inlet end 107 of the lift conveyor 101 to a distal end 108 thereof. In the embodiment shown, the singulating conveyor 102 includes a singulating conveyor belt 111 with an upper, singulating conveyor run 112 extending generally horizontally and having a direction of conveyance opposite from the direction of conveyance of the lift conveyor 101. The singulating conveyor belt 111 and singulating conveyor run 112 extend from a distal end 113 of the singulating conveyor 102 to an outlet end 114 thereof.

The lift conveyor 101 and singulating conveyor 102 are supported on and above the singulator sub frame 104. In the embodiment shown, the lift conveyor 101 and the singulating conveyor 102 are belt type conveyors. The lift conveyor belt 106 extends around a drive roller 121 and an idler roller 122 mounted on a lift conveyor frame 123. The lift conveyor drive roller 121 may be driven by a motor 124, such as a hydraulic motor, coupled to an axle for the lift conveyor drive roller 121. The singulating conveyor belt 111 of the singulating conveyor 102 extends around a drive roller 125 and a driven roller 126 mounted on a singulating conveyor frame 127. The drive roller 226 for each singulating conveyor 102 is driven by a motor 128, such as a hydraulic motor, coupled to an axle of the respective singulating conveyor drive roller 125.

The distal end 108 of the lift conveyor 101 is the driven end of the lift conveyor 101 and the outlet end 114 of the singulating conveyor 102 is the driven end of the singulating conveyor 102. The lift conveyor run 105 extends below the singulating conveyor run 112 from the lift conveyor inlet end 107 to a y-axis intercept 129 (see FIG. 9) between the lift conveyor run 105 and the singulating conveyor run 112 of the singulating conveyor 102. The lift conveyor run 105 extends above the singulating conveyor run 112 from the y-axis intercept 129 to the lift conveyor distal end 108. In the embodiment shown, the lift conveyor 101 and lift conveyor run 105 slope upward from the inlet end 107 to the distal end 108 at an angle of approximately thirty degrees. It is foreseen that the slope of the lift conveyor 101 and lift conveyor run 105 could vary including between fifteen and forty-five degrees. It is foreseen that between the y-axis intercept 129 and the distal end 108 of the lift conveyor run 105, the lift conveyor run 105 could extend horizontally and in planar alignment with or level with the adjacent singulating conveyor run 112.

In the embodiment shown, the singulating conveyor 102 has a singulating conveyor inner edge 131 extending longitudinally and adjacent an adjacent edge 132 of the lift conveyor 101. Lift conveyor transfer guide 141 extends in spaced relation above the lift conveyor run 105 in a spacing less than the height of a rail tie plate 10 supported on the lift conveyor run 105 so that a rail tie plate 10 will not pass under the lift conveyor transfer guide 141. The lift conveyor transfer guide 141 extends from a first position proximate an outer edge 142 of the lift conveyor 101, and proximate or past the y-axis intercept 129, toward the respective adjacent edge 132 of the lift conveyor 101 adjacent the inner edge 131 of the singulating conveyor 102 and toward the distal end 108 of the lift conveyor 101 such that rail tie plates 10 advanced up the lift conveyor run 105 engage the lift conveyor transfer guide 141 and are guided laterally toward and onto the adjacent singulating conveyor run 112 and past the respective y-axis intercept 129.

A funnel 143 or infeed chute 143, formed from an inlet panel 144 and side panels 145 connected to the singulator frame 104, is mounted at the inlet end 107 of the lift conveyor 101. The inlet panel 144 and side panels 145 slope downward toward the lift conveyor 101, proximate the inlet end 107, to guide or direct rail tie plates 10 discharged onto the inlet panel 144 or side panels 145 onto the lift conveyor 101 and prevent the rail tie plates 10 from falling off the inlet end 107 of the inlet conveyor 101. Sidewalls 147 may also be mounted to the singulator frame 104 below the singulating conveyor 102 along the inner edge 131 thereof and past the adjacent edge 132 of the lift conveyor 101 to prevent rail tie plates 10 from falling off the adjacent edge 132 of lift conveyor 101 below the singulating conveyor 102. A deflector strip 148 is mounted on the singulating conveyor 102 along the inner edge 131 thereof in closely spaced relation forward of the y-axis intercept 129 in the direction of conveyance of the singulating conveyor run 112. The deflector strip 148 covers the gap between the singulating conveyor frame 127 and the singulating conveyor belt 111 to prevent an edge of a rail tie plate 10 advancing up the lift conveyor run 105 from advancing between the conveyor frame 127 and the conveyor belt 111 of the singulating conveyor 102 proximate the y-axis intercept 129.

With reference to singulating conveyor 102, an end wall 151 is connected to the singulator frame 104 to extend across the distal end 113 of the singulating conveyor 102. A sidewall 153 connected to singulator frame 104 extends along an outer edge 155 of the singulating conveyor 102 from the end wall 151 to a position past the y-axis intercept 129 in the direction of conveyance on the singulating conveyor 102. The end wall 151 and sidewall 153 of each singulating conveyor 102 prevent rail tie plates 10 from advancing off of the singulating conveyor 102.

A singulating guide 160 having a first guide section 161 and a second guide section 162 is connected to the singulator frame 104 and extends in spaced relation above each singulating conveyor run 112 in a spacing less than the height of a rail tie plate 10 supported on the singulating conveyor run 112. The first guide section 161 extends in a direction of conveyance of the singulating conveyor 102 from a position at an outer edge or outer side 155 of the singulating conveyor run 112 and past the y-axis intercept 129 toward the outlet end 114 of the singulating conveyor 102 while sloping or curving toward the singulating conveyor inner edge 131. A second end 163 of the first guide section 161 of the singulating guide 160 terminates at or proximate a first end 164 of the second section 162 of the singulating guide 160. The second end 163 of the first guide section 161 and the second guide section 162 are mounted on a support frame 166 connected to the singulator frame 104 and extend over the singulating conveyor run 112.

Figure 18:
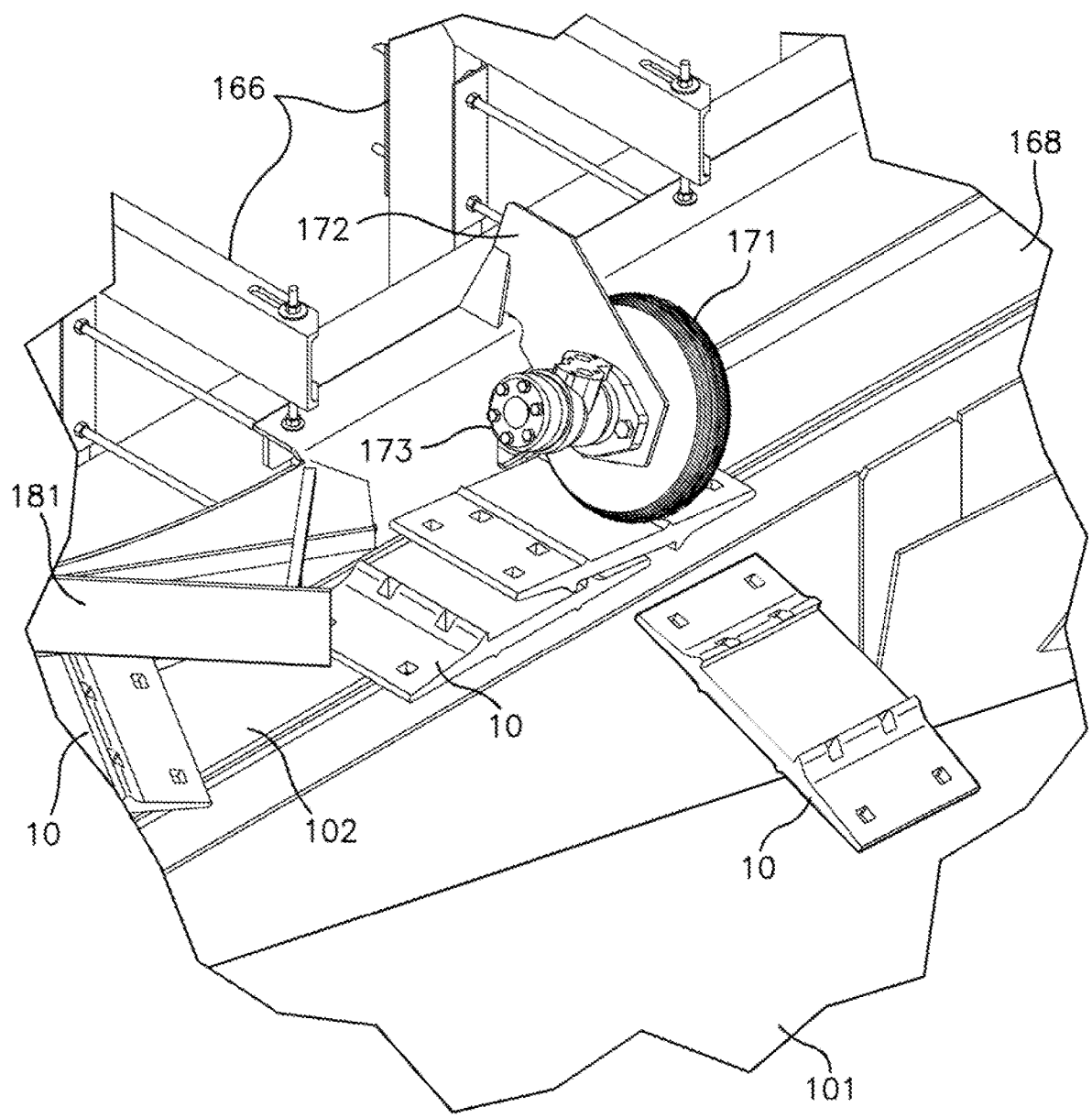
FIG. 18 is an enlarged and fragmentary perspective view of the rail tie plate singulating assembly and rail tie plates as in FIG. 17.

The second section 162 of the singulating guide 160 extends parallel to and spaced outward from the singulating conveyor inner edge 131 a distance approximately equal to or narrower than a width of a rail tie plate 10 to form a reduced width conveying section 168 on the singulating conveyor run 112 along which a single rail tie plate, supported directly on top of the singulating conveyor run 112, may advance in a longitudinal orientation. The second section 162 of the singulating guide 160 extends from its first end toward the outlet end 114 of the singulating conveyor 102. At least some of the rail tie plates 10 advanced onto the singulating conveyor 102 from the lift conveyor 101 are guided by the singulating guide 160 into longitudinal alignment with the direction of conveyance on the reduced width conveying section 168. Rail tie plates 10 which are not advanced into longitudinal alignment on the reduced width conveying section 168 are advanced off of the singulating conveyor 102 past the y-axis intercept 129 in the conveying direction of the singulating conveyor 102 and fall onto the lift conveyor 101. As generally shown in FIG. 18, the reduced width conveying section 168 may be narrower than the width of a rail tie plate 10 advancing longitudinally therealong as long as the reduced with conveying section 168 is more than half as wide as the width of a rail tie plate 10 advancing longitudinally therealong so that the center of gravity of the rail tie plate 10 is positioned over reduced width conveying section 168. The reduced width conveying section 168 has a width selected to allow only a single rail tie plate 10 to advance in a longitudinal extending alignment along the reduced width conveying section 168.

Figure 17:
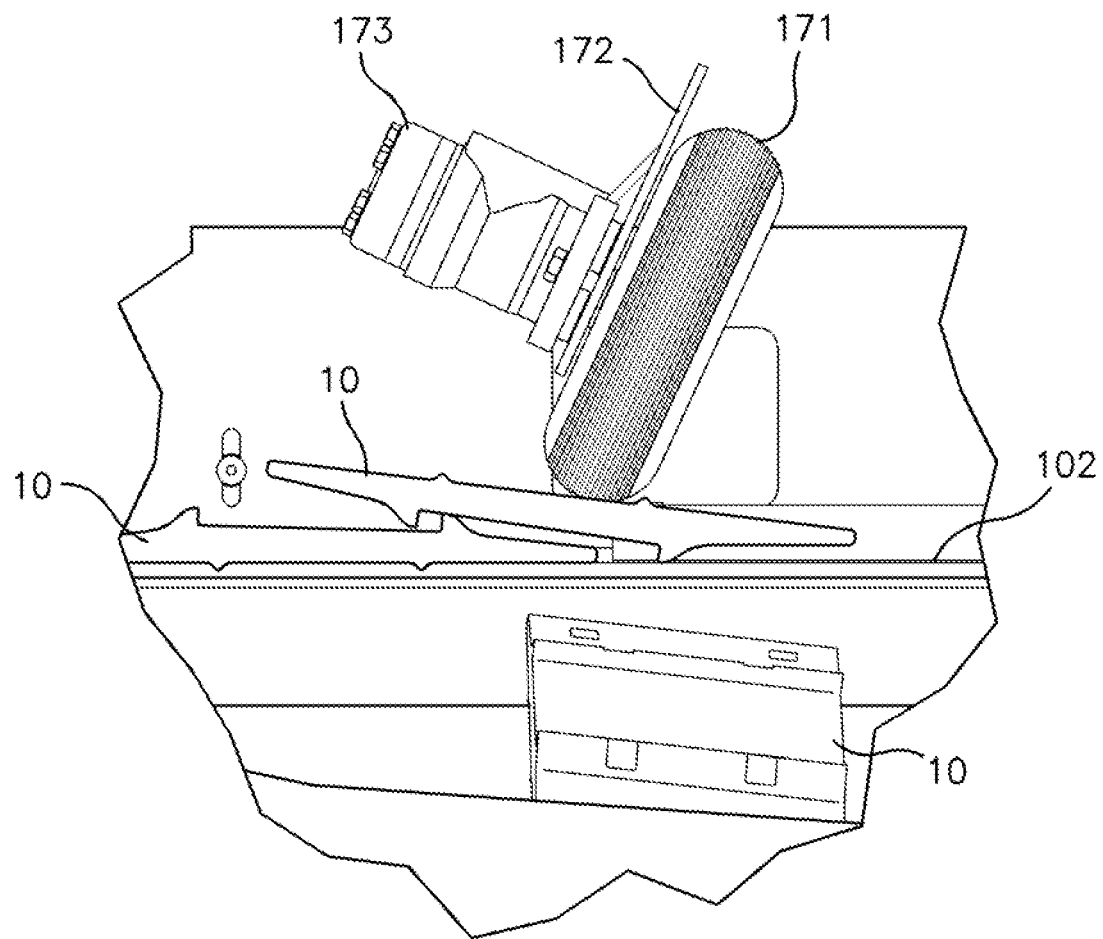
FIG. 17 is an enlarged and fragmentary elevational view of the rail tie plate singulating assembly as in FIG. 16 showing a rail tie plate stacked on top of another tie plate and advancing beneath a tie plate engaging roller and another rail tie plate having been redirected laterally by the tie plate engaging roller.

A plate engaging wheel or plate engaging roller 171 is supported over the reduced width conveying section 168 on a roller support bracket 172 connected to the support frame 166. The plate engaging roller 171 is driven by a drive motor 173 connected to the roller support bracket 172. A lower periphery of the plate engaging roller rotates transverse to the singulating conveyor run 112. As best seen in FIGS. 17 and 18, the plate engaging roller 171 functions as a redirecting means and is operable to engage a rail tie plate 10 supported on top of another rail tie plate 10 advancing longitudinally along the reduced width conveying section 168 to advance the rail tie plate 10 engaged by the lower periphery of the plate engaging roller 171 laterally off of the reduced width conveying section 168 of the singulating conveyor 102 towards and onto the lift conveyor 101. The plate engaging roller 171 is mounted on the bracket 172 and support frame 166 so that the lower periphery of the plate engaging roller 171 is spaced above the singulating conveyor 102 a height which is slightly greater than a height or maximum height of a rail tie plate supported on the singulating conveyor 102 with a bottom of the rail tie plate 10 supported generally flush or horizontally on an upper surface of the singulating conveyor 102.

Figure 13:
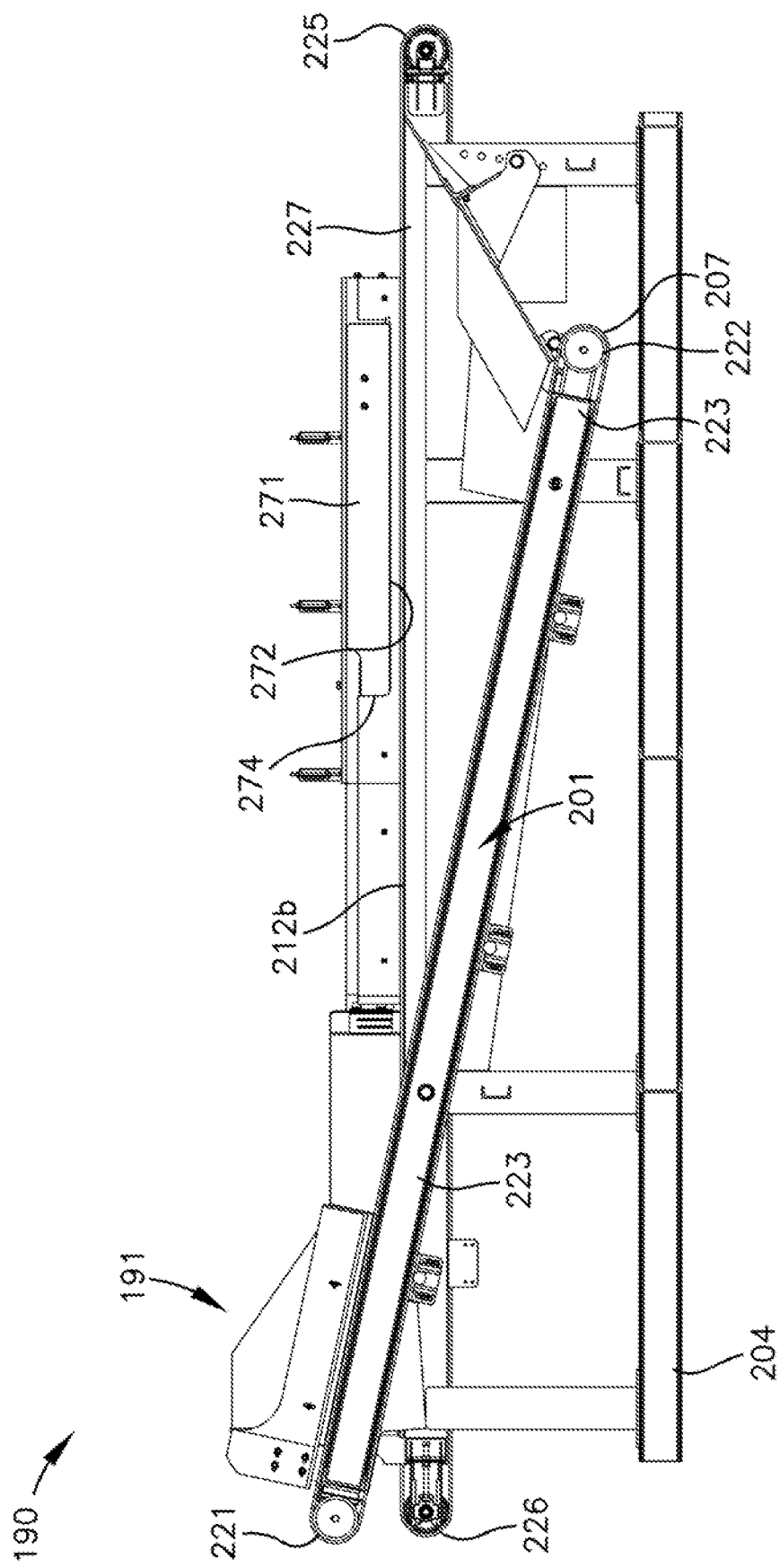
FIG. 13 is a left, side elevational view of a rail tie plate singulating assembly shown separated from the rail tie plate distribution machine as shown in FIG. 11.
Figure 14:
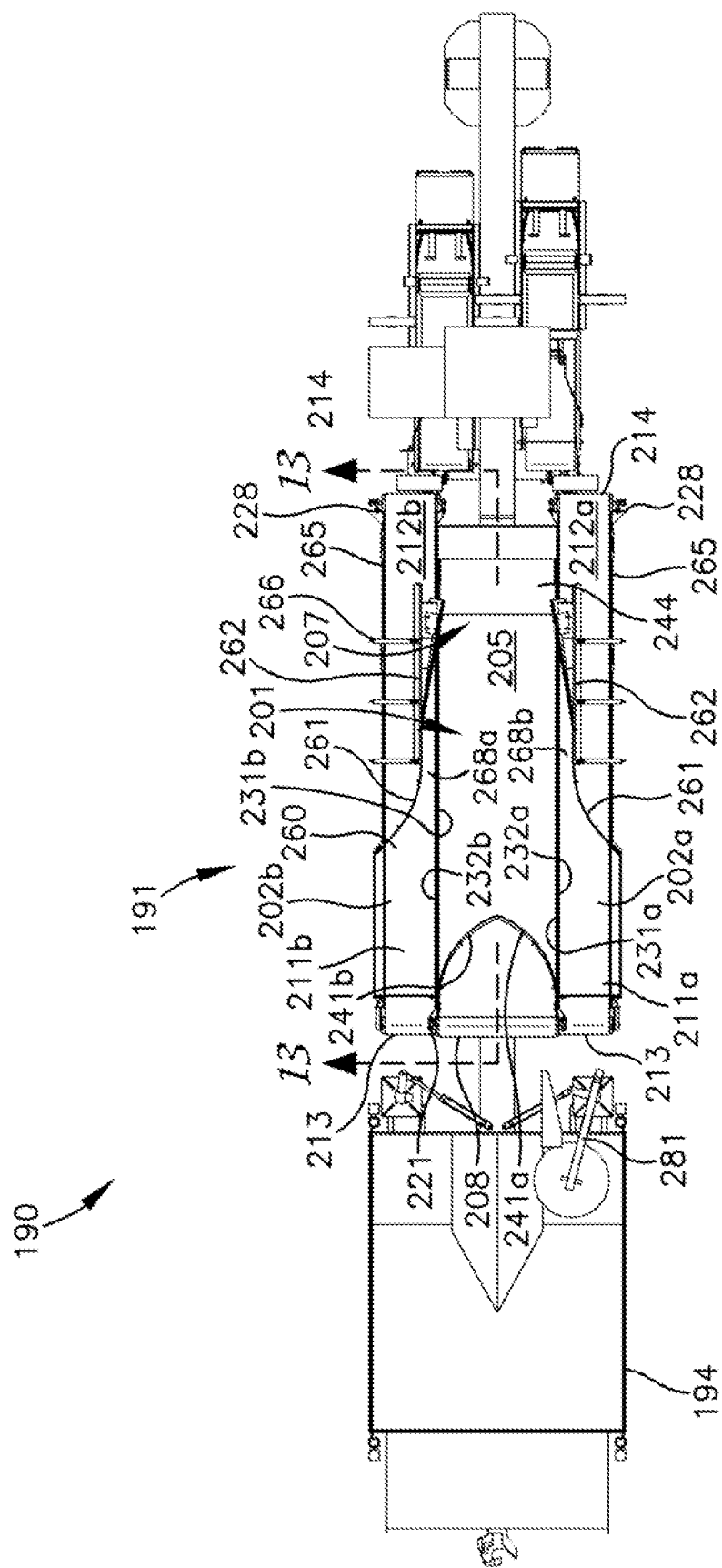
FIG. 14 is a top plan view of the rail tie plate distribution machine as in FIG. 11.
Figure 15:
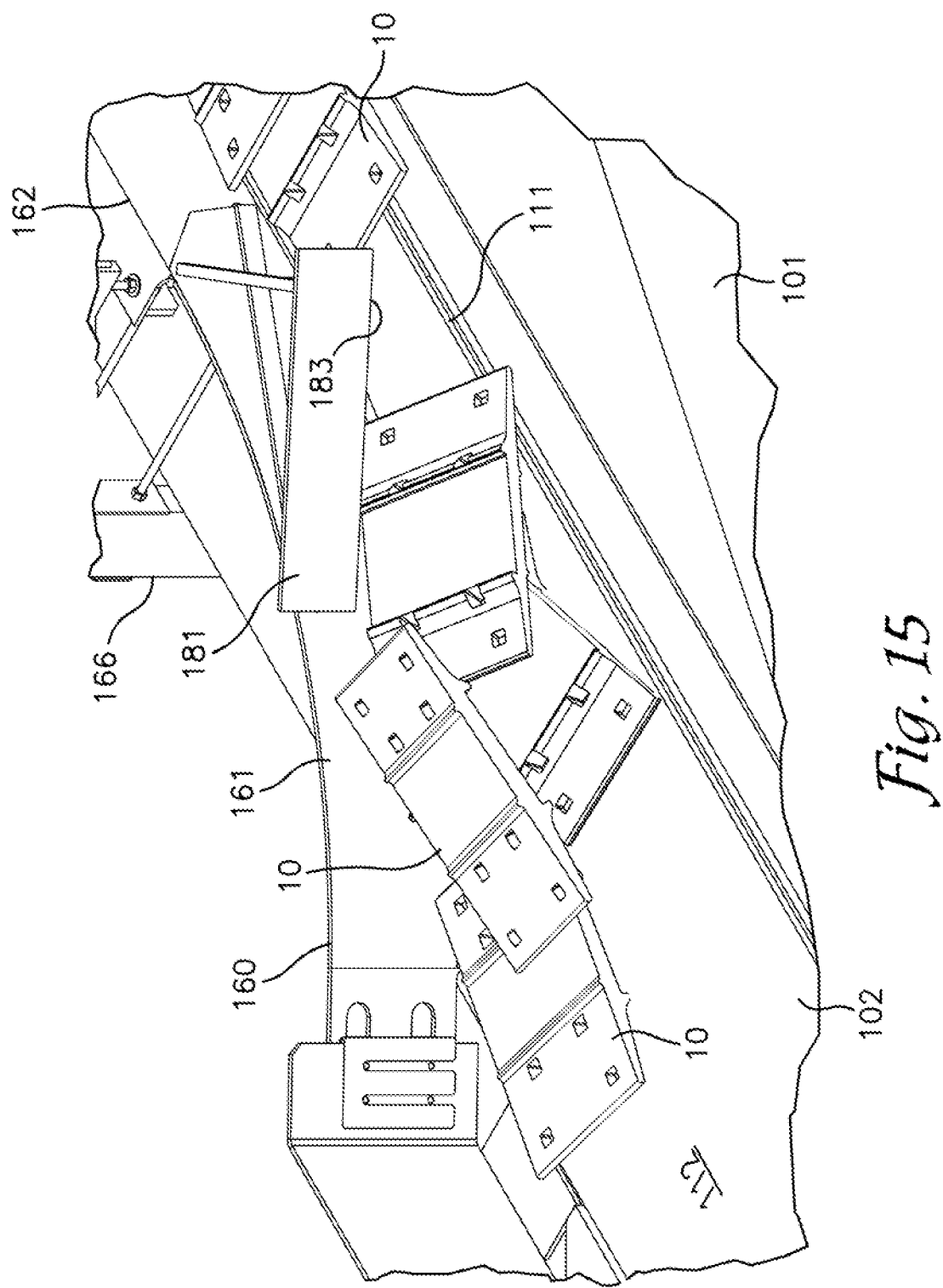
FIG. 15 is an enlarged and fragmentary perspective view of the rail tie plate singulating assembly shown in FIG. 7 with a plurality of rail tie plates advancing along a singulating conveyor toward a tie plate deflector.
Figure 16:
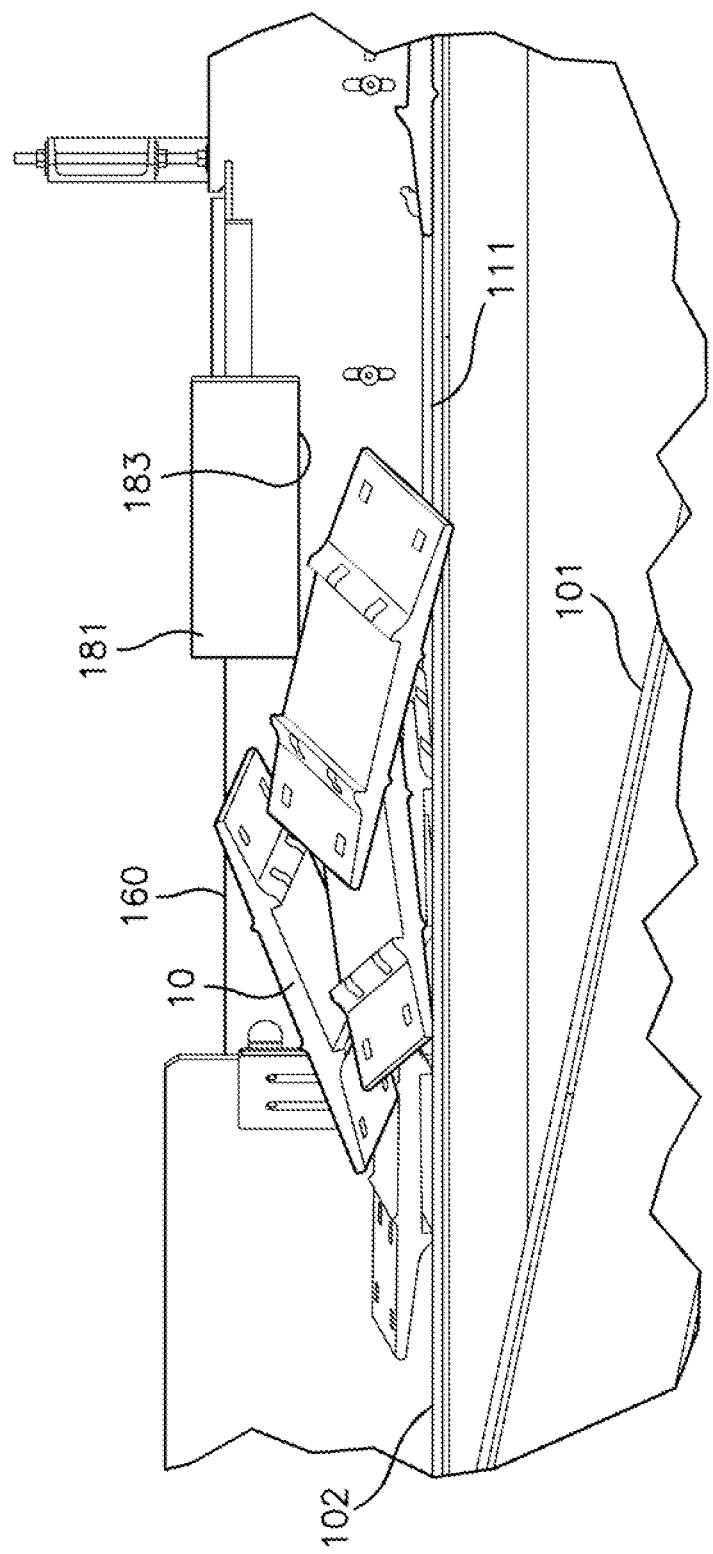
FIG. 16 is an enlarged and fragmentary elevational view of the rail tie plate singulating assembly as in FIG. 15 showing the plurality of rail tie plates advancing on the singulating conveyor toward the tie plate deflector.

In the embodiment shown, an axis of rotation of the plate engaging roller 171, which may be referred to as the roller axis RA (see FIG. 9), extends in a vertical plane which extends parallel to the longitudinal direction of conveyance of a rail tie plate 10 through the reduced width conveying section 168 of singulating conveyor 102. The roller axis RA is angled upward relative to an upper surface of the singulating conveyor run 112 at an acute angle in the direction opposite the direction of conveyance of the singulating conveyor run 112. A lower edge of the plate engaging roller 171 is thereby angled toward the direction from which the rail tie plates 10 are advanced by the singulating conveyor 102 into the roller 171 which may be referred to as from the upstream direction. In the embodiment shown the angle at which the roller axis RA extends relative to upper surface of the singulating conveyor run 112 is approximately twenty-five degrees but it is foreseen that a wide range of angles may be suitable including from approximately fifteen to forty-five degrees. As shown in an alternative embodiment in FIGS. 13 and 14 described hereafter it is foreseen that the redirecting means could alternatively be formed as a fixed structure in the nature of a finger or guide plate having a lower edge spaced above the upper surface of the singulating conveyor run 112 a distance greater than the height of a single rail tie plate 10 but less than the height of two rail tie plates 10 stacked on top of each other. The finger or guide plate might be angled away from the second section 162 of the singulating guide 160 and toward the lift conveyor in the direction of conveyance of the singulating conveyor run 112.

Referring again to FIGS. 7-9, 15 and 16, a tie plate deflector 181 is shown mounted over the singulating conveyor run 112 just prior to its advancement across the reduced width conveying section 168. The tie plate deflector 181 is mounted on the first guide section 161 of the singulating guide 160 approximately medially between the first and second ends thereof. The tie plate deflector 181 generally comprises a rectangular shaped panel extending from the first guide section 161 to and past the singulating conveyor inner edge 131 at an obtuse angle relative to the direction of conveyance of the singulating conveyor 102. A bottom or lower edge 183 of the tie plate deflector 181 is spaced above the singulating conveyor run 112 a distance just shorter than the width of a rail tie plate 10 so that the tie plate deflector 181 will knock down any tie plates 10 standing on edge that are advanced into the tie plate deflector 181. The tie plate deflector 181 also functions to knock down or knock off of the singulating conveyor 102 any relatively large stackings of rail tie plates 10 which might otherwise become lodged or wedged between the roller drive motor 173 and the singulating conveyor 102.

Rail tie plates 10 may be fed into the rail tie plate singulating assembly 40 by a variety of means and sources, including a crane 53 with an electromagnetic head 55 for transferring rail tie plates 10 from a separate hopper or pile into the funnel 143 and onto the lift conveyor 101 at the inlet end 107 therein. Rail tie plates 10 singulated by the singulating assembly 200 may be transferred off of the outlet end 114 of the singulating conveyor 102 to additional equipment or systems such as the rail tie plate distribution assembly 45 discussed previously for further handling and placement of the rail tie plates 10. Such equipment or systems may be selected to distribute or position the singulated rail tie plates at a specific location and in a specific orientation. The rail tie plate singulating assembly 40 could be used at a fixed location for singulating rail tie plates for further handling.

Referring to FIGS. 10-14 an alternative embodiment of a rail tie plate distribution machine 190 is shown having a modified rail tie plate singulating assembly 191 mounted on a trailer frame 192 between a bin 194 and a rail tie plate orienting and distribution assembly 196. The rail tie plate singulating assembly includes a lift conveyor 201 and first and second singulating conveyors 202a and 202b mounted on the trailer frame 192 on opposite sides of the lift conveyor 201. A feed conveyor assembly 203 mounted to the trailer frame 192 and above the lift conveyor 201 conveys rail tie plates 10 lifted from the bin 194 onto a first end of the feed conveyor assembly 203 to a second end thereof where they drop onto a lift conveyor run 205 of a lift conveyor belt 206 at an inlet end 207 thereof.

The rail tie plate singulating assembly 200 as shown in FIGS. 10-14, includes the lift conveyor 201 and first and second singulating conveyors 202a and 202b mounted adjacent to and on opposite sides of the lift conveyor 201 on a singulator sub-frame 204. The upper run or lift conveyor run 205 of the lift conveyor belt 206 slopes upward in a direction of conveyance from the inlet end 207 of the lift conveyor 201 to a distal end 208 thereof. In the embodiment shown, each of the singulating conveyors 202a and 202b includes a singulating conveyor belt 211a and 211b with an upper, singulating conveyor run 212a and 212b extending generally horizontally and having a direction of conveyance opposite from the direction of conveyance of the lift conveyor 201. Each singulating conveyor belt 211a and 211b and singulating conveyor run 212a and 212b extends from a distal end 213 of each singulating conveyor 202a and 202b to an outlet end 214 thereof.

The lift conveyor 201 and singulating conveyors 202a and 202b are supported on and above the trailer frame 192 by the singulator sub-frame 204. In the embodiment shown, each of the lift conveyor 201 and the singulating conveyors 202a and 202b are belt type conveyors. The lift conveyor belt 206 extends around a drive roller 221 and an idler roller 222 mounted on a lift conveyor frame 223. The lift conveyor drive roller 221a and 221b may be driven by a motor (not shown), such as a hydraulic motor, coupled to an axle for the lift conveyor drive roller 221. The singulating conveyor belt 211a and 211b of each of the singulating conveyors 202a and 202b extends around a drive roller 225 and a driven roller 226 (see FIG. 13) mounted on a singulating conveyor frame 227. The drive roller 225 for each singulating conveyor 202 is driven by a motor 228, such as a hydraulic motor, coupled to an axle of the respective singulating conveyor drive roller 225.

The distal end 208 of the lift conveyor 201 may be the driven end of the lift conveyor 201 and the outlet end 214 of each of the singulating conveyors 202a and 202b may be the driven end of the singulating conveyors 202a and 202b. The lift conveyor run 205 extends below each singulating conveyor run 212a and 212b from the lift conveyor inlet end 207 to a y-axis intercept 229 between the lift conveyor run 205 and the singulating conveyor runs 212a and 212b of each singulating conveyor 202a and 202b. The lift conveyor run 205 extends above the singulating conveyor runs 212a and 212b from the y-axis intercept 229 to each lift conveyor distal end 208. In the embodiment shown, the lift conveyor 201 and lift conveyor run 205 slope upward from the inlet end 207 to the distal end 208 at an angle of approximately thirty degrees. It is foreseen that the slope of the lift conveyor 201 and lift conveyor run 205 could vary including between fifteen and forty-five degrees. It is foreseen that between the y-axis intercept 229 and the distal end 208 of the lift conveyor run 205, the lift conveyor run 205 could extend horizontally and in planar alignment with or level with the adjacent singulating conveyor run 212a and 212b.

In the embodiment shown, each of the singulating conveyors 202a and 202b has a singulating conveyor inner edge 231a and 231b extending longitudinally and adjacent an adjacent edge 232a and 232b of the lift conveyor 201. Lift conveyor transfer guides 241a and 241b extend in spaced relation above the lift conveyor run 205 in a spacing less than the height of a rail tie plate 10 supported on the lift conveyor run 205 so that a rail tie plate 10 will not pass under the lift conveyor transfer guides 241a and 241b. Each of the lift conveyor transfer guides 241a and 241b extends from a first position spaced inward and medially between the outer or adjacent edges 232a and 232b of the lift conveyor 201, and proximate or past the y-axis intercept 229, toward the respective adjacent edge 232a and 232b of the lift conveyor 201 adjacent the inner edge 231 of the respective first or second singulating conveyors 202a and 202b and toward the distal end 208 of the lift conveyor 201. The lift conveyor transfer guides are configured such that at least some of the rail tie plates 10 advanced up the lift conveyor run 205 engage the lift conveyor transfer guide 241a and some of the rail tie plates engage the lift conveyor transfer guide 241b and are guided laterally toward and onto the respective, adjacent singulating conveyor runs 212a and 212b and past the respective y-axis intercept 229.

A funnel 243, formed from an inlet panel 244 and side panels 245 connected to the singulator sub-frame 204, is mounted at the inlet end 207 of the lift conveyor 201. The inlet panels 244 slope downward toward the inlet end 207 of the lift conveyor 201 to guide or direct rail tie plates 10 discharged onto the inlet panel 244 onto the lift conveyor 201 and prevent the rail tie plates 10 from falling off the inlet end 207 of the inlet conveyor 201. Sidewalls 247 may also be mounted to the singulator sub-frame 204 below each singulating conveyor 202a and 202b along the inner edge 231 thereof and past the respective outer, adjacent edge 232a and 232b of the lift conveyor 201 to prevent rail tie plates 10 from falling off the respective outer, adjacent edges 232a and 232b of lift conveyor 201 below the singulating conveyor 202a or 202b. A deflector strip (not shown but similar to deflector strip 148 in FIG. 7) is mounted on each singulating conveyor 202a and 202b along the inner edge 231 thereof in closely spaced relation forward of the y-axis intercept 229 in the direction of conveyance of the respective singulating conveyor run 212a and 212b. Each deflector strip covers the gap between the singulating conveyor frame 227 and the respective singulating conveyor belt 211a and 211b to prevent an edge of a rail tie plate 10 advancing up the lift conveyor run 205 from advancing between the conveyor frame 227 and the conveyor belt 211a or 211b of the respective singulating conveyor 202a or 202b proximate the y-axis intercept 229.

With reference to each singulating conveyor 202a and 202b, an end wall 251 is connected to the singulator sub-frame 204 to extend across the distal end 213 of the respective singulating conveyor 202a and 202b. A sidewall 253 connected to singulator sub-frame 204 extends along an outer edge 255 of the respective singulating conveyor 202a and 202b from the end wall 251 to a position past the y-axis intercept 229. The end wall 251 and sidewall 253 of each singulating conveyor 202a and 202b prevent rail tie plates 10 from advancing off of the respective singulating conveyor 202a and 202b.

A singulating guide 260 having a first guide section 261 and a second guide section 262 is connected to the singulator sub-frame 204 and extends in spaced relation above each first singulating conveyor run 212a and 212b in a spacing less than the height of a rail tie plate 10 supported on the respective first singulating conveyor run 212a and 212b. The first guide section 261 extends in a direction of conveyance of the singulating conveyor 202a and 202b from a position at an outer edge or outer side 265 of the singulating conveyor run 212a and 212b and past the y-axis intercept 229 toward the outlet end 214 of the singulating conveyor 202a and 202b while sloping or curving toward the singulating conveyor inner edge 231a and 231b. A second end of the first guide section 261 of the singulating guide 260 terminates at or proximate a first end of the second section 262 of the singulating guide 260. The second end of the first guide section 261 and the second guide section 262 are mounted on a support frame 266 connected to the singulator sub-frame 204 and extend over the singulating conveyor run 212a and 212b.

The second section 262 of the singulating guide 260 extends parallel to and spaced outward from the singulating conveyor inner edge 231a and 231b a distance approximately equal to or narrower than a width of a rail tie plate 10 to form a reduced width conveying section 268a and 268b on the singulating conveyor runs 212a and 212b respectively. The second section 262 of the singulating guide 260 extends from its first end toward the outlet end 214 of the singulating conveyor 202a or 202b. At least some of the rail tie plates 10 advanced onto the singulating conveyor 202a or 202b from the lift conveyor 201 are guided by the singulating guide 260 into longitudinal alignment with the direction of conveyance on the reduced width conveying section 268a and 268b. Rail tie plates 10 which are not advanced into longitudinal alignment on the reduced width conveying section 268a and 268b are advanced off of the singulating conveyor 202a or 202b past the y-axis intercept 229 in the conveying direction and fall onto the lift conveyor 201.

A knockdown panel 271 is supported on the support frame 166 over each reduced width conveying section 268a and 268b such that a lower edge 272 of the knockdown panel 271 is spaced higher than the height of a rail tie plate 10 supported generally flat on the singulating conveyor run 212a and 212b but lower than the height of two rail tie plates 10 stacked on top of each other or a rail tie plate 10 standing on edge. A leading end 274 of the knockdown panel 271 is positioned adjacent the singulating guide 260 and angles away from the second section 262 of the singulating guide 260 and toward the lift conveyor 201 in the direction of conveyance of the singulating conveyor run 212a and 212b. Portions of a rail tie plate 10 extending above the lower edge 272 of the knockdown panel 271 will be engaged by the knockdown panel 271 as the tie plate 10 is advanced into the knockdown panel 271 redirecting the tie plate 10 engaged by the knockdown panel laterally off of the reduced width conveying section 268a or 268b of the singulating conveyor 202a or 202b and onto the lift conveyor 201. In the embodiment shown, the leading end 274 of the knockdown panel 271 is shown positioned adjacent the second section 262 of the singulating guide 260 proximate the first end thereof. It is foreseen that the leading end 274 of the knockdown panel 271 could be positioned against different portions of the singulating guide 260 including proximate the transition from the first section 261 to the second section 262 of the singulating guide 260. For example, the knockdown panel 271 could be mounted to extend generally tangential to a curve of the first section 261 of the singulating guide 260.

In the embodiment shown in FIGS. 10-14, the bin 194 is mounted on the trailer frame 192 adjacent the distal end 208 of the lift conveyor 201 and the distal end 213 of each singulating conveyor 202a and 202b. Rail tie plates 10 to be singulated are loaded into the bin 194 from a separate source such as by a separate magnetic attachment on a material loader retrieving the rail tie plates 10 from gondola cars 36. Cranes 281, with magnetic heads 282, mounted on the trailer frame 192 can be used for loading the bin 194 with rail tie plates 10 or unloading tie plates 10 from the bin 194 and onto the first end of the feed conveyor assembly 203.

The feed conveyor assembly 203 includes a feed conveyor frame 284 connected to and mounted on the trailer frame 192, a feed conveyor 286 supported on the feed conveyor frame 284 and a ramp 288 mounted on the feed conveyor frame 284 at the discharge end of the feed conveyor 286. The feed conveyor 286 may be a driven belt type conveyor or a sloped roller type conveyor assembly by which tie plates 10 deposited on the rollers roll by gravity to the discharge end, or other suitable conveyor. A discharge end of the ramp 288 is positioned over the inlet end 107 of the lift conveyor 101 so that rail tie plates 10 conveyed off the discharge end of the feed conveyor 286 slide down the ramp 288 and fall into and through the funnel 243 and onto the lift conveyor 201.

The embodiment shown, includes two hoists or cranes 281 mounted on the trailer frame 192 on opposite sides of the feed conveyor assembly 203 and adjacent a front end of the bin 194. The cranes 281 may be remotely operated to pivot over the bin 194 and lower the electromagnetic head 282 into close proximity to tie plates 10 stored in the bin 194. Energization of the electromagnetic head 282 draws and secures a plurality of tie plates 10 to the electromagnetic head 282. The electromagnetic head 282 is then pivoted over the feed conveyor 286 and de-energized so that the attached tie plates 10 fall onto the feed conveyor 286 to be fed to the discharge end thereof to fall onto the inlet end 207 of the lift conveyor 201.

With reference to the embodiment shown in FIGS. 1-14, the rail tie plate orientation and distribution assembly 196 is mounted on a distributor sub-frame 291 connected to and supported on the trailer frame 192 proximate the outlet end 214 of the first and second singulating conveyors 202a and 202b. The rail tie plate orientation and distribution assembly 196 may include scanners (not shown) for determining the orientation of the rail tie plate 10 advancing off each singulating conveyor 202a and 202b and a system of conveyors, ramps, chutes or assemblies for rotating and flipping each singulated rail tie 10 as needed to place the rail tie plate 10 in a proper orientation for depositing on a cross tie 12. The rail tie plate orientation and distribution assembly 196 further includes at least one and preferably two aggregator ramps or assemblies (not shown) on which a plurality of properly oriented rail tie plates 10 may be aggregated prior to discharge onto a cross tie 12.

It is foreseen that the rail tie plate singulating assemblies 40 could be used in a variety of applications including vehicle mounted or stationary applications.

Figure 19:
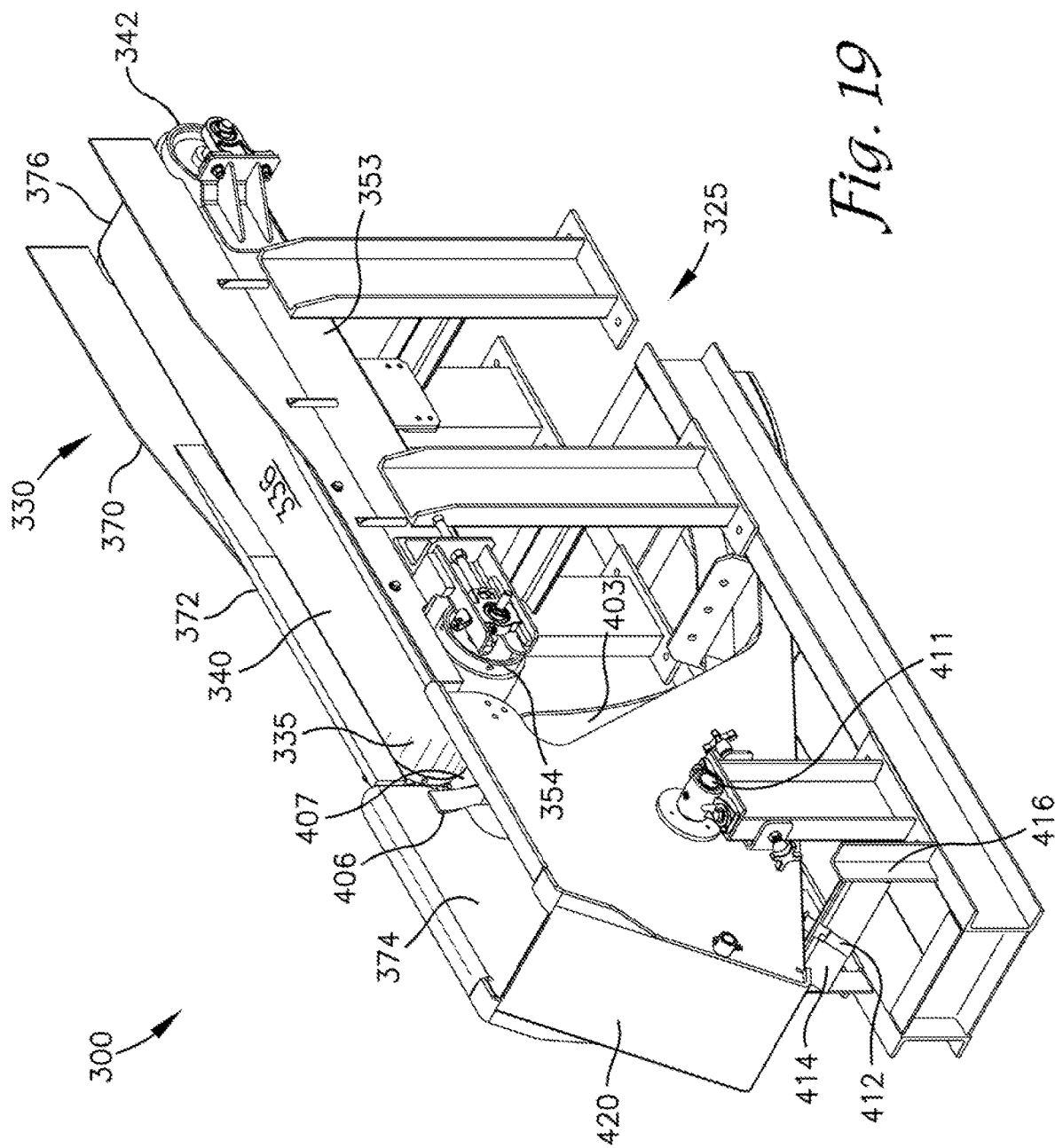
FIG. 19 is a top perspective view of a rail tie plate flipping assembly shown separated from the rail car and including a rail tie plate flipping frame supporting the assembly.
Figure 20A:
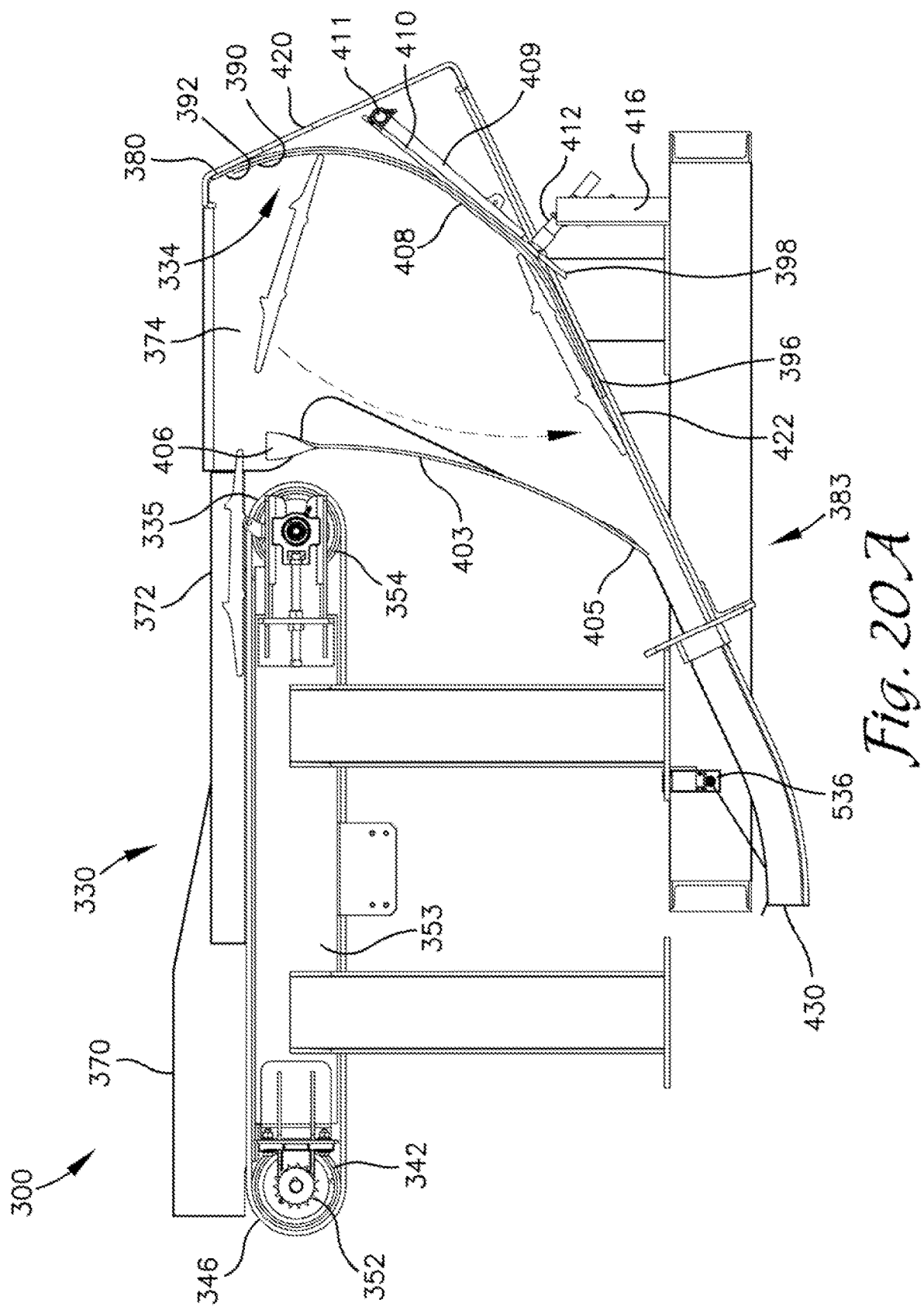
FIG. 20A is a right, side elevational view of the rail tie plate flipping assembly of FIG. 19, with portions removed to show detail therein, and schematically showing an approximate trajectory of a rail tie plate in a shoulder-side up orientation that is launched from a launch conveyor toward a dampening slide and remaining in the shoulder-side up orientation.
Figure 20B:
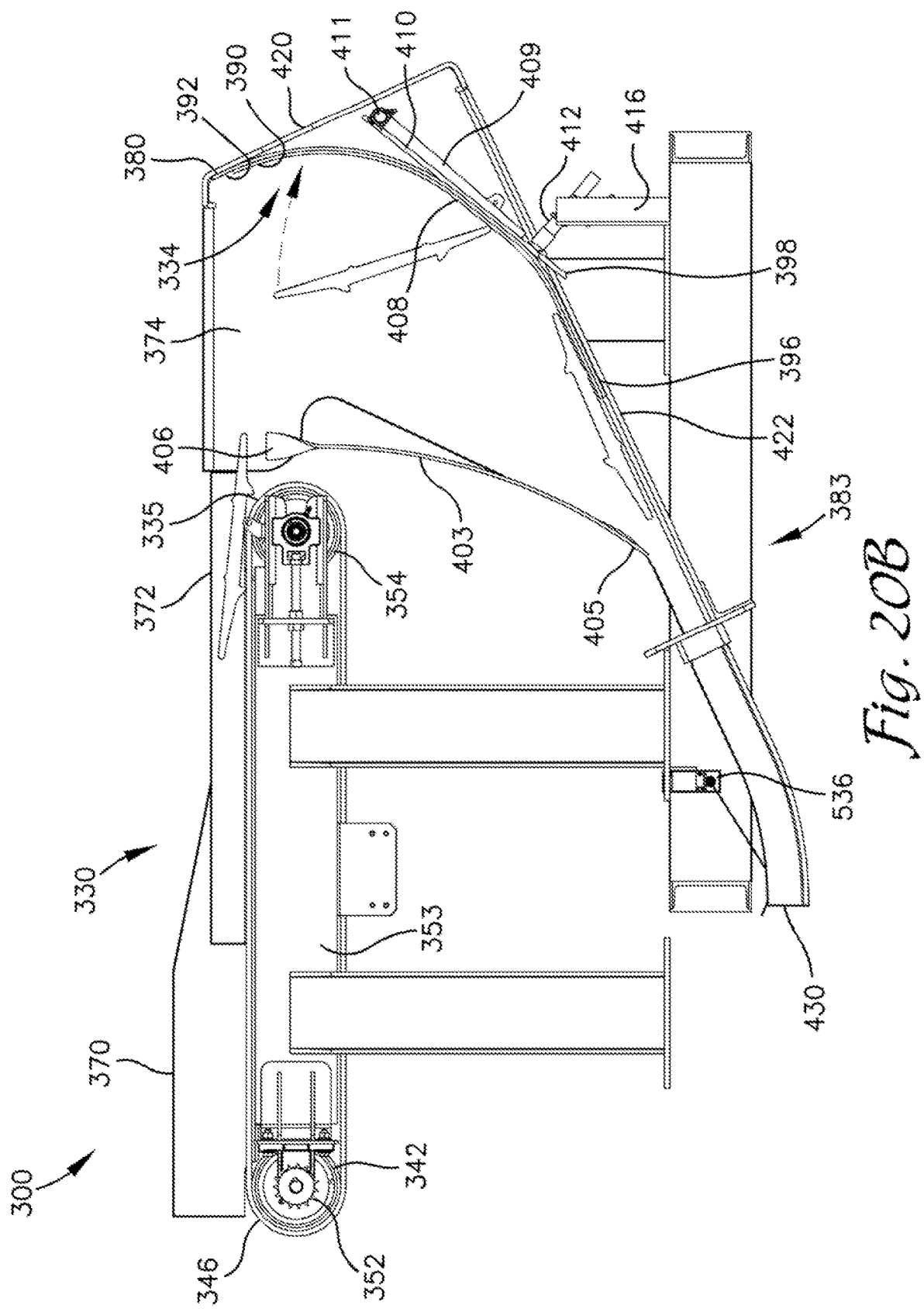
FIG. 20B is a view similar to FIG. 20A, schematically showing an approximate trajectory of a rail tie plate received in a shoulder-side down orientation that is launched from the launch conveyor toward the dampening slide with the rail tie plate flipping into a shoulder-side up orientation.
Figure 21:
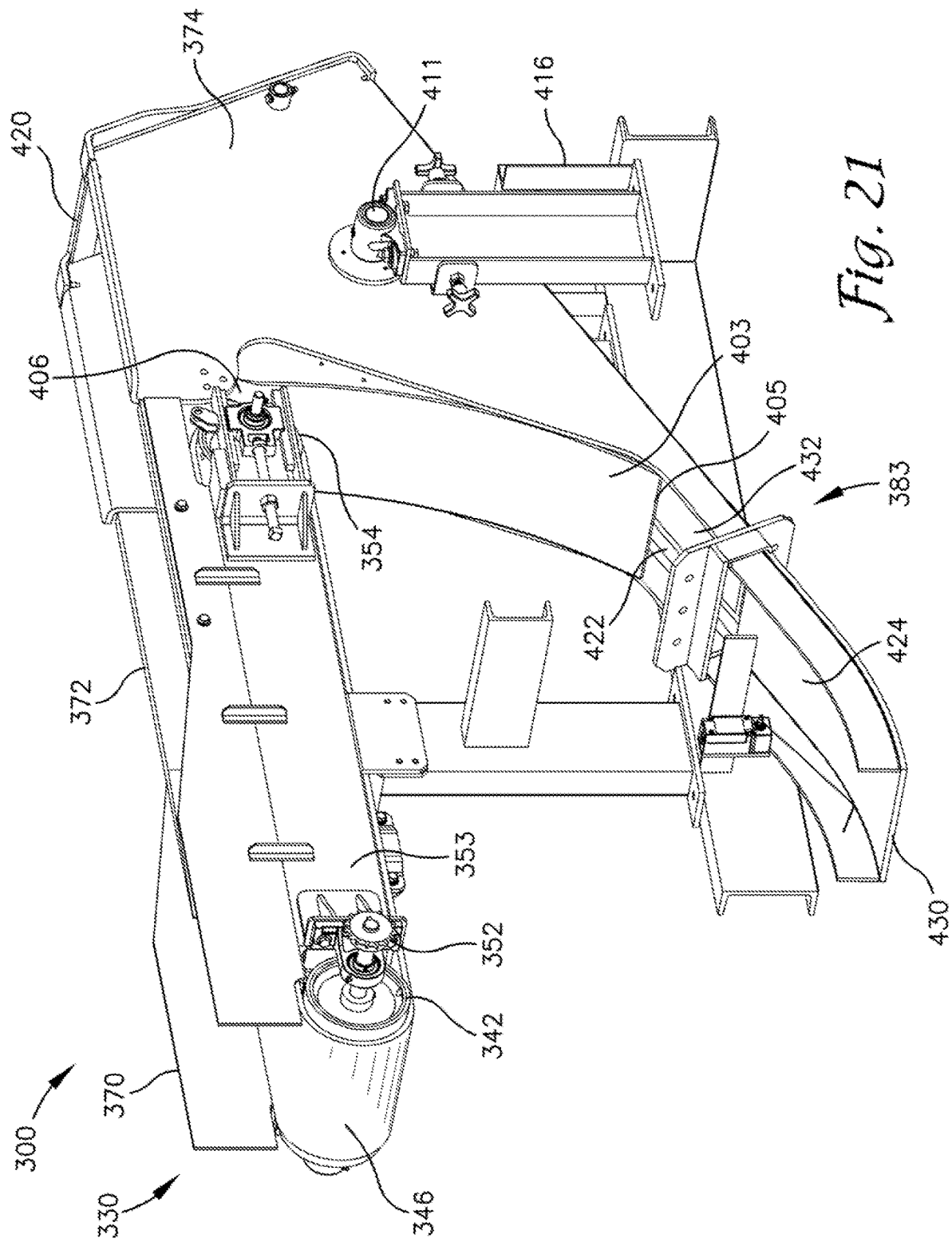
FIG. 21 is a perspective view of the rail tie plate flipping assembly of FIG. 19, with portions of the flipping frame supporting the assembly removed.
Figure 22:
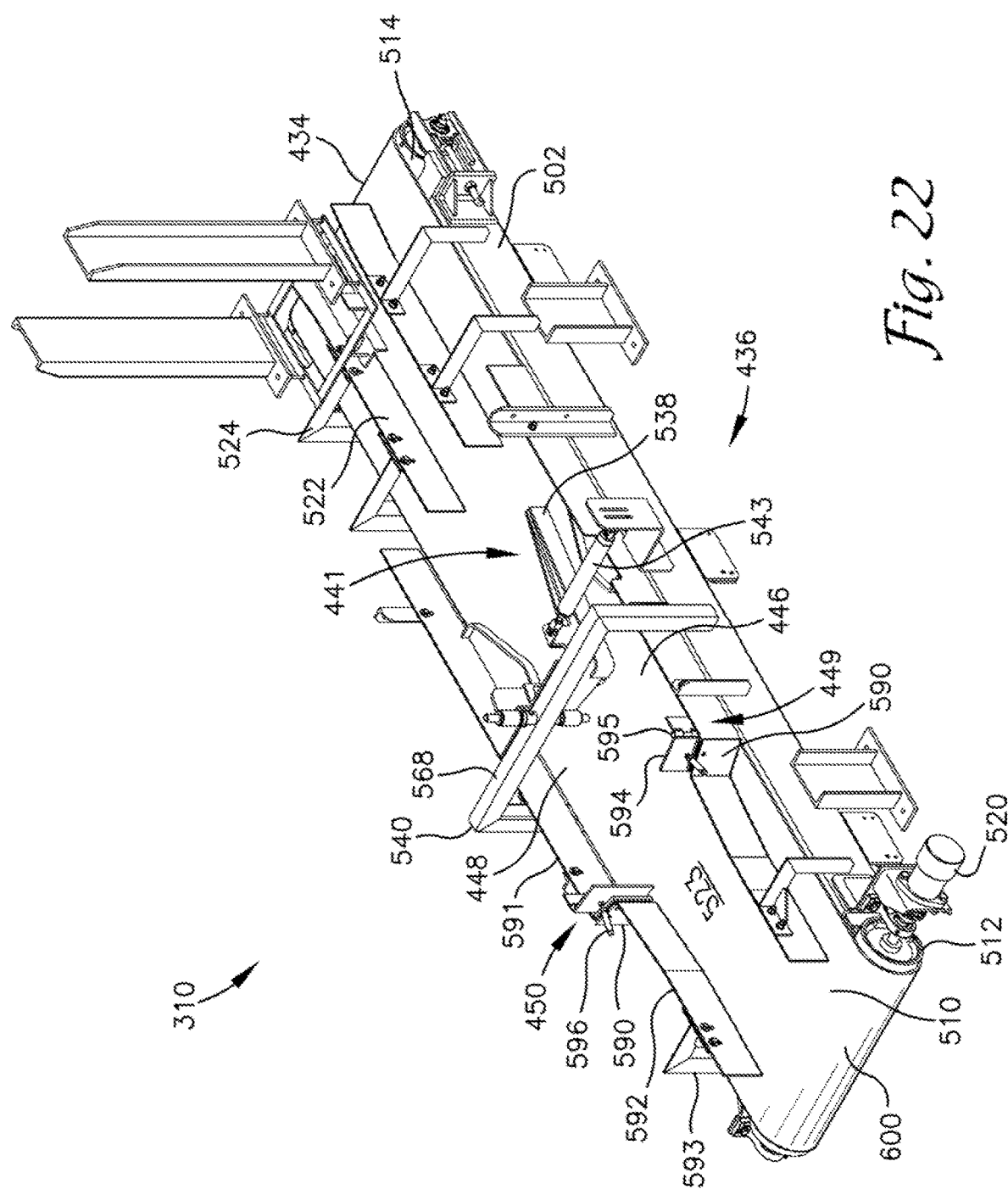
FIG. 22 is a top, perspective view of a rail tie plate quarter turn assembly separated from the rail car.
Figure 23:
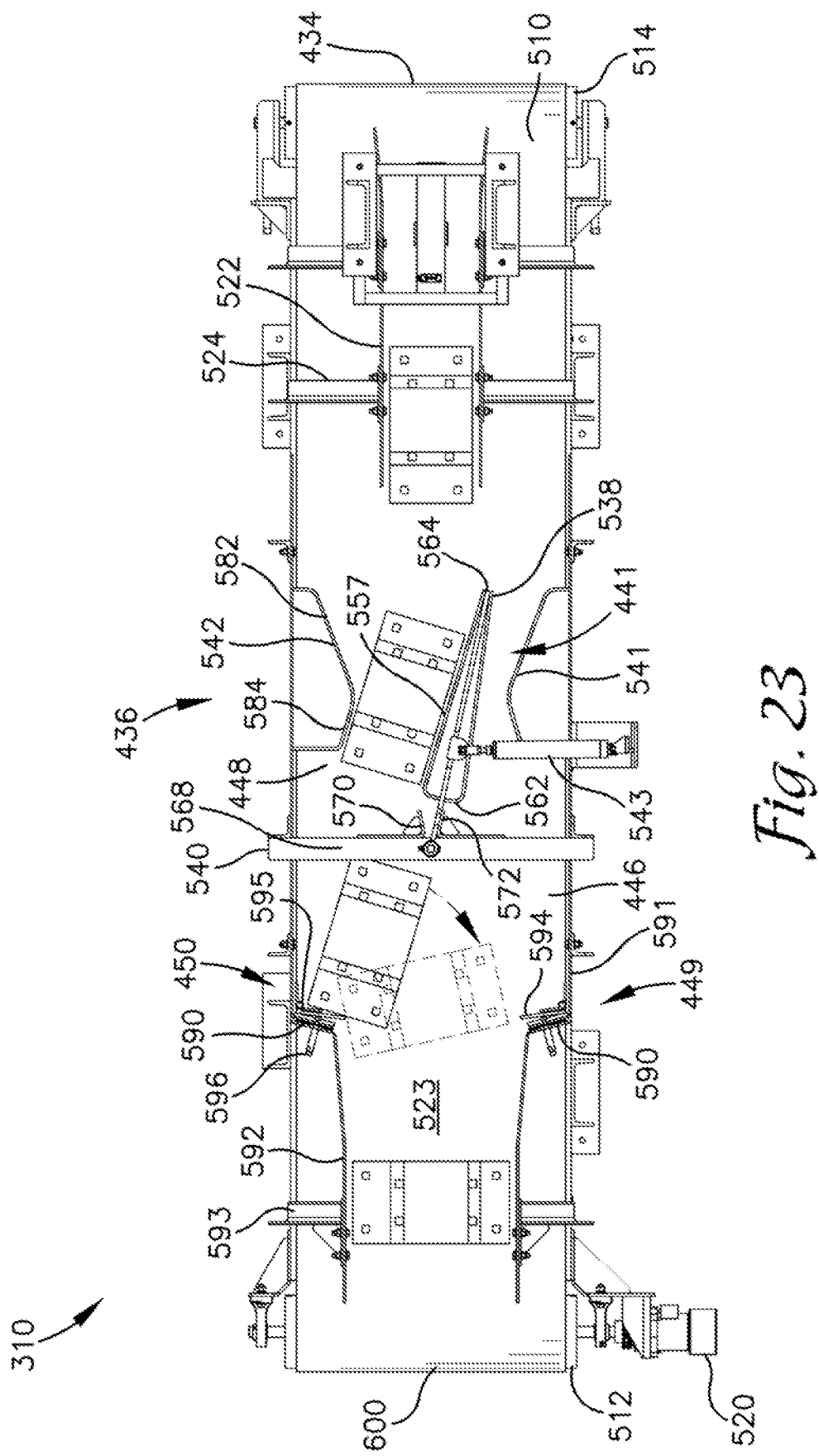
FIG. 23 is a top plan view of the rail tie plate quarter turn assembly of FIG. 22 schematically showing a path of a rail tie plate as it is conveyed through the rail tie plate quarter turn assembly from a longitudinally aligned orientation at an inlet end, past a diverter and an abutment that cooperate to cause the rail tie plate to rotate into a transverse alignment or lateral orientation.
Figure 24:
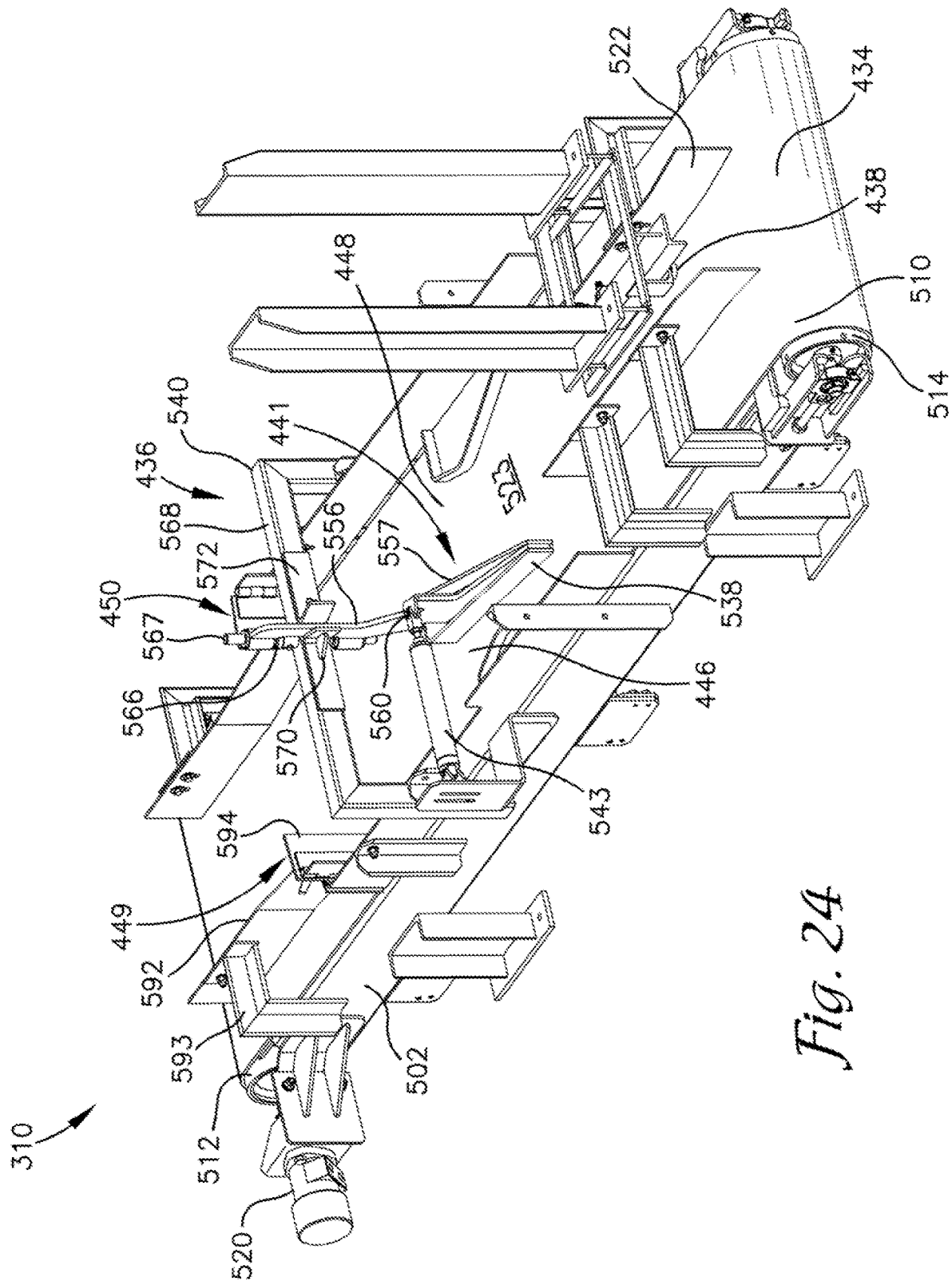
FIG. 24 is a perspective view of the rail tie plate quarter turn assembly of FIG. 22.

Referring now to FIGS. 19-33, one embodiment of the rail tie plate orientation and distribution assembly 45 is shown and includes a tie plate flipping assembly 300 as shown in FIGS. 19-21, a tie plate quarter turn assembly 310 as shown in FIGS. 22-24, and a tie plate distribution assembly 320 as shown in FIGS. 25-33. In the following description, the rail tie plate orientation and distribution assembly 45 will be described as oriented with respect to the rail tie plate distribution machine 20 in FIGS. 3-6

The tie plate flipping assembly 300 is positioned adjacent to and downstream of the outlet end 114 of the reduced width conveying section 168 on the singulating conveyor run 112 described above. In the embodiment shown, the tie plate flipping assembly 300 is mounted on a flipping assembly frame 325, which is mounted to the trailer platform 67 and the trailer frame 27, adjacent the bin 51. As shown in FIGS. 19, 20 and 21, the tie plate flipping assembly 300 includes a tie plate launch conveyor 330 and a dampening slide 334 extending in longitudinally spaced relation from a discharge end 335 of the launch conveyor 330. Separate tie plate flipping assemblies 300 could be utilized with each singulating conveyor run 212a and 212b in the embodiment of the rail tie plate distribution machine 190 shown in FIGS. 14-18.

The launch conveyor 330 is positioned to receive the longitudinally aligned rail tie plates 10 from the singulating conveyor 102 on a generally horizontally oriented launch conveyor run or upper run 336. The singulating conveyor 102 may also be referred to as a feed conveyor 102 for feeding rail tie plates to the launch conveyor 330. In the embodiment shown, the launch conveyor 330 is a belt type conveyor having a launch conveyor belt 340 driven by a drive roller 342 located at an inlet end 346 of the launch conveyor 330. The drive roller 342 for the launch conveyor 330 is coupled to the drive roller 125 of the singulating conveyor 102 by a roller or drive chain (not shown). The drive chain extends around and engages a drive sprocket (not shown) on the singulating conveyor drive roller 125 and a driven sprocket 352 coupled to the launch conveyor drive roller 342. In a preferred embodiment, the driven sprocket 352 on the launch conveyor drive roller 342 is smaller than the drive sprocket 350 on the singulating conveyor drive roller 125.

A rate of revolution of the smaller driven sprocket 352 is inversely proportional to a radius of the smaller driven sprocket 352 relative to the larger drive sprocket 350, such that the smaller the radius of the smaller driven sprocket 352 as compared to the larger drive sprocket 350, the greater the number of revolutions the smaller driven sprocket 352 makes with each revolution of the larger drive sprocket 350 increasing the speed of the launch conveyor 330 relative to the singulating conveyor 102. In effect, the rail tie plates 10 accelerate in speed when advanced from the singulating conveyor 102 to the launch conveyor 330. In one embodiment, the launch conveyor belt 340 moves at approximately twice the speed of the singulating conveyor belt 111. In one embodiment, a rail tie plate 10 is advanced on the launch conveyor 330 at a speed of between approximately 250 feet per minute to approximately 350 feet per minute. The speed of the launch conveyor 330 relative to the singulating conveyor 102 may be adjusted to create a desired separation or spacing between the rail tie plates 10 launched off of the launch conveyor 330.

The launch conveyor 330 is mounted on a launch conveyor frame 353. Launch conveyor belt 340 extends around the drive roller 342 at an inlet end 346 of the launch conveyor 330 and a driven roller 354 at the discharge end 335 of launch conveyor 330. The inlet end 346 of the launch conveyor 330 is longitudinally aligned with the outlet end 114 of the singulating conveyor 102 in the direction of conveyance and is positioned such that the launch conveyor run 336 is just lower that the singulating conveyor run 112, such that as the rail tie plate 10 is advanced from the singulating conveyor run 112 to the launch conveyor run 336, a leading edge of the longitudinally aligned and singulated rail tie plate 10 drops down onto the launch conveyor run 336 followed by a trailing edge of the rail tie plate 10. The width of the launch conveyor run 336 is preferably slightly wider than the width of the rail tie plate 10 sitting generally flush or horizontally and longitudinally aligned on the launch conveyor run 336.

Rail tie plate conveyor guards 370 extend along a first section of both sides of the launch conveyor 330 to maintain alignment of the rail tie plates 10 as they drop onto and accelerate on the launch conveyor 330 and prevent the rail tie plates 10 from shifting or falling from the launch conveyor 330. Rail tie plate conveyor guard extension members 372 may extend along a second section of both sides of the launch conveyor 330, bridging the first section having the conveyor guards 370 to dampening slide side walls 374 that extend beyond the launch conveyor 330 and along both sides of the dampening slide 334. The conveyor guards 370 and the conveyor guard extension members 372 may progressively narrow to square up or align the rail tie plates 10 as they advance toward the dampening slide 334.

Rail tie plates 10 exiting the singulating conveyor 102 may be oriented right-side or shoulder-side up or right-side or shoulder-side down relative to the singulating conveyor run 120. In a shoulder-side up orientation, the bottom surface 14 of the tie plate 10 is supported on or faces the singulating conveyor run 120 and the shoulders 15 and 16 extend or face upwards. In a shoulder-side down orientation, the shoulders 15 and 16 are oriented facing downward toward the singulating conveyor run 120 and the bottom surface 14 of the tie plate 10 faces upwards. Rail tie plates 10 exiting the singulating conveyor 102 may also be oriented with the short end 18 or the long end 19 as the leading end as the tie plate 10 exits the singulating conveyor 102. The four expected orientations of tie plates 10 exiting the singulating conveyor 102 comprise, shoulder-side up with the short end 18 as the leading end, shoulder-side up with the long end 19 as the leading end, shoulder-side down with the short end 18 as the leading end or shoulder-side down with the long end 19 as the leading end.

As shown generally schematically in FIGS. 20A and 20B, the longitudinally aligned rail tie plates 10 are advanced from the singulating conveyor 102 by the launch conveyor 330 toward the dampening slide 334 at a speed and a spacing that result in the shoulder-side down rail tie plates 10 flipping or rotating forward approximately one hundred and eighty degrees into a shoulder-side up orientation (See FIG. 20B), and the shoulder-side up rail tie plates 10 remaining in the same orientation with a leading end of the tie plate 10 bouncing off of the dampening slide 334 with the tie plate 10 changing direction longitudinally while remaining in the shoulder-side up orientation, prior to sliding down the dampening slide 334 (See FIG. 20A). Factors that contribute to orienting the rail tie plates 10 right-side up include: the geometry of the tie plate 10, a speed of the launch conveyor belt 340, a distance from the launch conveyor 330 to the dampening slide 334, and an angle, slope or curvature of the dampening slide 334. With reference to FIG. 20B, it is understood that as rail tie plates 10 positioned on the launch conveyor 330 in a shoulder-side down orientation reach the discharge end 335 of the launch conveyor 330, the greater distance that the leading end of the tie plate 10 drops as the shoulder 15 or 16 drops off the discharge end 335 of the conveyor than a tie plate 10 oriented shoulder-side up, and the lower center of mass of the leading end of the tie plate 10 in the shoulder-side down orientation, imparts a greater rotational momentum on a shoulder-side down tie plate 10 exiting the launch conveyor 330 than a shoulder-side up tie plate 10. The greater rotational momentum imparted on the shoulder-side down oriented tie plates is sufficient to cause the leading end of the shoulder-side down tie plate 10 to rotate closer to approximately ninety degrees below horizontal before the leading end hits the dampening slide 334, with the angular momentum causing the trailing end of the shoulder-side down tie plate 10 to continue to rotate away from the launch conveyor and toward the dampening slide 334 (as shown by the dashed line arrow in FIG. 20B) until the trailing end has advanced past vertical and the bottom surface 14 of the tie plate 10 is advanced against the dampening slide 334 which results in the leading end of the tie plate 10 sliding down the dampening slide 334 forward of the trailing end with the tie plate 10 flipped over into a shoulder-side up orientation. For rail tie plates 10 launched off the launch conveyor 330 in a shoulder-side up orientation, the downward, rotational momentum imparted on the leading end of the rail tie plates 10 as they hit the dampening slide 334 is lower and overcome by the force of gravity acting on the rail tie plates 10 which pulls the rail tie plates downward while remaining in the shoulder-side up orientation.

An upper section 380 of the dampening slide 334 is spaced apart from the discharge end 335 of the launch conveyor 330 and extends approximately level or slightly above the launch conveyor run 336. The dampening slide 334 curves or slopes downward and rearward (relative to the direction of advancement of rail tie plates off of the launch conveyor 330) toward a flipping assembly outlet section 383 which extends under the discharge end 335 of the launch conveyor 330. In the embodiment shown, the rail tie plates 10 advance from the dampening slide 334 to the outlet section 383, advancing in a direction opposite the direction of conveyance of the launch conveyor 330.

The dampening slide 334 includes a resilient strip 390 overlying a dampening lining or dampening layer 392, both of which extend from the upper section 380 to the lower section 396 of the dampening slide 334 which curves or slopes toward the outlet section 383. The dampening lining 392 absorbs the force or impact of each of the rail tie plates 10 as they are launched off the launch conveyor 330, minimizing rebound or bounce of each of the rail tie plates 10 after it impacts the dampening slide 334. The dampening lining 392 may be formed from a rubber or conveyor belt material that would be known to one skilled in the art. The resilient strip 390, which may also be referred to a resilient layer or resilient cover 390 provides a resilient, smooth surface on which the rail tie plates 10 slide without getting stuck due to friction or adherence and may be formed from an ultra-high molecular weight plastic or polyethylene with properties including high abrasion resistance and wear resistance. The resilient layer 390 may also be applied as a coating to the dampening layer 392. It is foreseeable that the dampening slide 334 could be formed from one or more other layers of material. The lower section 396 of the dampening slide 334 may be secured to or supported on a rigid support panel or paddle 398 supporting the lower section 396 of the dampening slide 334. The dampening slide 334 may be connected to or supported by another support structure to prevent curling of the dampening slide 334 or movement thereof.

A vertically extending guard flap or curtain 403 extends downward, unanchored at a lower end 405, from adjacent the discharge end 335 of the launch conveyor 330 to just above the rail tie plate flipping assembly outlet section 383. The guard flap 403 extends between and is fastened to each of the dampening slide side walls 374. In the embodiment shown, fastening members or projections 406 are formed on and extend upward on each side of a rail tie plate recess 407 and are fastened to the dampening slide side wall 374 on each side of the launch conveyor 330. The rail tie plate recess 407 is formed in the guard flap 403 such that the guard flap 403 does not interfere with a trajectory of the rail tie plates 10 advancing from the launch conveyor 330. After the rail tie plate 10 is launched off the launch conveyor 330 and impacts the dampening slide 334, some rail tie plates 10, particularly rail tie plates 10 launched off of the launch conveyor 330 in a shoulder-side up orientation, may impact or bounce into and then bounce off of the guard flap 403. The guard flap 403 remediates or prevents any rail tie plates 10 bouncing off of the dampening slide 334 from over rotating out of a shoulder-side up orientation. The rail tie plates 10 then advance under the guard flap 403. The guard flap 403 may be formed from a heavy, resilient rubber or plastic material, such as conveyor belt material or another foreseeable material.

Figure 3:
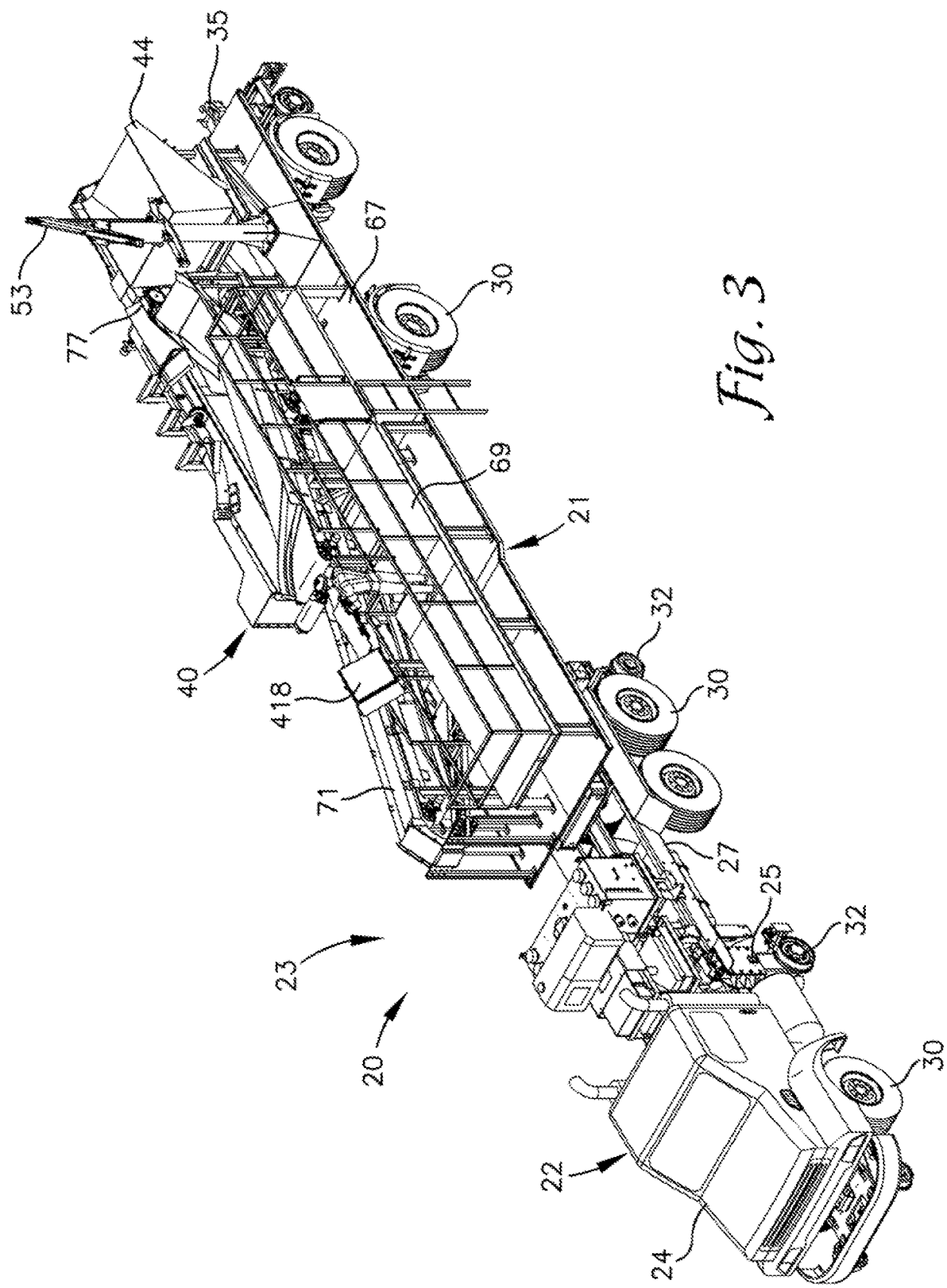
FIG. 3 is a front, perspective view of a rail tie plate distribution machine including a bin for storing tie plates, a rail tie plate singulating assembly and a rail tie plate distribution assembly mounted on a trailer frame of a trailer and connected to a tractor for towing the trailer.
Figure 4:
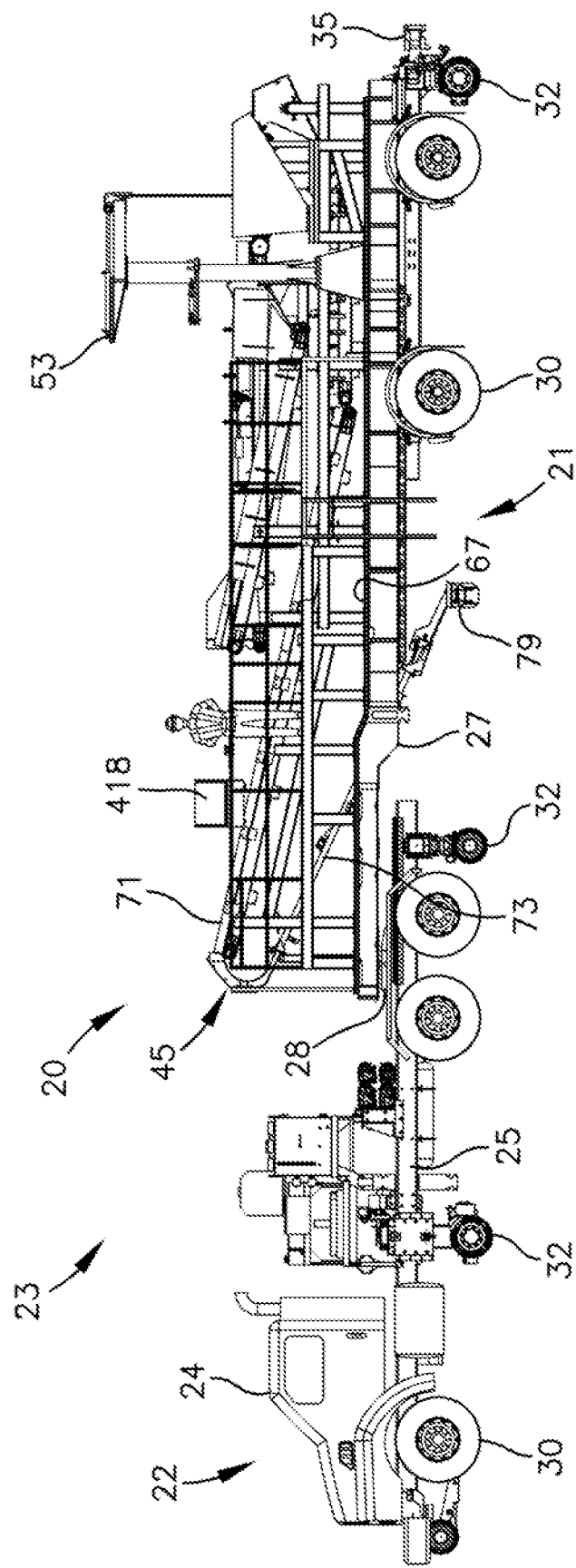
FIG. 4 is a right, side elevational view of the rail tie plate distribution machine.

The angle of the lower section 396 of the dampening slide 334 complements the trajectory of the rail tie plates 10 as they are flipped or as they slide down the dampening slide 334 such that the rail tie plates 10 remain in the shoulder-side up orientation and do not continue to rotate. The adjustable paddle 398 supports a middle section 408 of the dampening slide 334 and is adjustably positionable to adjust or optimize the angle of the dampening slide 334. The adjustable paddle 398 includes a longitudinally extending paddle underframe 409 that supports a paddle board 410 on which the dampening slide 334 is supported. The adjustable paddle 398 is rotatably or pivotably supported on an upper end by a paddle shaft or support member 411 that extends through the dampening slide side walls 374. As shown in the embodiment, the paddle board 410 is supported at a lower end by an actuator 412 that extends through a transverse support 414 secured between upwardly extending frame portions 416 secured to the rail tie plate flipping frame 325. The angle of the adjustable paddle 398 is adjusted by extension and retraction of the actuator 412. Actuator 412 may be controlled by a controller 418 preferably located on the rail tie plate distribution machine 20 and preferably at a position easily accessible by an operator as generally shown in FIGS. 3-5.

The dampening slide side walls 374 extend from each side of the launch conveyor 330 to at least the dampening slide 334. In the embodiment shown, the side walls 374 extend to the dampening slide end wall 420 such that the adjustable paddle 398 and the paddle support member 411 are enclosed between the side walls 374 and the end wall 420. The side walls 374 are positioned on each side of the dampening slide 334 with a distance between the side walls 374 slightly wider than the dampening slide 334 to help maintain the rail tie plates 10 in the desired longitudinal alignment within the rail tie plate flipping assembly 300. Inwardly extending flanges or rails 422 formed on or extending from an angled bottom edge of the side walls 374 support the lower section 396 of the dampening slide 334, below or after the adjustable paddle 398, and extend to the rail tie plate flipping assembly outlet section 383. In one embodiment, the rail tie plates 10 in a shoulder-side up alignment slide from the dampening slide 334 onto a lower slide surface 424 that extends between the flanges 422 from the end of the dampening slide 334 to an outlet 430 of the rail tie plate flipping assembly 300. In another embodiment a gap 432 extends between the dampening slide 334 and the lower slide surface 424. The rail tie plates 10 slide from the dampening slide 334 onto the inwardly extending flanges 422 of the gap 432 such that improperly aligned rail tie plates 10 fall through the gap 432. Properly aligned rail tie plates 10 slide along the flanges 422 to the lower slide surface 424 and then advance through the outlet 430 of the rail tie plate flipping assembly 300 and to an inlet end 434 of the rail plate quarter turn assembly 310.

In the embodiment shown if FIGS. 22, 23 and 24, the tie plate quarter turn assembly 310 includes a quarter turn conveyor 436 which conveys rail tie plates 10 received from the flipping assembly 300 in a shoulder-side up, longitudinally extending orientation past a profile scanner or sensor 438, which communicates with controller or processor 418, for determining the longitudinal orientation of the tie plate 10, into and past a diverter 441 for redirecting and rotating the rail tie plates 10 to advance toward one side or either side 446 and 448 of the quarter turn conveyor 436 at an acute angle relative thereto and into a pivot inducing abutment 449 or 450 on opposite sides 446 and 448 of the quarter turn conveyor 436. Advancement of a portion of the leading edge of the rail tie plate 10 into the abutment 449 or 450 causes the rail tie plate 10 to further rotate into a transverse alignment relative to the direction of conveyance on the quarter turn conveyor 436 or approximately 90 degrees from the original longitudinal orientation.

The outlet 430 of the rail tie plate flipping assembly 300 extends toward and aligns with an inlet end 434 of the quarter turn conveyor 436. In the embodiment shown, the rail tie plate quarter turn assembly 310 extends under the launch conveyor 330 and the singulating conveyor 102 in a horizontal alignment generally parallel to the singulating conveyor 102 and the direction of conveyance of the quarter turn conveyor 436 is generally opposite the direction of conveyance of the singulating conveyor 102 and the launch conveyor 330.

The quarter turn conveyor 436 is supported on a quarter turn conveyor frame 502 which, in the embodiment shown, is mounted to the trailer platform 67 on the trailer frame 27 and extends under the rail tie plate flipping frame 325 and the singulating conveyor frame 127. The quarter turn conveyor 436 may be a belt type conveyor having a quarter turn conveyor belt 510 extending around a drive roller 512 and a driven roller 514. The drive roller 512 may be driven by a motor 520, such as a hydraulic motor, coupled to an axle of the quarter turn conveyor drive roller 512. In the embodiment shown, a distal end of the quarter turn conveyor 436 is the drive end of the quarter turn conveyor 436.

Guide walls 522 extend just above an upper run 523 of the quarter turn conveyor 436 between the inlet end 434 of the quarter turn conveyor 436 and the diverter 441. The guide walls 522 are supported above the quarter turn conveyor upper run 523 on a support frame 524 connected to the quarter turn conveyor frame 502. Bottom edges of the guide walls 522 are spaced just above the upper run 523 a height or distance less than the height of a single rail tie plate 10 sitting generally flush or horizontal on the quarter turn conveyor upper run 523. The guide walls 522 are laterally spaced apart a distance slightly greater than a width of a rail tie plate 10. The guide walls 522 extend in generally parallel spaced relation except for ends thereof proximate the inlet end 434 of the quarter turn conveyor 436 which are outwardly flared. The outwardly flared ends of guide walls 522 funnel rail tie plates 10 exiting the dampening slide 334 to advance longitudinally between the otherwise parallel extending guide walls 522 and into the path of the diverter 441 at the opposite end thereof.

In the embodiment shown, the profile scanner 438, which may be a proximity sensor, is mounted on the guide wall support frame 524 over the quarter turn conveyor upper run 523, between the guide walls 522 and proximate the inlet end 434 of the quarter turn conveyor 436. A triggering sensor 536, which may be a presence type sensor in communication with controller 418, is shown in FIG. 20A positioned at the rail tie plate flipping assembly outlet section 383 to detect each of the rail tie plates 10 as each tie plate 10 advances across the lower slide surface 424 to the inlet end 434 of the quarter turn conveyor 436. The sensor 536 activates the profile scanner 438 after a selected time, to take one or more readings and can be used to determine the longitudinal orientation of shoulder-side up rail tie plates 10. In the embodiment shown, the proximity sensor 438 takes two readings, approximately 30 micro-seconds (µs) apart, as each rail tie plate 10 advances along the quarter turn conveyor upper run 523 to determine the profile, orientation or direction of the rail tie plate 10. In one embodiment, the two readings correspond to the portions of the rail tie plate 10 that are outside the shoulders 15 and 16 or toward the extremities of the rail tie plate 10 and a differential between the two readings is determinative of the orientation of the rail tie plate 10 including whether the short end 18 or the long end 19 is the leading end of the rail tie plate 10. In alternate embodiments, the time interval between the readings and/or the number of readings may vary depending on at least the length, profile, and speed of the rail tie plate 10 on the quarter turn conveyor 436.

The proximity sensor 438 transmits the data or information from the readings of each rail tie plate 10 to a controller 418 that controls the diverter 441 for directing the corresponding rail tie plate 10 toward either one of a left side 446 or a right side 448 of the quarter turn conveyor 436 and a corresponding left or right side rotation inducing abutment 449 or 450, depending on the orientation of the rail tie plate 10. As used herein, directional references to the tie plate quarter turn assembly 310 are with respect to a direction of conveyance of a rail tie plate 10 on the quarter turn conveyor 436 with the left side 446 of the conveyor 436 being on the left side of a tie plate 10 when viewed from above and the right side 448 being on the right side of the tie plate 10 when viewed from above. It is to be understood that separate controllers or a common controller may be used to control different systems and functions of the rail tie distribution machine 20.

In the embodiment shown, the diverter 441 is adapted to divert rail tie plates 10 toward either the left side or right side rotation inducing abutment 449 or 450 depending on whether the short end 18 or long end 19 is the leading end of the rail tie plate 10. Advancement of a tie plate 10 against the left side abutment 449 causes the tie plate to rotate counter-clockwise as the conveyor 436 conveys the tie plate 10 past the left side abutment 449. Advancement of a tie plate 10 against the right side abutment 450 causes the tie plate to rotate clockwise as the conveyor 436 conveys the tie plate 10 past the right side abutment 450.

The diverter 441 includes a paddle 538 rotatably mounted on a paddle support structure or frame 540 that extends over the quarter turn conveyor 436 and left and right guides or guide walls 541 and 542. A linear actuator 543, such as a pneumatic cylinder, is connected between the quarter turn conveyor frame 502 and the paddle 538 to pivot the paddle 538 laterally. Operation of the pneumatic cylinder 543 and the paddle 538 connected thereto is controlled by the controller 418 in communication with the proximity sensor 438. Based on the information from the readings of the rail tie plate 10 from the proximity sensor 438, the controller 418 determines whether a short end 18 or a long end 19 of the rail tie plate 10 is the leading edge. Depending on which end is the leading edge, the controller 418 selectively extends or retracts the pneumatic cylinder 543 to pivot the paddle 538 to either a first position or a second position respectively, to direct the rail tie plate 10 toward the left or right side rotation inducing abutment 449 or 450 in order to obtain a consistent orientation of the tie plates 10.

The paddle 538 includes an arm portion 556 that extends upward from a paddle body 557. An actuator mount 560 is formed on and extends upward from the paddle body 557 for connection of an end of the actuator 543 thereto. In the embodiment shown, the paddle body 557 is formed in a triangular shape that can be best described as an isosceles triangle with a smallest side or base 562 of the triangle facing in the direction of conveyance of the quarter turn conveyor 436 and a peak or vertex 564 pointed toward the incoming rail tie plates 10 or opposite the direction of conveyance.

The arm portion 556 extends upward from the paddle body 557 and is rotatably joined by bearings 566 to a shaft 567 extending above and below a crossbar 568 of the paddle support structure 540. First and second angled brackets 570 and 572 project from the crossbar 568 toward the inlet end 434 of quarter turn conveyor 436 to limit rotation of the paddle 538 relative to the paddle support structure 540. The paddle 538 is supported on the crossbar 568 such that the bottom edge of the paddle body 557 is spaced a distance less than the height of the rail tie plate 10 above the quarter turn conveyor run 523.

The guide walls 541 and 542 are connected to the quarter turn conveyor frame 502 and extend inward and over the upper run 523 of the quarter turn conveyor 436 at a spacing above the upper run 523 that is less than the height of a rail tie plate 10 extending above the upper run 523 of the quarter turn conveyor 436. Each guide wall 541 and 542 includes a first angled section 582 that angles inward toward a center of the quarter turn conveyor upper run 523 and creates a narrowing channel or funnel along with the rotation paddle 538 and a second angled section 584 that directs or guides each rail tie plate 10 toward the left or right rotation inducing abutment 449 or 450.

The left and right abutments 449 and 450 each include a shoulder 590 that is formed on and extends inwardly from a corresponding turning area wall 591 at an angle relative to the inside of the turning area wall 591 just greater than 90°. Each shoulder 590 is joined to a second guide wall 592 that extends approximately parallel to and in inwardly spaced relation from the quarter turn conveyor frame 502. Each second guide wall 592 is connected to the corresponding shoulder 590 and supported by at least one subframe support 593 that is secured to the quarter turn conveyor frame 502. The second guide walls 592 are spaced apart from each other a distance slightly greater than the length of the rail tie plate 10 such that a rail tie plate that has been rotated to extend transvers to the direction of conveyance can advance in alignment between the second guide walls 592. The shoulders 590 and the second guide walls 592 are supported above the quarter turn conveyor upper run 523 less than the height of a rail tie plate 10 sitting generally flush on the quarter turn conveyor run 523.

In the embodiment shown, an energy absorbing wall or compressible member 594 is positioned in front of each shoulder 590 and in the path of a portion of a leading edge of the rail tie plate 10 after it passes between the paddle 538 and the respective guide wall 541 or 542 to absorb the impact of the rail tie plate 10. In the embodiment shown, the energy absorbing wall 594 is formed as a leaf of a hinge pivotably secured to the turning area wall 591 on a hinge pin 595 upstream of each shoulder 590. The energy absorbing wall 594 extends from the hinge pin 595 toward the center of the quarter turn conveyor run 523, upstream of the shoulder 590 at an obtuse angle relative to the turning area wall 591 just greater than 90°, and an upstream facing surface of the energy absorbing wall 594 faces upstream toward the diverter 441. A shock absorber or dampener 596 extends behind the energy absorbing wall 594 to dampen or buffer the force of impact of the rail tie plate 10 as it advances into and against the energy absorbing wall 594 of the respective shoulder 590 to form the left and right rotation inducing abutments 449 and 450.

In an exemplary embodiment of the rail tie plate quarter turn assembly 310, after each rail tie plate 10 enters the inlet end 434 of the quarter turn assembly 310 the sensor 438 is triggered by sensor 536 to determine and communicate directional information of the rail tie plate 10 to the controller 418 indicative of whether the short end 18 or the long end 19 of the rail tie plate 10 is the leading end of the tie plate. The controller 418 directs the pneumatic cylinder 543 to extend or retract to pivot the paddle 538 between first or second positions depending on the sensed orientation of the tie plate 10 advancing toward the paddle 538. In a first position, the tip or apex of the paddle 538 is pivoted toward a left side of the quarter turn conveyor 436 opposite the right side of the conveyor 436 and abutment 450 toward which the rail tie plate 10 is to be directed. With the paddle 538 pivoted so that the paddle apex is pivoted toward the left side of the quarter turn conveyor 436, a rail tie plate 10 advancing between the angled paddle 538 and the right quarter turn guide wall 542 is diverted at an acute angle to advance toward the right rotation inducing abutment 450. With the paddle 538 pivoted so that the paddle apex is pivoted toward the right side of the quarter turn conveyor 436, a rail tie plate advancing between the angled paddle 538 and the left quarter turn guide wall 541 is diverted at an acute angle to advance toward the left rotation inducing abutment 449. When an outer portion of the leading edge of the rail tie plate 10 impacts the respective energy absorbing wall 594 of the left or right abutments 449 or 450, a trailing edge of the rail tie plate 10 rotates inward or toward the center of the quarter turn conveyor run 523 until the rail tie plate 10 is no longer contacting the abutments 449 or 450, such that the rail tie plate 10 extends transverse to the conveyor run 523. The transversely oriented tie plate 10 advances between the second guide walls 592 toward an outlet 600 of the rail tie plate quarter turn assembly 310.

In one application, if it is desired that the rail tie plates 10 exiting the quarter turn assembly 310 be oriented with the short end 18 of each tie plate 10 extending to the left side of the conveyor, the controller 418 is programmed to cause the actuator 543 to pivot the paddle 538 to direct rail tie plates 10 to the left abutment 449 if the readings from the sensor 438 indicate that the leading end of the tie plate 10 is the short end 18 and to pivot the paddle 538 to direct rail tie plates 10 toward the right abutment 450 if the readings from the sensor 438 indicate that the leading end of the tie plate 10 is the long end 19. If it is desired that the rail tie plates 10 exiting the quarter turn assembly 310 be oriented with the long end 19 of each tie plate 10 extending to the left side of the conveyor, the controller 418 is programmed to cause the actuator 543 to pivot the paddle 538 to direct rail tie plates 10 to the left abutment 449 if the readings from the sensor 438 indicate that the leading end of the tie plate 10 is the long end 19 and to pivot the paddle 538 to direct rail tie plates 10 toward the right abutment 450 if the readings from the sensor 438 indicate that the leading end of the tie plate 10 is the short end 18.

It is also foreseen that in some applications, the quarter turn assembly 310 could be operated without using a sensor 438 to determine the orientation of the tie plate 10 and the paddle 538 could be set to direct every tie plate 10 toward a single abutment 449 or 450 on one side of the quarter turn conveyor 436 and the orientation of the tie plates 10 could be determined at a later step in the process for determining how the tie plate 10 should be discharged from the system. For example, it is foreseen that approximately half of the rail tie plates 10 entering the quarter turn assembly 310 will be oriented with the short end 18 as the leading end and half with the long end 19 as the leading end. Directing each of the ties 10 against the right abutment 450 will result in approximately half of the tie plates 10 oriented with the short end 18 extending to the right side of the conveyor 436 and half with the long end 19 extending to the right side of the conveyor 436. Alternatively, directing each of the ties 10 against the left abutment 449 will result in approximately half of the tie plates 10 oriented with the short end 18 extending to the left side of the conveyor 436 and half with the long end 19 extending to the left side of the conveyor 436.

In one embodiment, as the rail tie plates 10 transition between the quarter turn conveyor run 523 and the rail tie plate distribution assembly 320 a squaring flap (not shown) extending from above the conveyor run 523 squares or lines up the rail tie plates prior to distribution.

Figure 25:
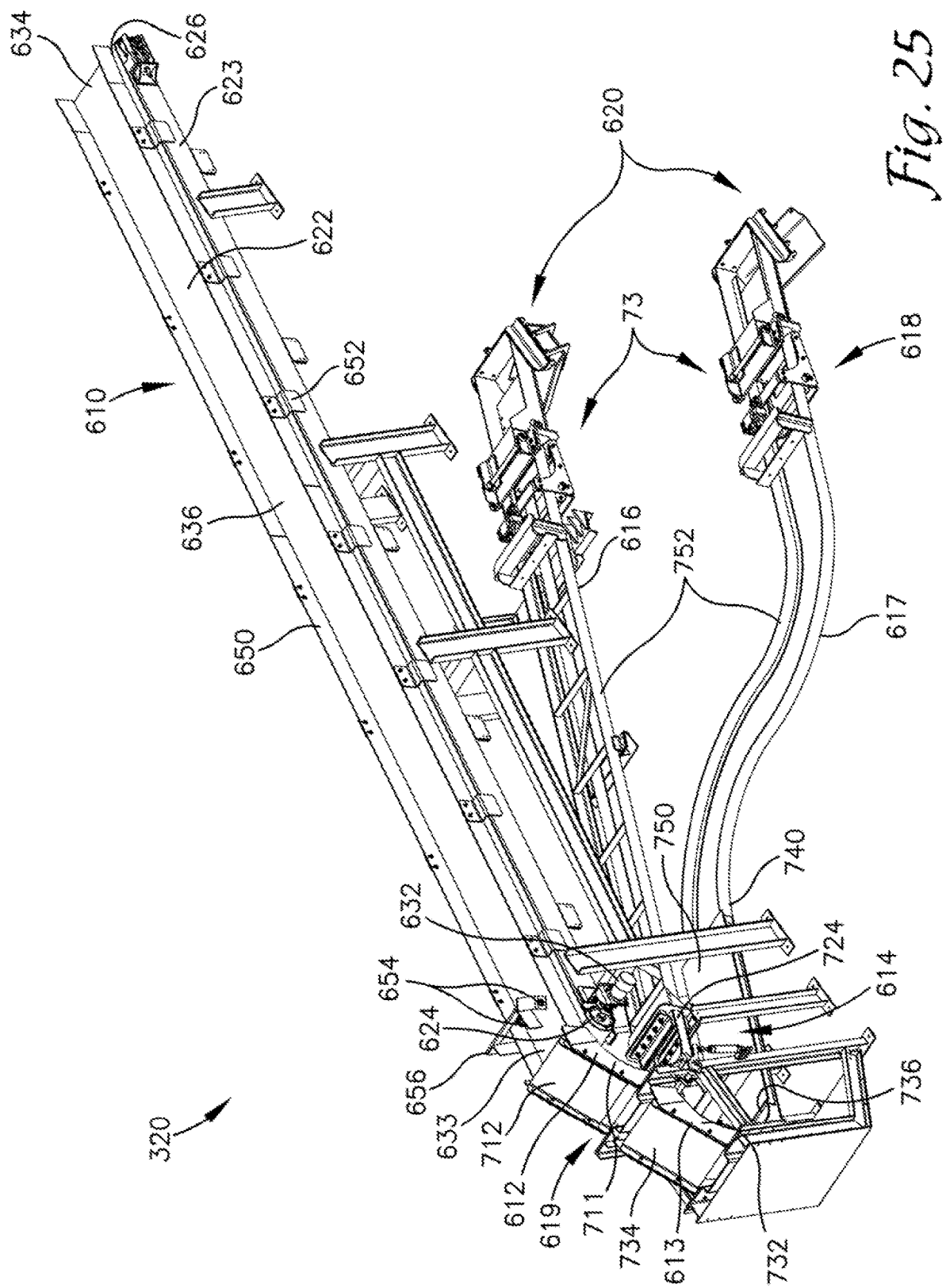
FIG. 25 is a top, perspective view of a rail tie plate distribution assembly.
Figure 26:
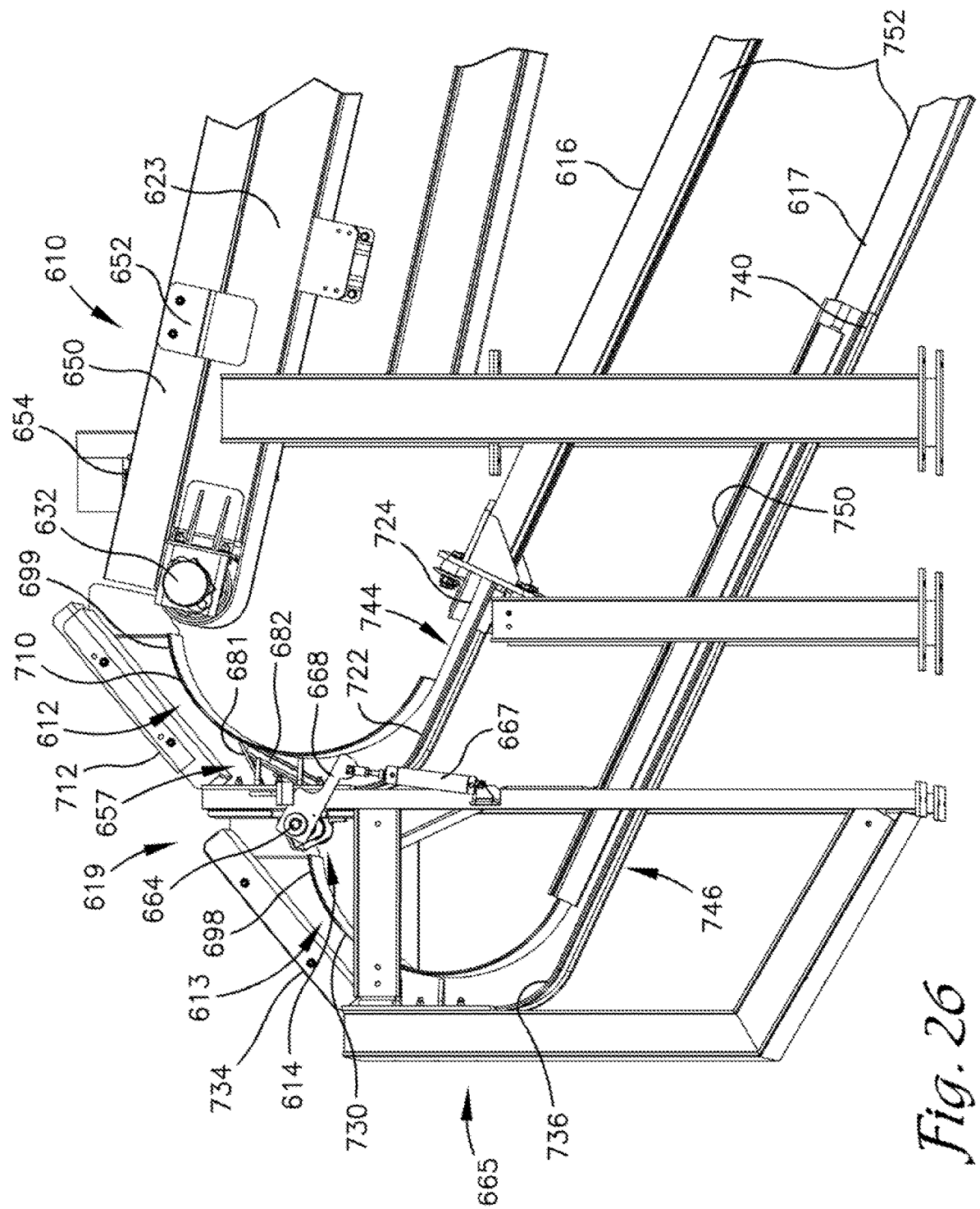
FIG. 26 is a side elevation view of a routing assembly of the distribution assembly, with portions broken away from the routing assembly as shown in FIG. 25 to show a first curved guide chute, a second curved guide chute, and a router.
Figure 27:
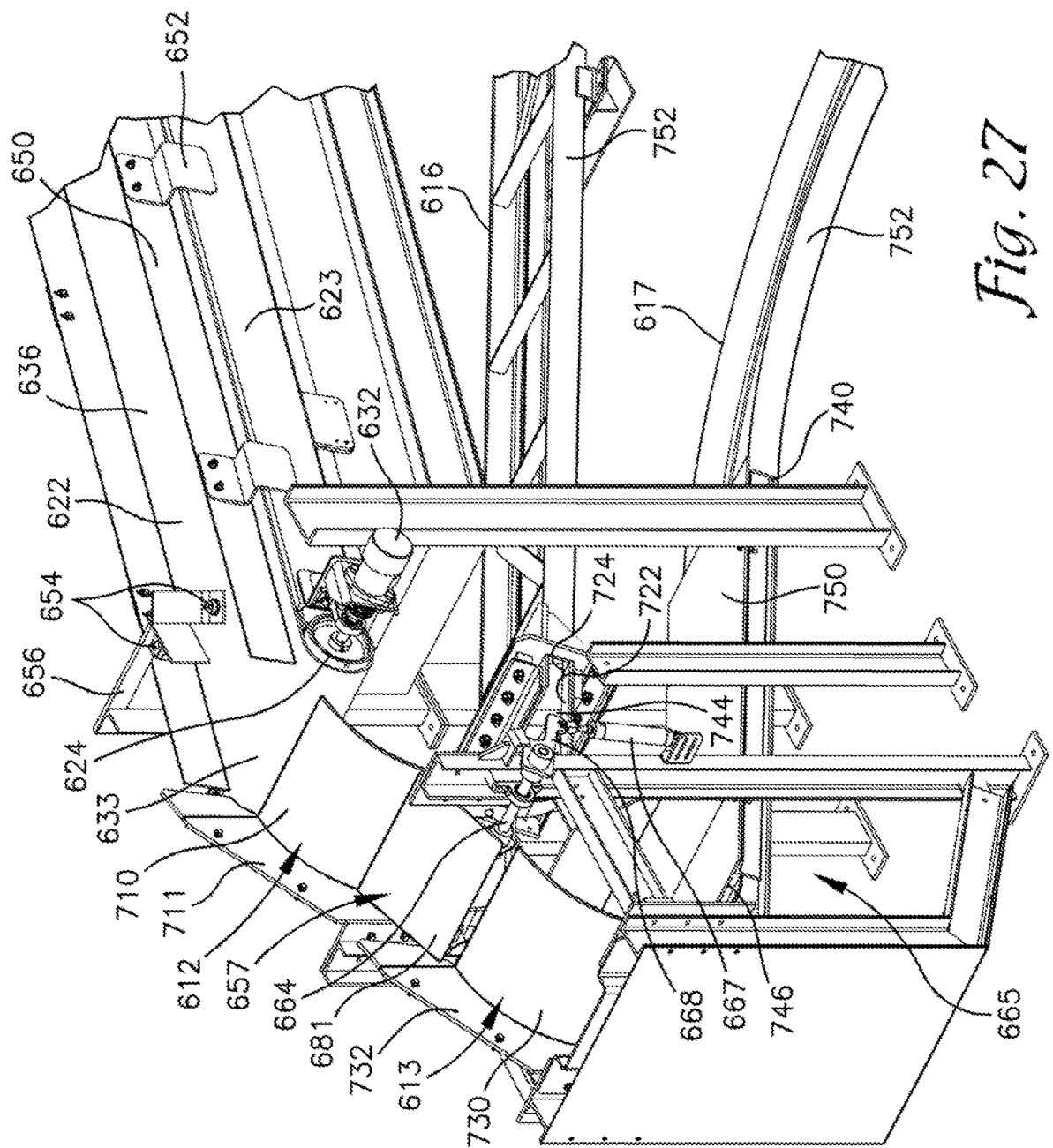
FIG. 27 is an enlarged perspective view of a routing assembly of the distribution assembly as shown in FIG. 25 with portions removed to show the first curved inner panel, the second curved inner panel and an upper bridge plate of the routing assembly.
Figure 28:
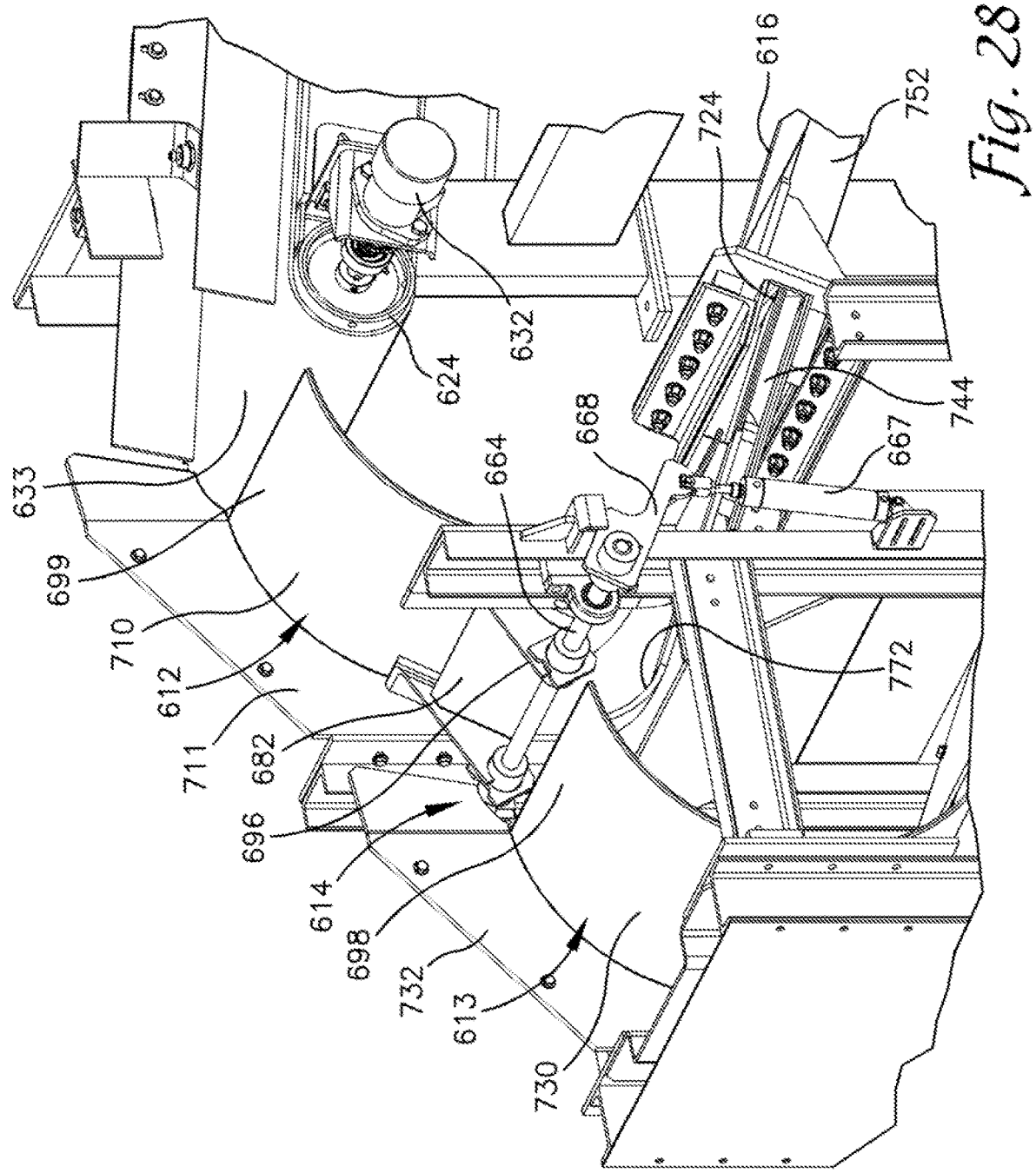
FIG. 28 is an enlarged perspective view of the routing assembly as shown in FIG. 27.

The rail tie plate distribution assembly 320 shown in FIG. 25 includes an elevation conveyor 610, a first curved guide chute 612, a second curved guide chute 613, a splitter or router 614, chutes 73 including an accumulation slide or upper accumulation slide 616 and a lower accumulation slide 617, a dealer assembly 618, and a final orienting discharge assembly 620. The first and second guide chutes 612 and 613 and the router 614 may collectively be referred to as a routing assembly 619. In the embodiment shown, the elevation conveyor 610, which may also be referred to as a transfer conveyor 610, is a belt type conveyor and is mounted to the trailer platform 67 on the trailer frame 27. The elevation conveyor 610 extends at an upward angle from the outlet 600 of the rail tie plate quarter turn assembly 310, under the singulating conveyor frame 127, to the first curved guide chute 612 which extends forward of the singulating conveyor end wall 151 above the singulating conveyor frame 127. A rail tie plate elevation belt 622 of the elevation conveyor 610 mounted on an elevation conveyor frame 623 extends around a drive roller 624 and a driven roller 626. The drive roller 624 may be driven by an elevation conveyor motor 632, such as a hydraulic motor, coupled to an axle of the elevation conveyor drive roller 624. In the embodiment shown a distal end 633 of the elevation conveyor 610 is the drive end of the elevation conveyor 610.

An inlet end 634 of an elevation conveyor run or upper run 636 is positioned slightly lower than the outlet 600 of the rail tie plate quarter turn conveyor run 523, such that a leading edge of the rail tie plate 10 drops down onto the elevation conveyor run 636 followed by a trailing edge of the rail tie plate 10. Elevation conveyor guards 650 extend in parallel relation to each other along both sides of the elevation conveyor frame 623 from the inlet end 634 to the distal end 633 of the elevation conveyor run 636, run parallel to the edges of the elevation conveyor frame 623 and are spaced apart from each other a distance slightly greater than the length or long side of the rail tie plate 10. The elevation conveyor guards 650 are secured to offset brackets 652 secured to the elevation conveyor frame 623 and maintain the rail tie plates 10 in alignment and prevent the rail tie plates from falling from the elevation conveyor run 636.

In the embodiment shown, one or more sensors 654 are positioned on a cantilevered arm 656 above the elevation conveyor run 636 near the distal end 633 of the elevation conveyor run 636. The sensors 654 are connected to a controller 418 that controls the router 614 that may be used to split the single stream of rail tie plates 10 into multiple streams of rail tie plates 10 to be distributed or routed to different areas or portions of a railroad track. The sensors 654 may be one or a combination of sensors known to one skilled in the art that may be used to scan the rail tie plates 10 and, in communication with the controller 418, determine the presence, orientation and/or profile of each of the rail tie plates 10. It is foreseeable that the sensors 654 may be alternately positioned, such as at positions along the side, in front or behind the rail tie plates 10, to detect and determine the presence and/or orientation of each rail tie plate 10.

As shown in FIGS. 25, 26, 27, and 28, multiple streams or accumulation slides 616 and 617 are connected to the elevation conveyor 610 by the first and second curved guide chutes 612 and 613. The sensors 654 may be utilized to control the router 614 to direct tie plates through either the first or second curved guide chutes 612 or 613 and then to accumulation slides 616 and 617 respectively. The router 614 includes a guide panel assembly 657 which is selectively positionable between a first orientation that guides or directs rail tie plates 10 exiting the elevation conveyor 610 through the first curved guide chute 612 and onto the upper accumulation slide 616 and a second orientation that guides or allows the rail tie plates 10 to advance out of the first curved guide chute 612 and into and through the second curved guide chute 613 and then to the lower accumulation slide 617.

The router 614 includes the guide panel assembly 657 fixedly secured at one end to a rotatable shaft 664 which is rotatably mounted on a routing assembly support frame 665. A linear actuator, such as pneumatic cylinder 667, is connected between the routing assembly support frame 665 and a lever arm 668 projecting outward from the rotatable shaft 664. Extension of the linear actuator 667 pivots the guide panel assembly 657 to the first orientation and retraction of the linear actuator 667 pivots the guide panel assembly 657 to the second orientation. The pneumatic cylinder 667 is communicably connected to the controller 418. The controller 418 determines and controls which accumulation slide 616 and 617 each rail tie plate 10 advances onto based on information from the sensors 654 or from other input information or sensors.

The guide panel assembly 657 includes an upper bridge plate 681 and a lower or inner deflecting panel 682 welded to or otherwise mounted on panel supports 696 secured on the rotatable shaft 664. A width of the upper bridge plate 681 is slightly greater than the width of the rail tie plates 10 so that when the bridge plate 681 and guide panel assembly 657 are in the second position, tie plates 10 may slide across the bridge plate 681 and a length of the bridge plate 681 allows the bridge plate 681 to span a gap between the first curved guide chute 612 and the second curved guide chute 613 so that tie plates advancing across the bridge plate 681 slide into an entry 698 of the second guided curve chute 613 to the lower accumulation slide 617.

The first curved guide chute 612 is formed from and includes a first curved member or inner panel 710 that extends from the distal end 633 of the elevation conveyor run 636 and curves downward and back under an entry 699 of the first curved guide chute 612. Side walls 711 enclose each side of the first curved guide chute 612 and extend between the first curved inner panel 710 and a first top cover 712 that extends over the upper portion of the first curved inner panel 710. First guide rails 722 extend in spaced relation below the first curved inner panel 710 between an entry 724 of the accumulation slide 616 and the lower end of the inner deflecting panel 682.

As best shown in FIG. 33, when the guide panel assembly 657 is selectively raised by the controller 418, the distal end of the bridge plate 681 extends in closely spaced relation to an inner surface of the first top cover 712. A rail tie plate 10 advancing off of the distal end 633 of the elevation conveyor run 636 advances or slides on the first curved inner panel 710 and, through gravity and centrifugal force, advances through the first guide chute 612 and onto the first guide rails 722 with the first top cover 712 and raised deflecting panel 682 of the guide panel assembly 657 restraining the advancement of the tie plate 10 within the chute 612. As the rail tie plate 10 advances around the first curved inner panel 710 and onto the guide rails 722, the rail tie plate 10 turns over or flips such that the shoulders 15 and 16 face downward as the first tie plate 10 approaches the accumulation slide 616.

The first curved guide chute 612 and the second curved guide chute 613 are formed similarly. The second curved guide chute 613 is offset to the outside and slightly lower than the first curved guide chute 612. The second curved guide chute 613 includes a second curved member or inner panel 730 that extends from proximate pivot shaft 664 of the guide panel assembly 657 and curves downward and back under an entry 698 of the second curved guide chute 613. Second side walls 732 enclose each side of the second curved guide chute 613 and extend between the second curved inner panel 730 to a second top cover 734 and to second guide rails 736. The second side walls 732 and the second guide rails 736 extend to an entry 740 of the accumulation slide 617.

As best shown in FIG. 32, when the guide panel assembly 657 is selectively lowered by the controller 418, the bridge plate 681 spans a gap between the first curved inner panel 710 and the second curved inner panel 730 so that a rail tie plate 10 advances or slides from the entry 698 of the first curved guide chute 612 into the entry 731 of the second curved guide chute 613. The guide panel assembly 657 connects the entry 699 of the first curved guide chute 612 with the entry 698 of the second curved guide chute 613. Rail tie plates advance or slide over and across the bridge plate 681 of the guide panel assembly 657 onto the second inner curved inner panel 730 and, through gravity and centrifugal force, advance through the second curved guide chute 613 to the second guide rails 736 that begin within the second curved guide chute 613 and extend inward from the second side walls 732. As the rail tie plate 10 advances around the second inner curved inner panel 730 and onto the second guide rails 736, the rail tie plate 10 turns over or flips such that the shoulders 15 and 16 face downward as the rail tie plate 10 approaches the accumulation slide 617.

The first curved guide chute 612, the second curved guide chute 613, and the accumulation slides 616 and 617 are supported by the accumulation slide frame 665 mounted on the trailer platform 67 on the trailer frame 27. The accumulation slides 616 and 617 extend from the curved guide chutes 612 and 613 to proximate the track bed relative to which the rail tie plates 10 are to be distributed. The accumulation slides 616 and 617 may be positioned to extend to and distribute rail tie plates 10 to different areas, such as on opposite sides of a track, or may be positioned to extend to and distribute rail tie plates 10 to similar areas, such as on the same side of the track. The accumulation slides 616 and 617 may be straight or curved to accommodate the trailer platform 67 and/or the trailer frame 27 and to distribute the rail tie plates 10 to a desired area. The trailer platform 67 may also include at least one opening to accommodate the orientation or direction of the accumulation slides 616 and 617 extending to the area of distribution.

In one embodiment, a first gap 744 is positioned between the first curved guide chute 612 and the accumulation slide 616, and a second gap 746 is positioned between the second curved guide chute 613 and the accumulation slide 617. The rail tie plates 10 that are not positioned laterally across the guide rails 722 and 736 fall between the guide rails 722 and 736 at the gaps 744 and 746 and exit the distribution assembly 320 prior to the accumulation slides 616 and 617. The accumulation slide 617 may include a slide cover 750 that extends from the second curved inner panel 730 and covers the accumulation slide 617 where the rail tie plates 10 falling through the first gap 744 may impact or interfere with the rail tie plates 10 advancing or sliding on the accumulation slide 617.

In one embodiment of the rail tie plate distribution assembly 320, the elevation conveyor 610 advances rail tie plates 10 to the first curved guide chute 612 connected to the accumulation slide 616 positioned to distribute rail tie plates 10, without the second curved guide chute 613, guide panel assembly 657 or the accumulation slide 617.

In the embodiment shown, accumulation slides 616 and 617 have similar or equivalent features and the following description, although described relative to accumulation slide 616, is applicable to both sides. Slide walls 752 extend on both sides of the accumulation slide 616 from the end of the side walls 711 of the curved guide chute 612 to the end of the accumulation slide 616. The guide rails 722 continue to extend inward from each slide wall 752 and may be formed on or fastened to the slide wall 752. In one embodiment, the rail tie plate 10 advances down the accumulation slide 616, by gravity, on the guide rails 722. In another embodiment, a slide platform (not shown), that may be a solid surface, may be positioned extending between the guide rails 722 and the rail tie plates 10 may advance down the accumulation slide 616 on the slide platform.

Figure 29:
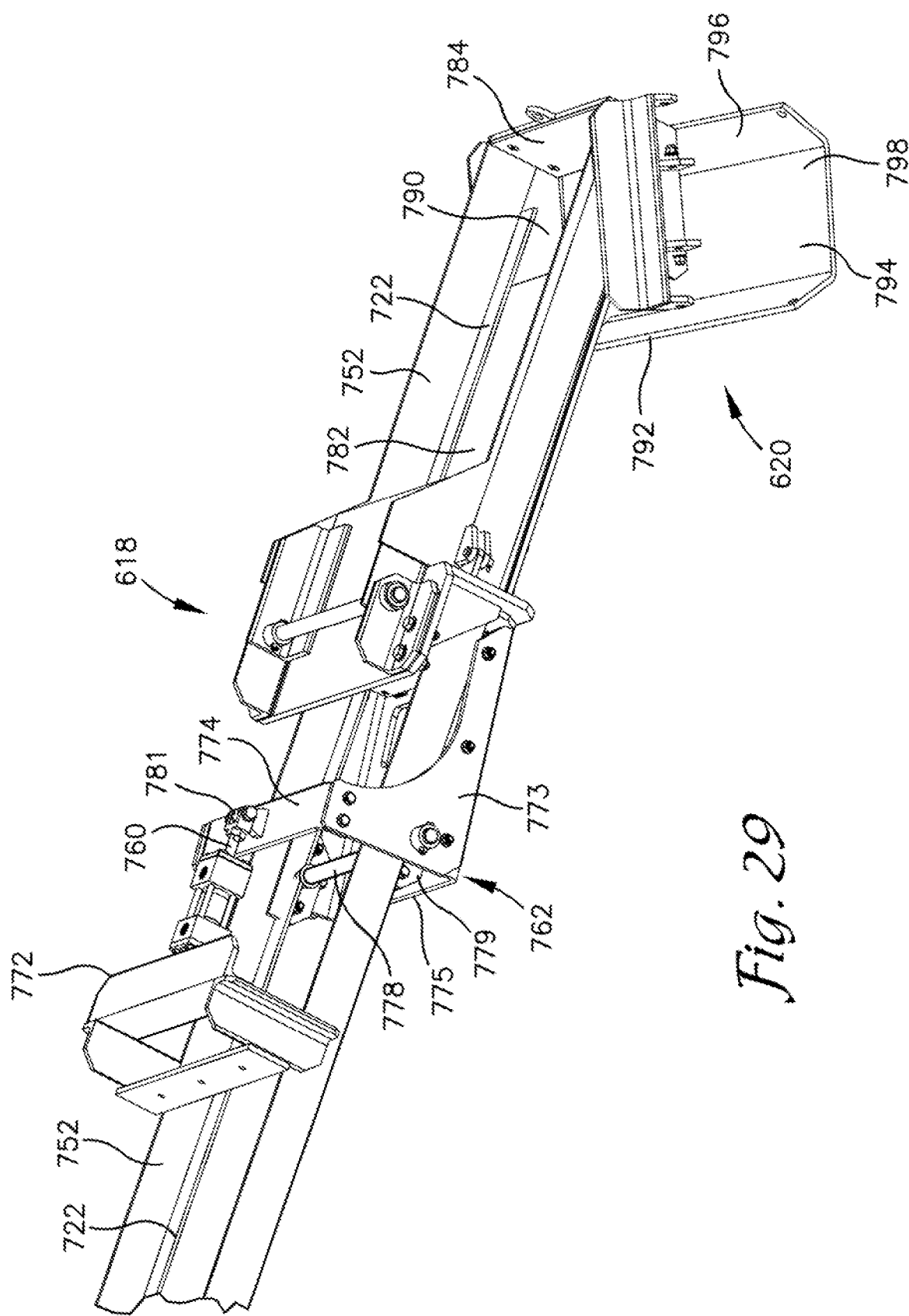
FIG. 29 is a side perspective view of a discharge end broken away from the rail tie plate distribution assembly shown in FIG. 25 and including a dealer assembly and a final orienting discharge assembly.
Figure 30:
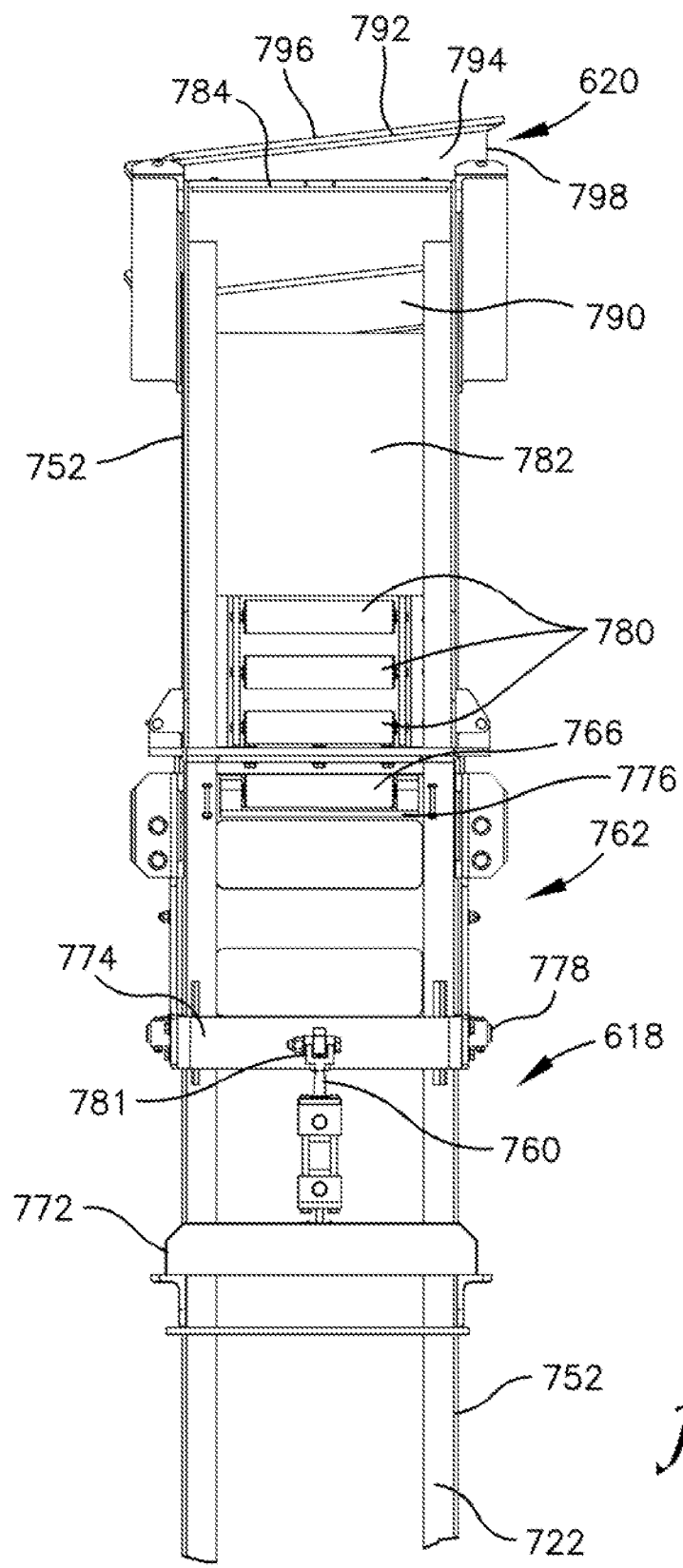
FIG. 30 is a top plan view of a discharge end broken away from the rail tie plate distribution assembly shown in FIG. 25.

The dealer assembly 618 may be connected to the accumulation slide 616 proximate an end thereof as shown in FIGS. 29, 30 and 31. The dealer assembly 618 shown includes a mechanical actuator 760, such as a hydraulic cylinder, and a carriage assembly 762 that is actuated to raise or lower a roller 766 within the accumulation slide 616 to control the advancement and/or stoppage of the rail tie plates 10 to the final orienting discharge assembly 620.

The actuator 760 is secured to an actuator support frame 772 that extends above and is secured to the accumulation slide 616. As shown in the figures, the carriage assembly 762 includes two L-shaped carriage levers 773, each having a vertical leg and a horizontal leg, that extend along the outside of the actuation slide 616 and are connected by a connecting brace 774 above the accumulation slide 616 and a base plate 775 fixed to the bottoms of the carriage levers 773 under the accumulation slide 616. A hinge 781 rotatably joins the actuator 760 to the connecting brace 774 of the carriage assembly 762. In a vertical plane that extends through the hinge 781, a carriage rod 778 is rotatably joined to corners of the carriage levers 773 where the vertical leg and the horizontal leg intersect. The carriage rod 778 is rotatably fixed to and extends through projections 779 secured to the bottom of the accumulation slide 616, such that when the actuator 760 is retracted or extended horizontally, the carriage assembly 762 rotates about the longitudinal axis of the carriage rod 778. The rotation of the carriage assembly 762 rotates a distal end of the carriage assembly that is joined to a plate stop 776 and the roller 766. The distal end of the carriage assembly 762 may either be in an upward position, such that the rail tie plates 10 are stopped behind the elevated plate stop 776 or behind stopped rail tie plates 10, or in a downward position, such that the a top of the plate stop 776 is lowered below or level with the top of the guide rails 722, and the rail tie plates 10 are advanced over the roller 766 and through the dealer assembly 618.

When the actuator 760 is in a first or retracted position, the carriage assembly 762 is rotated rearward such that the roller 766 is raised to a first or upward position and the rail tie plates 10 accumulate along the accumulation slide 616 behind the plate stop 776 or behind the rail tie plates 10 that are stopped. When the actuator 760 is extended to a second or extended position, the carriage assembly 762 is rotated forward such that the plate stop 776 and the roller 766 lower to a second or downward position, which lowers the top of the plate stop 776 to at least even with a top of the guide rails 722 such that the rail tie plates 10 are able to slide over the plate stop 776 and the roller 766. The rail tie plates 10 then advance over multiple rollers 780 in descending positions. The rollers 766 and 780 assist in accelerating and advancing each rail tie plate toward the final orienting discharge assembly 620. In one embodiment, the rail tie plates 10 accumulate behind the plate stop 776 and the controller 418 advances one rail tie plate 10 at a time over the plate stop 776 at a desired spacing to the final orienting discharge assembly 620.

Actuation of the carriage assembly 762 may be controlled by the controller 418 which uses data from an encoder (not shown) or sensors, including data regarding the distribution of the rail tie plates 10 to the track, information regarding the accumulation of the rail tie plates 10 behind the plate stop 776 and/or the advancement of the rail tie plates 10 through the plate stop 776. The encoder may be positioned on one of the rail wheels 32 to record a signal at intervals in the track. In addition, the controller 418 may slow down or pause the rail tie plate distribution machine 20 depending on this data or other factors.

The final orienting discharge assembly 620 may vary depending upon the desired application or orientation of the rail tie plates 10. In the embodiment shown in the figures, each rail tie plate 10 is advanced from the multiple rollers 780 of the dealer assembly 618 to a discharge run 782. The slide walls 752 extend past the discharge run 782 to an end wall 784. Formed between the end of the discharge run 782, the slide walls 752 and the end wall 784 is a rail tie plate drop space 790 through which the rail tie plates 10 fall. The drop space 790 is just larger than a rail tie plate 10. A container or bin 792 captures or catches the rail tie plates 10 as they fall through or advance off the discharge run 782, the bin 792 may be adjustably and rotatably positioned as understood by one skilled in the art, depending upon a type and direction of connectors, to direct the rail tie plate 10 to a desired location and in a desired orientation. In one embodiment, the bin 792 has a rectangular base 794 just larger than a rail tie plate 10, walls 796 extending from three sides of the rectangular base 794, and an opening 798 on one side of the base 794 for the rail tie plate 10 to slide from the bin 792. The wall 796 opposite the opening 798 of the bin 792 is rotatably connected to one of the slide walls 752 or the end wall 784, such that the bin 792 is angled downward toward the opening 798. In the embodiment shown, two corner or L-shaped brackets 800 are fixed to the outside of the bin 792 extending around the base 794 and the wall 796 opposite the opening 798. Legs 802 of the L-shaped brackets 800 include apertures with a shaft 804 extending therethrough and through corresponding apertures on a mounting or U-shaped bracket 810 fastened to one of the slide walls 752 or the end wall 784, such that bin 792 is positioned to catch and advance the rail tie plate 10 to the desired location.

Referring to FIGS. 34-39, an alternative embodiment of a rail tie plate flipping assembly is shown and may be referred to as a rail tie plate edge flipping assembly 900 that comprises a rail tie plate edge flipping assembly conveyor 902 supported on a rail tie plate edge flipping conveyor frame 904 and includes an edge flipping conveyor run 906 that is positioned to receive the longitudinally aligned rail tie plates 10 from the singulating conveyor 102. The rail tie plate edge flipping assembly 900 functions to orient the longitudinally aligned rail tie plates 10 received on the rail tie plate edge flipping assembly conveyor 902 in a shoulder-side down orientation into a shoulder-side up orientation and maintain rail tie plates 10 received on the rail tie plate edge flipping assembly conveyor 902 in a shoulder-side up orientation in the shoulder-side up orientation, and to convey the longitudinally aligned rail tie plates 10 to a subsequent portion of the rail tie plate orientation and distribution assembly 45, such as the tie plate quarter turn assembly 310.

In describing the rail tie plate edge flipping assembly 900, the terms "outer," "outside," or variations thereof, may be used to describe a location of a component, or a part of a component, and refers to a part of the component that is nearest to an outer edge of the rail tie plate edge flipping assembly 900 that is closest to the component or that extends away or is further away relative to another part of the component from a longitudinal midline of the rail tie plate edge flipping assembly 900 or from a middle of the component. Similarly, "inner," "inside," or variations thereof, may be used to describe a location of a component, or a part of a component, and refers to a part of the component that is nearest to a longitudinal midline of the rail tie plate edge flipping assembly 900 or toward a middle of the component.

Figure 2:
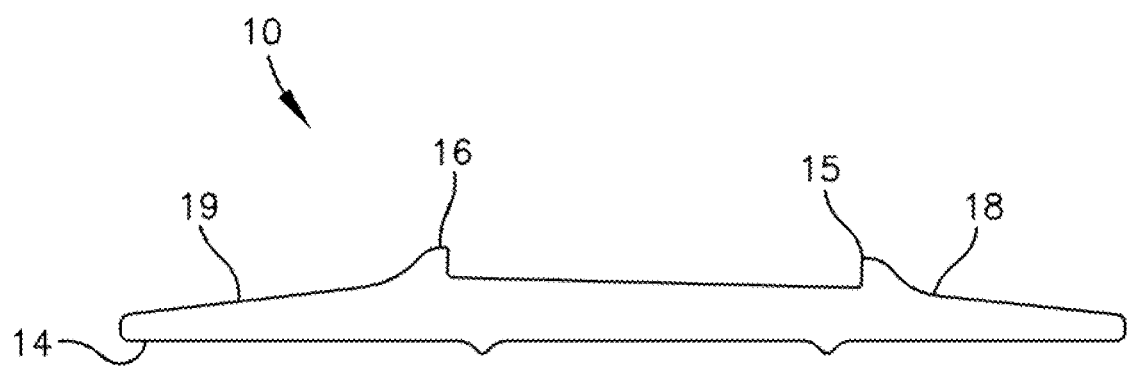
FIG. 2 is a left, side elevational view of the rail tie plate as shown in FIG. 1.

The rail tie plate edge flipping assembly 900 is described relative to the rail tie plate 10 described herein, but the rail tie plate edge flipping assembly 900 is configured such that it is adjustable to accommodate a variety of types of rail tie plates that may each have different dimensions, including, for example, at least the conventional, double shoulder rail tie plate 10 shown in FIGS. 1 and 2, a Victor rail tie plate that is manufactured by Pandrol, a member of the Delachaux Group, based in Colombes, France, and other foreseeable rail tie plates. The rail tie plate edge flipping assembly 900 accommodates the variety of types of rail tie plates by adjustment of one or more components of the rail tie plate edge flipping assembly 900, described in detail herein.

As shown in FIGS. 1 and 2, each rail tie plate is generally rectangular in shape, having two long sides and two short sides, and includes the generally planar bottom surface 14 and the upper surface 17. The upper surface 17 includes the short end 18, which includes an upwardly sloping surface extending from a first end or short side closest to the shoulder 15 toward the shoulder 15, and the long end 19, which includes an upwardly sloping surface extending from a second end or short side closest to the shoulder 16 toward the shoulder 16. A width of each rail tie plate refers to a dimension of the short sides of the rectangular shape and a length of each rail tie plate refers to a dimension of the long sides. A height of each rail tie plate refers a greatest dimension of the rail tie plate from the bottom surface 14 to the shoulders 15 or 16. Each rail tie plate 10 that advances through the rail tie plate edge flipping assembly 900 includes a first edge, which is the edge onto which the rail tie plate is placed, and a second edge or upper edge of the rail tie plate 10 which is the edge opposite the edge on to which the rail tie plate is placed. In the embodiments disclosed, the first edge and the second edge correspond to the long sides of the rail tie plate 10.

The rail tie plate edge flipping assembly 900 is positioned such that the rail tie plate edge flipping assembly conveyor 902 is downstream from the outlet end 114 of the reduced width conveying section 168 of the singulating conveyor run 112. The edge flipping conveyor run 906 is positioned relative to the reduced width conveying section 168 and the longitudinally aligned rail tie plates 10 are conveyed therefrom and onto a proximal conveyor or proximal end 920 of the edge flipping conveyor run 906 or onto a vertical support 922 of the rail tie plate edge flipping assembly 900.

It is foreseeable that the rail tie plate 10 may be conveyed directly from the reduced width conveying section 168 of the singulating conveyor run 112 and onto a ramp or rail tie plate feeder 923 of the vertical support 922 for depositing or placing each of the rail tie plates 10 on its first edge. Specifically, a guide wall (not shown) on the reduced width conveying section 168 may function to push the rail tie plate 10 toward an edge or the outlet end 114 of the singulating conveyor 102 in a longitudinal orientation such that the rail tie plate drops onto the rail tie plate feeder 923 to advance through the rail tie plate edge flipping assembly 900.

In an embodiment, the rail tie plate edge flipping assembly 900 extends in a plane below the reduced width conveying section 168, and a chute 924 (see FIG. 39), which forms a curved or sloping channel 928, extends therebetween. The chute 924 includes an entrance 929 and is configured such that each rail tie plate 10 advanced off of the singulating conveyor run 112 is maintained in longitudinal alignment from the singulating conveyor 102. Specifically, a width of the chute 924 is slightly wider than the width or smaller dimension of the rail tie plate 10 sitting generally flush with a chute run or slide 931 and longitudinally aligned within the chute 924. The chute 924 includes a guard 930 extending on each side of the slide 931. The guards 930 prevent each rail tie plate 10 from shifting on or sliding off the slide 931 and out of the chute 924. Each guard 930 is coupled to or formed integral with a rail 932 that is spaced apart from the slide 931 with a spacing greater than the height of the rail tie plate 10. Spacing between the rails 932 is less than the width of the rail tie plate 10. The slide 931, the guards 930, and the rails 932 form the channel 928 of the chute 924.

Figure 39:
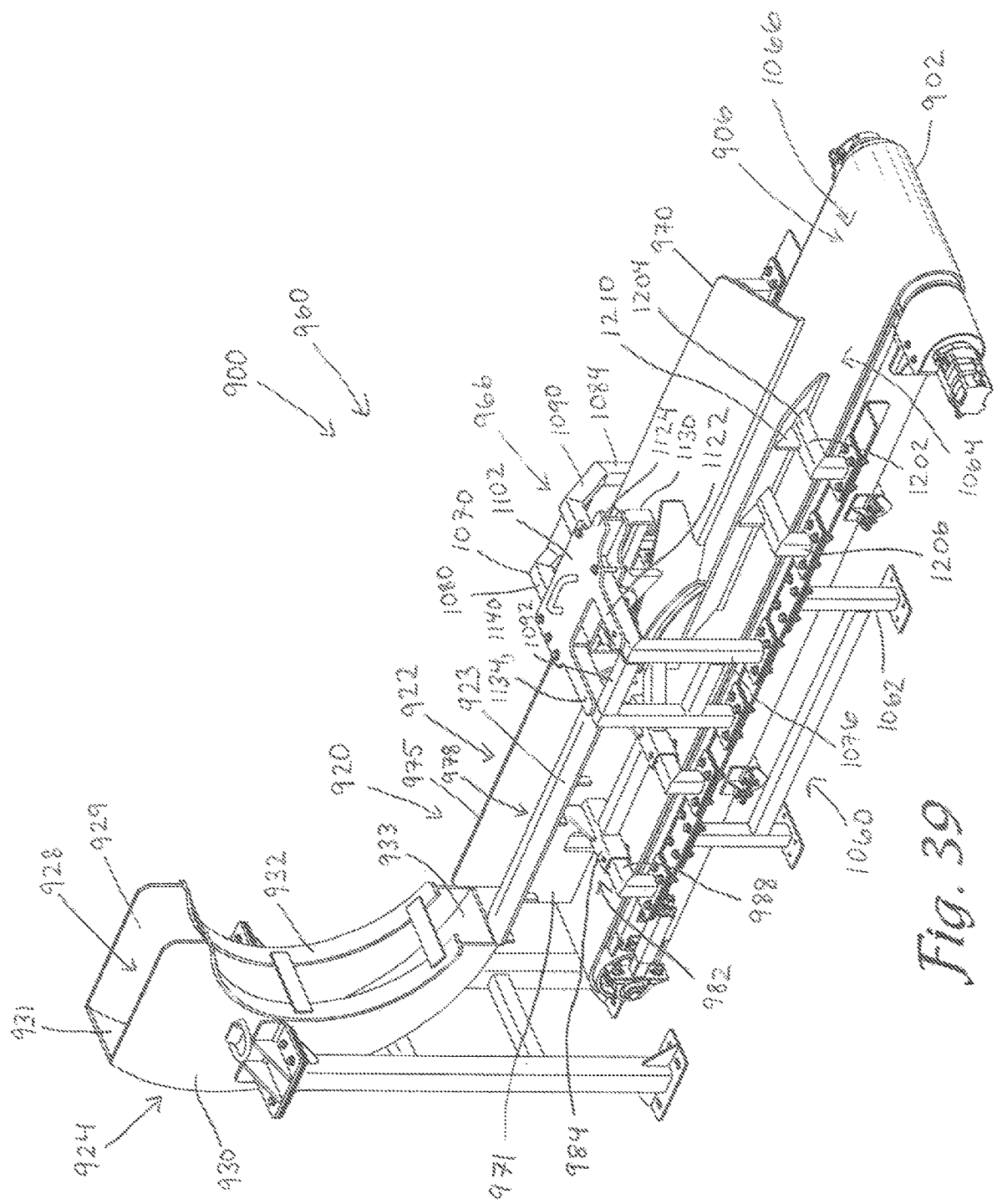
FIG. 39 is a perspective view of the rail tie plate edge flipping assembly shown in FIG. 34 and includes a chute for advancing rail tie plates from a singulating conveyor to the rail tie plate edge flipping assembly with a frame for supporting the rail tie plate edge flipping assembly on a trailer.

In an embodiment shown in FIG. 39, the rails 932 of the chute 924 are curved and extend from the entrance 929 to an exit 933 of the channel 928. The rails 932 at the entrance 929 are angled downward, below horizontal, and the slide 931 is spaced apart from the rails 932 such that the entrance 929 is sized for the rail tie plates 10 to be projected or advanced into the channel 928 from the singulating conveyor run 112. A cross-sectional area of the channel 928 decreases in the direction of advancement of the rail tie plates 10 to control advancement of the rail tie plates 10. Specifically, the slide 931 and the rails 932 extend such that a spacing therebetween is gradually decreased and remains greater than the height of the rail tie plates 10. The exit 933 from the chute 924 is aligned with the rail tie plate feeder 923 of the vertical support 922 such that the exit 933 of the chute 924 opens adjacent the vertical support 922 and the rail tie plates 10 are dropped or advanced therefrom and onto the vertical support 922 that guides or places each rail tie plate 10 on its first edge on the edge flipping conveyor run 906.

A flipping section 960 is configured to cause the rail tie plate 10 to advance from a vertical orientation and into a right-side up orientation such that the bottom surface 14 of the rail tie plate 10 faces downward toward the rail tie plate edge flipping assembly conveyor 902 and the pair of shoulders 15 and 16 faces upward or away from the rail tie plate edge flipping assembly conveyor 902. The flipping section 960 includes the vertical support 922, a bridge 966 from which a knife edge, wedge or diverter 968 is supported, and angled panels or guide members 970 for laying each rail tie plate 10 onto the edge flipping assembly conveyor 902 oriented with the shoulders 15 and 16 facing upward.

The vertical support 922 includes a first or adjustable vertical support member or guide 971 and a second vertical support member or guide 975. The vertical support 922 extends vertically and generally perpendicular to and in spaced relation above the edge flipping conveyor run 906 and parallel to the direction of advancement of the rail tie plates 10. The first and second vertical support members 971 and 975 extend in parallel spaced relation, spaced apart a distance slightly more that the height of the rail tie plates 10 forming a space 978 therebetween. The function of the vertical support members 971 and 975 is to receive and place each rail tie plate 10 on its first edge and in a substantially vertical orientation as it is conveyed therebetween by the rail tie plate edge flipping assembly conveyor 902 and support the tie plate 10 in the vertical orientation as it advances toward the knife 968.

In an embodiment as shown in FIGS. 34-39, the first vertical support member 971 is formed as part of the rail tie plate feeder 923. The rail tie plate feeder 923 extends from the vertical support member 971 at an upper end thereof and curves or flares upward and outward relative to the space 978 and is shaped for guiding the rail tie plates 10 into the space 978. In an embodiment, the rail tie plate feeder 923 may curve to extend at least horizontally or at an obtuse angle relative to the vertical support member 971 such that a rail tie plate 10 that is advanced from the chute 924 in a generally horizontal orientation onto rail tie plate feeder 923 slides toward or into the space 978 between the first and second vertical support members 971 and 975 such that the longitudinal or first edge of the rail tie plate 10 closest to the space 978 is the leading edge of the tie plate 10 as it is guided therein and onto the edge flipping conveyor run 906 onto its first edge. Alternatively, the rail tie plate feeder 923 and the second vertical support member 975 function such that a rail tie plate 10 that is dropped in, such as from the singulating conveyor run 112, is guided into the space 978 with the first edge advancing onto the edge flipping conveyor run 906. The rail tie plate feeder 923 is supported by curved supports 980 that are secured to the first vertical support member 971.

The first vertical support member 971 is horizontally or laterally adjustable to increase or decrease the space 978 that extends between the first vertical support member 971 and the second vertical support member 975 to accommodate a height of one of the variety of rail tie plates that may be flipped in the rail tie plate edge flipping assembly 900. The first vertical support member 971 includes an adjustable securement assembly that includes one or more adjustable mounting members 982 secured to the first vertical support member 971. The one or more adjustable mounting member 982 each include a telescoping portion 984 that adjustably slides on and is secured to a first end 986 of a post 988. The telescoping portion 984 comprises a square tube in which the post 988 is slidingly fitted for adjustability. The post 988 comprises a square tube formed with a right angle, and the square tube forming the post 988 is slightly smaller in cross-section than the internal width of the square tube of the telescoping portion 984. A second end 989 of the post 988 is secured to a securing bracket 990 that is mounted on a first angle bracket 992 secured to the rail tie plate edge flipping conveyor frame 904. To secure the telescoping portion 984 to the post 988 to prevent horizontal movement of the first vertical support member 971, a fastener such as a pin 1002 is insertable through an aperture in each telescoping portion 984 and one of a plurality of apertures in the associated posts 988. The mounting members 982 may be secured to each other with a stabilizing bar 1020 and may include one or more braces 1024 and/or gussets 1026 for securing the mounting members 982 to the first vertical support member 971.

The second vertical support member 975 includes a securement assembly that includes one or more mounting members 1036 having a first end 1038 secured to the second vertical support member 975. In the embodiment shown, the mounting members 1036 are not adjustable, but it is foreseeable that the second vertical support member 975 could be horizontally or laterally adjustable and include an adjustable securement assembly similar to that described relative to the first vertical support member 971. Each mounting member 1036 comprises a square tube formed with a right angle. A second end 1040 of each mounting member 1036 is secured to a securing bracket 990 that is mounted on a second angle bracket 1042 secured to the rail tie plate edge flipping conveyor frame 904. The mounting members 1036 may be secured to each other with a stabilizing bar 1046 and may include one or more braces 1050 and/or gussets 1052 for securing the mounting members 1036 to the second vertical support member 975.

The angle brackets 992 and 1042 are each mounted to an outer surface of the rail tie plate edge flipping conveyor frame 904 and include a plurality of holes extending therethrough. The rail tie plate edge flipping assembly 900 is supported on a rail tie plate edge flipping assembly frame 1060 that includes a plurality of legs 1062 for securing to the rail tie plate edge flipping assembly 900 to the trailer platform 67 on the trailer frame 27. The legs 1062 are mounted to the angle brackets 992 and 1042.

The bridge 966 extends over the edge flipping conveyor run 906, after the vertical support 922 that functions to place and support each of the rail tie plates on its first edge. The bridge 966 supports the knife edge, wedge or diverter 968 that directs or guides each rail tie plate 10, as it advances past and exits the vertical support 922, to a first side 1064 or a second side 1066 of the rail tie plate edge flipping assembly 900 depending on the orientation of the rail tie plate 10 in the space or gap 978 between vertical support members 971 and 975. Specifically, each rail tie plate includes the bottom surface 14 that is planar and the upper surface or shoulder side surface 17 that includes the sloping surface of the short end 18, at one end, and the sloping surface of the long end 19, at an opposite end. The knife 968 is centered relative to the space 978 between the first and second vertical support members 971 and 975 and engages the rail tie plate 10 oriented on its first edge and in a substantially vertical orientation as it exits the vertical support 922. The knife 968 is positioned to engage either the sloping surface of the short end 18 of the shoulder side surface 17 or the sloping surface of the long end 19 of the shoulder side surface 17 of each of the rail tie plates 10 advanced between and past the first and second vertical support members 971 975, depending on the orientation of the rail tie plate 10, which forces the rail tie plate 10 to advance to one side of the knife 968. The engagement of the knife 968 with the rail tie plate 10 tips the rail tie plate advancing past the knife 968 outward and downward. The rail tie plate 10 is pivoted into the shoulder-side up orientation as an upper edge of the rail tie plate 10 advances past the knife 968 and is driven or urged outward toward the side of the rail tie plate edge flipping assembly 900 that is closest to the planar bottom surface 14 of the rail tie plate 10.

In the embodiment shown, the bridge 966, from which the knife 968 is suspended, is formed with at least two support arches 1070 that extend over the edge flipping conveyor run 906. The arches 1070 each include a first vertical support 1076 that is secured to the angle bracket 992 and coupled to a horizontal support 1080 that forms a top of each arch 1070. The arches 1070 each include a second vertical support 1084 that is secured to the angle bracket 1042 and coupled to an angle support 1090 that extends between the second vertical support 1084 and the horizontal support 1080. The arches 1070 are connected together by a plurality of stabilizing braces 1092 extending therebetween.

The knife 968 is secured to and extends below a bottom surface 1100 of a clamping structure 1102 that is securable across the horizontal supports 1080. The clamping structure 1102 includes a first or top plate 1108 extending over the horizontal supports 1080 and a second or base plate 1110 that extends under the horizontal supports 1080. A frame 1114 extends between or on the inside of the horizontal supports 1080 and between the top plate 1108 and the base plate 1110 to stabilize, strengthen, and provide rigidity to the clamping structure 1102. In an embodiment, the frame 1114 is formed by one or more frame members 1120 secured together, such in an H-shape, that securely fits between the horizontal supports 1080. The top plate 1108 and the base plate 1110 each extend across and beyond the two arches 1070 such that a plurality of fasteners 1121 secure the top plate 1108 to the base plate 1110 on the outsides of the horizontal supports 1080. As shown in FIG. 34, the clamping structure 1102 includes at least two securing members 1122 that extend along each of the horizontal supports 1080 to secure the clamping structure 1102 in one of a plurality of lateral positions and an extension 1124 that extends in the direction of advancement of the rail tie plate 10 to secure a retaining member 1130 for preventing or minimizing movement of the knife 968. One or more frame members 1131 are secured between the top plate 1108 and the base plate 1110 that form the extension 1124.

The wedge or knife 968 is laterally adjustable relative to the direction of advancement of the rail tie plates 10, in combination with adjustment of the spacing between the vertical support members 971 and 975, to accommodate different varieties of rail tie plates having different dimensions by adjusting a position of the clamping structure 1102. Specifically, the knife 968 is adjustably centered relative to a longitudinally extending midline through the space 978. The horizontal supports 1080 each have one or more apertures 1134 and each corresponds to one of the variety of rail tie plates that the rail tie plate edge flipping assembly 900 is able to accommodate. In one example, one of the horizontal supports 1080 may have an aperture 1134 that positions the knife 968 for use with a rail tie plate 10 of the type shown in FIGS. 1 and 2, and the other horizontal support 1080 may have an aperture 1134 that positions the knife 968 for use with a Victor type rail tie plate. The clamping structure 1102 is laterally adjustable such that at least one aperture 1140 of one of the two securing members 1122 is alignable with one of the apertures 1134 in one of the horizontal supports 1080. A pin 1144 is removably securable through the apertures 1134 and 1140 in at least one of the securing members 1122 and the respective horizontal support 1080. A handle 1150 extends from a top of the top plate 1108 to facilitate lateral movement of the clamping structure 1102 by a user.

Figure 37:
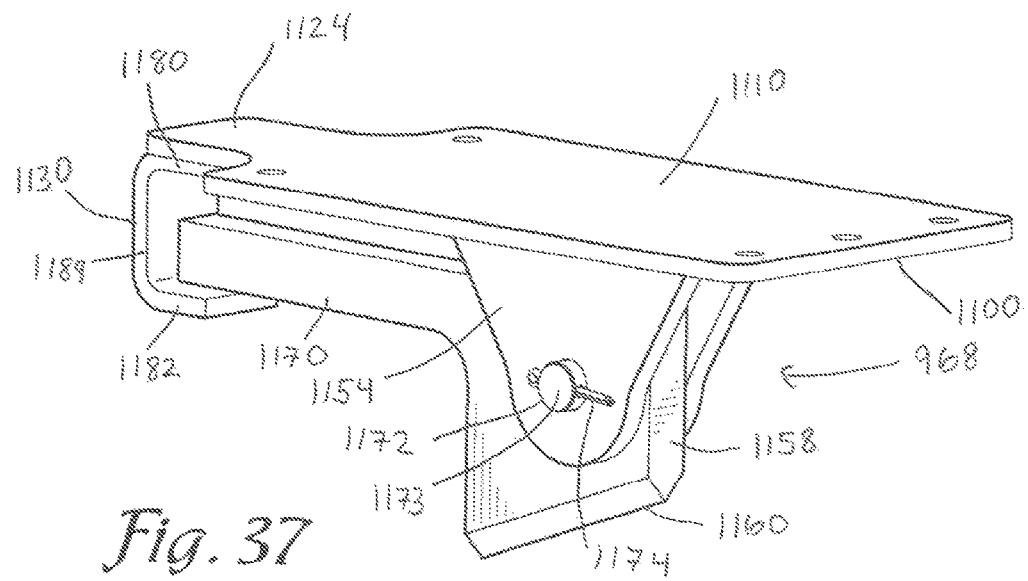
FIG. 37 is a left side, perspective view of the knife coupled to a base plate of a clamping structure, shown in FIG. 34.
Figure 38:
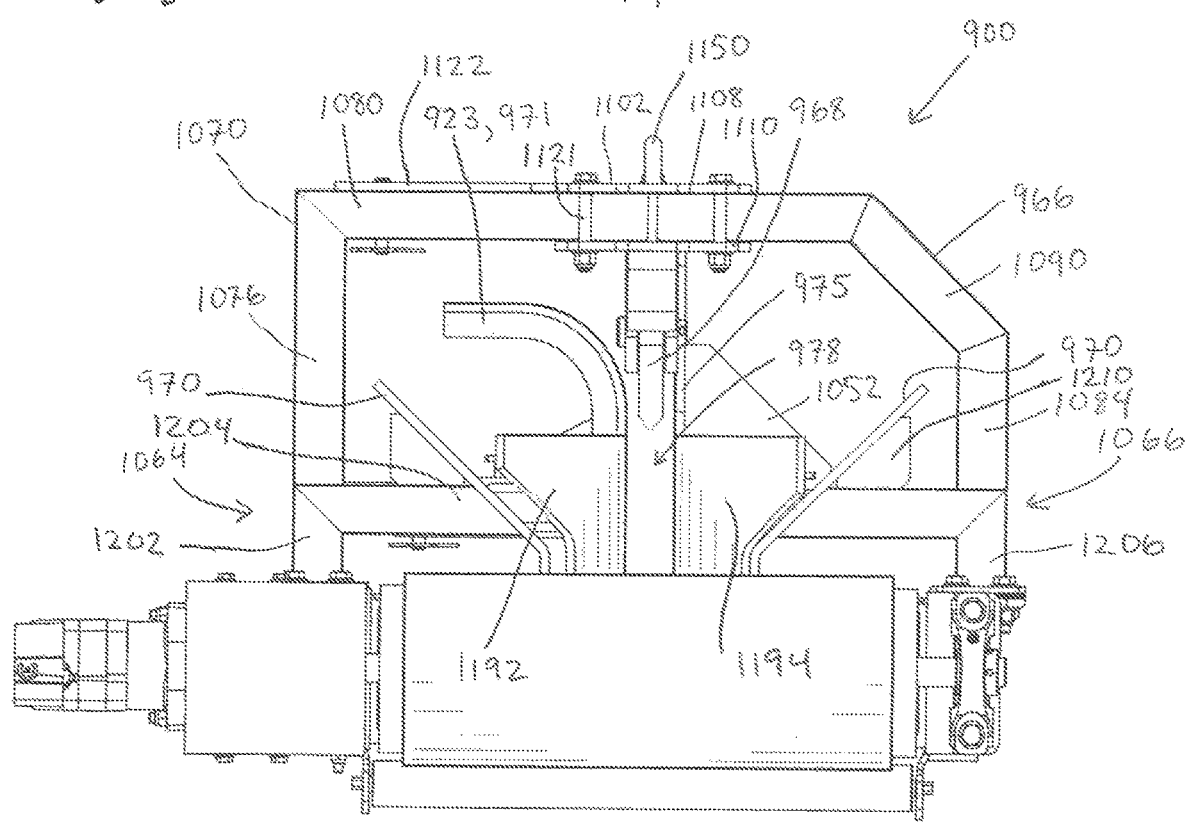
FIG. 38 is an elevational view of the rail tie plate edge flipping assembly shown in FIG. 34 looking form a discharge end toward an inlet end.

The knife 968, best shown in FIG. 37, is secured to the base plate 1110 of the clamping structure 1102 by a clevis 1154 that extends from the base plate 1110 such that the knife 968 is suspended above the edge flipping conveyor run 906 at a height that is less than the width of the rail tie plate 10 such that the knife 968 is engageable with the rail tie plate 10. The knife 968 includes a blade 1158 having double beveled edge 1160 that extends toward the edge flipping conveyor run 906 and is angled downward toward the edge flipping conveyor run 906 in the direction of advancement of the rail tie plate 10 and a shaft 1170 extending from the blade 1158. An aperture 1172 extends through blade 1158 for securing the knife 968 to the clevis 1154 with a clevis pin 1173 secured by a locking pin 1174. The knife 968 is supported in a vertical orientation with the double beveled edge 1160 of the blade 1158 positioned to engage the upwardly sloping surface of the short end 18 or the long end 19 of the upper surface 17 of the rail tie plate 10 as it advances on its first edge from the vertical support 922.

The shaft 1170 of the knife 968 is formed integral with the blade 1158 and extends rearward or in the direction of advancement of the rail tie plate 10. The shaft 1170 is supported by the retaining member 1130 that engages an end of the shaft 1170 to support the suspended knife 968 and prevent rearward movement thereof as the knife 968 is engaged by the rail tie plate 10. In an embodiment the retaining member 1130 comprises an attachment portion 1180 that is secured to the base plate 1110, a support portion 1182 that supports the shaft 1170, and a connecting portion 1184 that extends between the support portion 1182 and the attachment portion 1180 and prevents the rearward movement of the knife 968.

As best seen in FIG. 36, extending from proximate the first vertical support member 971 and the second vertical support member 975 and extending below the knife 968 and spaced above the edge flipping conveyor run 906, are respective first and second guide walls or rails 1192 and 1194 that support and guide each rail tie plate 10 as it exits the vertical support 922 and is forced to advance toward the first side 1064 or the second side 1066 of the rail tie plate edge flipping assembly 900. The guide walls or rails 1192 and 1194 slant or curve outward and downward and extend toward respective guide members 970, downstream of the wedge 968, that angle upward and away from a center of the edge flipping conveyor run 906. The first and second guide walls or rails 1192 and 1194 may be formed integral with the respective vertical support member 971 or 975 from which it extends and/or may be formed integral with the guide members 970. In an embodiment, at least a portion of the first and second guide walls or rails 1192 and 1194 is in overlapping relationship with the respective guide member 970 and positioned inside the respective guide member 970 such that a rail tie plate 10 is able to advance therethrough without becoming stuck or hitched on a component of the rail tie plate edge flipping assembly 900. The securing legs 1024 and 1050 of the mounting members 982 and 1036 closest to the respective guide walls 1192 and 1194 engage and support the guide walls 1192 and 1194 to prevent movement thereof.

The guide members 970 extend spaced above the edge flipping conveyor run 906 on the first side 1064 and the second side 1066 of the edge flipping conveyor run 906 and are angled upward and outward such that as each rail tie plate 10 is guided thereto, the momentum, gravity, and weight distribution of each rail tie plate 10 causes the rail tie plate 10 to fall in the direction of the bottom surface 14 of the rail tie plate 10 and onto the guide member 970 on the same side such that the shoulders 15 and 16 are oriented facing upward. The first edge of the rail tie plate 10 remains on the edge flipping conveyor run 906 which drives the rail tie plate 10 in the direction of advancement. At the end of each guide member 970, the rail tie plate 10 is advanced off of the guide member 970, in a longitudinal orientation and with the shoulders 15 and 16 oriented facing upward.

The guide members 970 include a securement assembly that includes one or more mounting arms or members 1202 having a first end 1204 secured to the respective guide members 970. In the embodiment shown, the one or more mounting members 1202 are not adjustable, but it is foreseeable that each guide member 970 may be horizontally adjustable and include an adjustable securement assembly similar to that of the first vertical support member 971. Each mounting member 1202 comprises a square tube formed with a right angle. A second end 1206 of each mounting member 1202 is secured to a securing bracket 990 that is mounted on the angle bracket 992 or 1042 secured to the rail tie plate edge flipping conveyor frame 904. The one or more mounting members 1202 include a gusset 1210 for securing the one or more mounting members 1202 to the guide members 970.

Corner braces or gussets 1220 are secured below the angle brackets 992 and 1042 and correspond with the securing brackets 990 that secure the securement assemblies of the first vertical support member 971, the second vertical support member 975 and the guide members 970 to provide support thereto.

Figure 40:
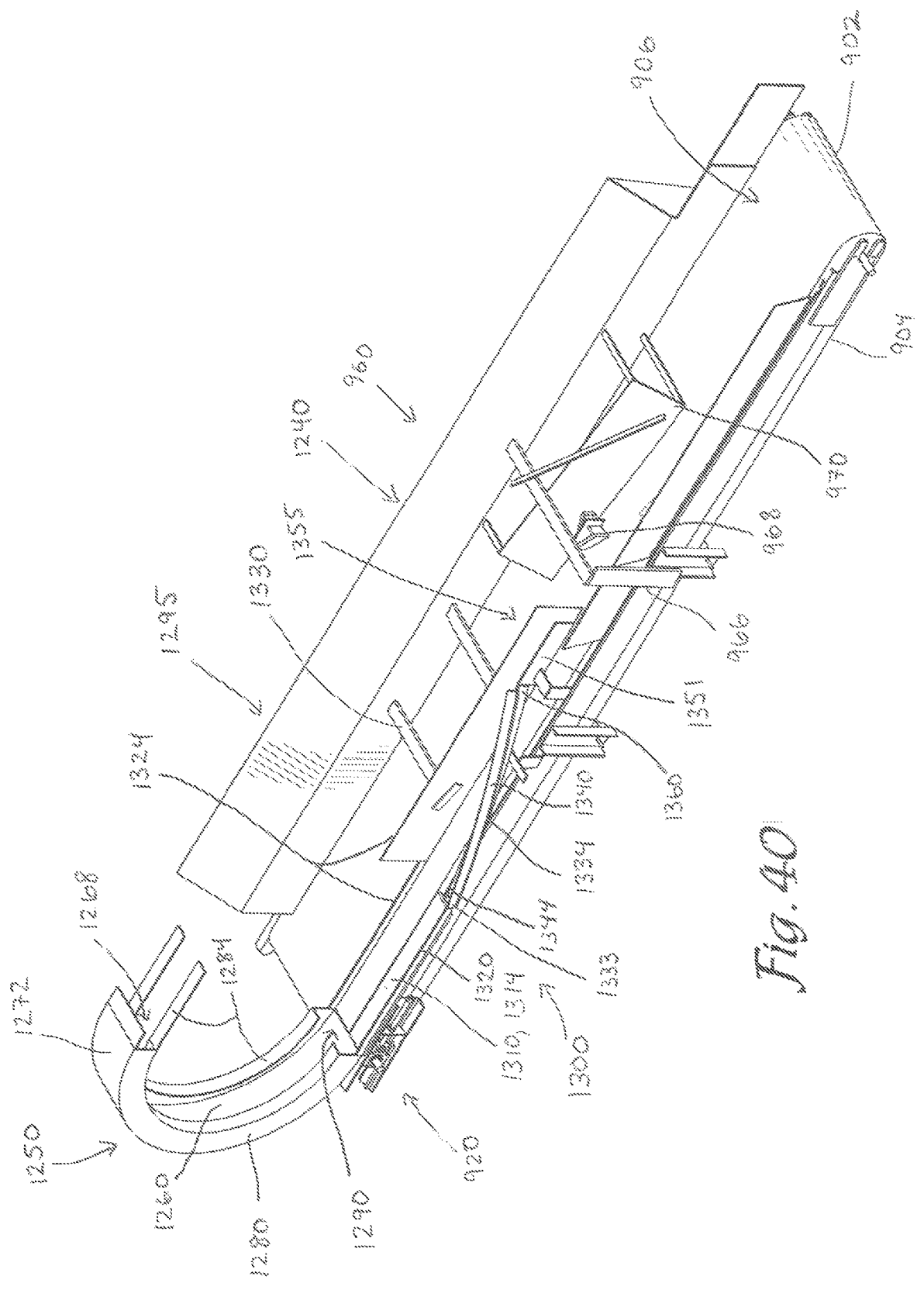

An alternative embodiment of an edge flipping assembly 1240 having an alternative assembly for placing rail tie plates 10 on a longitudinal edge is shown in FIG. 40. Structure in the alternative embodiment shown in FIG. 40 corresponding to structure shown in the embodiment shown in FIGS. 34-39 may be numbered the same. The alternative rail tie plate edge flipping assembly 1240 extends in a plane below the reduced width conveying section 168, and the chute 1250, which forms a curved or sloping channel 1260, extends therebetween. The chute 1250 includes an entrance 1268 that is configured such that each rail tie advanced off of the singulating conveyor run 112 is maintained in longitudinal alignment from the singulating conveyor 102. Specifically, a width of the chute 1250 is slightly wider than the width of rail tie plate 10 sitting flush with a chute run or slide 1272. The chute 1250 includes a guard 1280 extending on each side of the slide 1272. The guards 1280 prevent each rail tie plate 10 from shifting on or sliding off of the slide 1272 and out of the chute 1250. Each guard 1280 is coupled to or formed integral with a rail 1284 that is spaced apart from the slide 1272 with a spacing greater than the height of the rail tie plate 10. Spacing between the rails 1284 is less than the width of the rail tie plate 10. The slide 1272, the guards 1280, and the rails 1284 form the channel 1260 of the chute 1250.

The rails 1284 of the chute 1250 extend in a substantially horizontal orientation from the entrance 1268 of the chute 1250 toward the singulating conveyor run 112 such that the rail tie plates 10 are able to advance onto the rails 1284 from the singulating conveyor run 112. As shown in FIG. 40, the chute 1250 may form an arc of approximately 180°. The rail tie plates 10 are advanced therethrough and onto the proximal end 920 of the edge flipping conveyor run 906. The rails 1284 of the chute 1250 extend in generally parallel alignment with the slide 1272, and the channel 1260 has a generally constant cross-section from the entrance 1268 to an exit 1290. The exit 1290 is positioned longitudinally in-line with and laterally offset from the proximal end 920 of the rail tie plate edge flipping assembly 1240.

The embodiment in FIG. 40 includes a lifting section 1295 on the edge flipping conveyor run 906 that lifts and places each rail tie plate 10 onto its first edge. Although the lifting section 1295 is described relative to the rail tie plate edge flipping assembly conveyor 902, it is foreseeably that the lifting section 1295, or a portion thereof, may be configured to extend on a previous adjacent conveyor to the rail tie plate edge flipping assembly conveyor 902. The edge flipping conveyor run 906 is offset from the chute 1250 such that when the rail tie plate 10 is advanced therefrom, slightly greater than half of each rail tie plate 10, the half with the first edge, advances onto the edge flipping conveyor run 906, and the remainder of the rail tie plate 10, the portion with the second edge, advances onto an edge lifting ramp 1300 that is, at least at the proximal end 920 thereof, coupled to the rail tie plate edge flipping conveyor frame 904 and in approximate planar alignment with the edge flipping conveyor run 906. Between the proximal end 920 and the vertical support 922, the edge lifting ramp 1300 extends longitudinally above the edge flipping conveyor run 906.

The edge lifting ramp 1300 include an edge lifting member 1310 that extends a length of a pre-lifting portion 1314 of the lifting section 1295. The pre-lifting portion 1314 functions to pre-lift or elevate the second edge of the rail tie plate 10. The pre-lifting portion 1314 includes an edge lifting member guard 1320 that extends from the edge lifting member 1310 and a guide member 1324 that extends in parallel relationship with the edge lifting member guard 1320 and is supported by a plurality of braces 1330. The guide member 1324 extends longitudinally over and in spaced relation above the edge flipping conveyor run 906 with a spacing less than the height of the rail tie plate 10 such that the rail tie plate 10 is not able to pass under the guide member 1324. The edge lifting member guard 1320 and the guide member 1324 are spaced apart from each other by a dimension that is just slightly greater than the width of the rail tie plate 10 such that the rail tie plate 10 is able to advance in longitudinal alignment, and in a generally horizontal orientation, through the pre-lifting portion 1314. The edge lifting member 1310 extends from the proximal end 920 to proximate a first end 1333 of an elevator 1334 of the edge lifting ramp 1300, and the rail tie plate 10 advances in a forward direction supported on the edge lifting member 1310 and on the edge flipping conveyor run 906 as the rail tie plate edge flipping assembly conveyor 902 drives advancement of the rail tie plate 10.

The elevator 1334 extends after the edge lifting member 1310 in the direction of conveyance of the rail tie plate 10, and at least a portion of the elevator 1334 is supported in spaced relation above the edge flipping conveyor run 906. The elevator 1334 is formed having at least a flange 1340 and a support member or surface 1344 that function together to facilitate and control a gradual lift of the second edge of the rail tie plate 10 such that the rail tie plate 10 is gradually lifted onto the first edge as the rail tie plate 10 advances toward a first vertical support member 1351. The first vertical support member 1351 extends in spaced relation from the guide member 1324 to form vertical support 1355 which functions the same as vertical support 922 of edge flipping assembly 900. The elevator 1334 slopes upward and curves inward, extending across the edge flipping conveyor run 906, from an approximately horizontal alignment proximate the first end 1333 and in alignment with the edge lifting member 1310 to an approximately vertical alignment adjacent and in alignment with the first vertical support member 1351. The spacing between the elevator 1334 and the guide member 1324 narrows from the pre-lifting portion 1314 to the vertical support 1355 until the spacing between the elevator 1334 and the guide member 1324 is less than the width of the rail tie plate 10. Specifically, the support member 1344 gradually angles upward toward a vertical orientation and is a support surface for the second edge of the rail tie plate 10 to recline upon as the elevator 1334 extends across the edge flipping conveyor run 906 in the direction of advancement of the rail tie plate 10. The flange 1340 extends on the outer or upper edge of the support member 1344 and gradually slopes upward with the support member 1344. The flange 1340 may engage the second edge of the rail tie plate 10 as the second edge is raised or lifted to a height above the edge flipping conveyor run 906 of approximately the width of the rail tie plate 10. At a second end 1360 of the elevator 1334, the support member 1344 supports the rail tie plate 10 in a substantially vertical orientation, and the rail tie plate 10 is able to advance on its first edge from the pre-lifting portion 1314 to the flipping section 960 as described hereinabove.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

Having thus described the invention, what is claimed as new and desired to be secured by Letters Patent is as follows:

1. A rail tie plate flipping assembly comprising:
   a flipping assembly conveyor, receiving in succession, from a feed conveyor, longitudinally aligned rail tie plates in either a shoulder-side up orientation or a shoulder-side down orientation; and
   flipping means for flipping the rail tie plates received on the flipping assembly conveyor in a shoulder-side down orientation into a shoulder-side up orientation and maintaining rail tie plates received on the flipping assembly conveyor in a shoulder-side up orientation in the shoulder-side up orientation; wherein:
   the flipping means is configured such that a geometry of the rail tie plates causes a leading end of the rail tie plates received in the shoulder-side down orientation to engage the flipping means such that the rail tie plates are flipped into the shoulder-side up orientation and causes a leading end of the rail tie plates received in the shoulder-side up orientation to engage the flipping means such that the rail tie plates oriented in the shoulder-side up orientation are maintained in the shoulder-side up orientation.

2. The rail tie plate flipping assembly as in claim 1 wherein:
the flipping assembly conveyor comprises a launch conveyor having a launch conveyor run advancing from an inlet end to a discharge end at a launch conveyor speed; and the flipping means includes:
a dampening slide spaced apart a distance from the discharge end of the launch conveyor and having an upper section and an outlet section, the dampening slide sloping downward and rearward, relative to a direction of conveyance of the rail tie plates on the launch conveyor, toward the outlet section of the dampening slide; and
wherein the spacing of the dampening slide from the launch conveyor and the launch conveyor speed are selected such that rail tie plates launched off of the launch conveyor in the shoulder-side down orientation flip into and exit the dampening slide in the shoulder-side up orientation and the rail tie plates launched off the launch conveyor in the shoulder-side up orientation remain in and exit the dampening slide in the shoulder-side up orientation.

3. The rail tie plate flipping assembly as in claim 1 wherein:
the flipping conveyor includes a flipping conveyor run configured to receive and advance the rail tie plates thereon, and the flipping means includes:
a first vertical guide and a second vertical guide extending in parallel spaced relation above the flipping conveyor run parallel to a direction of conveyance and spaced apart a distance to receive and support one of the plurality of rail tie plates in a substantially vertical orientation as the rail tie plate is conveyed therebetween by the flipping conveyor; and
a wedge configured and positioned to engage a shoulder side surface of each of the plurality of rail tie plates advanced between and past the first and second vertical guides, wherein engagement of the shoulder side surface of each of the plurality of rail tie plates by the wedge, tips the rail tie plates advancing past the wedge outward and downward pivoting the rail tie plate into a shoulder-side up orientation on the flipping assembly conveyor downstream of the wedge.

4. A rail tie plate flipping assembly operable for flipping rail tie plates in a shoulder-side down orientation into a shoulder-side up orientation and maintaining rail tie plates in a shoulder-side up orientation in the shoulder-side up orientation, wherein the rail tie plate flipping assembly receives a plurality of longitudinally aligned rail tie plates in succession from a feed conveyor, the rail tie plate flipping assembly comprising:
a launch conveyor having a launch conveyor run advancing from an inlet end to a discharge end at a launch conveyor speed; and
a dampening slide spaced apart a distance from the discharge end of the launch conveyor and having an upper section and an outlet section, the dampening slide sloping downward and rearward, relative to a direction of conveyance of the rail tie plates on the launch conveyor, toward the outlet section of the dampening slide; wherein
the spacing of the dampening slide from the launch conveyor and the launch conveyor speed are selected such that rail tie plates launched off of the launch conveyor in the shoulder-side down orientation flip into and exit the dampening slide in the shoulder-side up orientation and the rail tie plates launched off the launch conveyor in the shoulder-side up orientation remain in and exit the dampening slide in the shoulder-side up orientation.

5. The rail tie plate flipping assembly as in claim 4 wherein the slope of the dampening slide is adjustable.

6. The rail tie plate flipping assembly as in claim 4 wherein a curvature of the dampening slide is adjustable.

7. The rail tie plate flipping assembly as in claim 4 wherein the outlet section of the dampening slide extends under the launch conveyor.

8. The rail tie plate flipping assembly as in claim 4 wherein the dampening slide comprises a resilient strip overlaying a dampening layer.

9. The rail tie plate flipping assembly as in claim 4 wherein the dampening slide is supported between a pair of dampening slide side walls and a guard flap extends between the dampening slide walls from adjacent the discharge end of the launch conveyor downward toward the outlet section of the dampening slide.

10. The rail tie plate flipping assembly as in claim 4 further comprising a support platform supporting the dampening slide proximate the outlet section thereof.

11. The rail tie plate flipping assembly as in claim 4 wherein the dampening slide is supported between a pair of dampening slide side walls and a support platform is pivotably connected to the dampening slide side walls below a middle portion of the dampening slide and an actuator is connected to the support platform and operable to adjust an angle of the support platform relative to the dampening slide side walls.

12. The rail tie plate flipping assembly as in claim 4 in combination with a feed conveyor operable to feed a plurality of longitudinally aligned rail tie plates in succession to the launch conveyor, wherein the feed conveyor is operated at a feed conveyor speed at which rail tie plates are conveyed from the feed conveyor to the launch conveyor and wherein the launch conveyor speed is greater than the feed conveyor speed.

13. A rail tie plate flipping assembly operable for flipping rail tie plates in a shoulder-side down orientation into a shoulder-side up orientation and maintaining rail tie plates in a shoulder-side up orientation in the shoulder-side up orientation, wherein the rail tie plate flipping assembly receives a plurality of rail tie plates that are longitudinally aligned and singulated in succession from a feed conveyor, the rail tie plate flipping assembly comprising:
a flipping assembly conveyor having a flipping conveyor run configured to receive and advance the plurality of rail tie plates;
a first vertical guide and a second vertical guide extending in parallel spaced relation above the flipping conveyor run parallel to a direction of conveyance and spaced apart a distance to receive and support one of the plurality or rail tie plates in a substantially vertical orientation as the rail tie plate is conveyed therebetween by the flipping conveyor; and
a wedge configured and positioned to engage a shoulder side surface of each of the plurality of rail tie plates advanced between and past the first and second vertical guides, wherein engagement of the shoulder side surface of each of the plurality of rail tie plates by the wedge, tips the rail tie plates advancing past the wedge outward and downward pivoting the rail tie plate into a shoulder-side up orientation on the flipping assembly conveyor downstream of the wedge.

14. The rail tie plate flipping assembly as in claim 13 wherein at least one of the first and second vertical guides is laterally adjustable.

15. The rail tie plate flipping assembly as in claim 14 wherein a lateral position of the wedge relative to a space extending between the first vertical guide and the second vertical guide is adjustable.

16. The rail tie plate flipping assembly as in claim 15 further comprising a bridge extending over the flipping conveyor run and the wedge is suspended below the bridge.

17. The rail tie plate flipping assembly as in claim 13 further comprising a chute through which rail tie plates are successively advanced toward the flipping conveyor run.

18. The rail tie plate flipping assembly as in claim 17 wherein an outlet of the chute opens adjacent the first vertical guide and the first vertical guide includes an upper portion sloped upward and outward from the space between the first and second guides such that rail tie plates advanced out of the chute are guided into the space between the first and second vertical guides in a vertical orientation.

19. The rail tie plate flipping assembly of claim 13 further comprising an edge lifting ramp extending longitudinally above the flipping conveyor run between an inlet end thereof and the second vertical guide, the edge lifting ramp having a tie plate support surface sloping upward and curving inward from an approximately horizontal alignment proximate an inlet end to an approximately vertical alignment adjacent and in alignment with the second vertical guide, the edge lifting ramp positioned to support a rail tie plate along a first longitudinal edge with the second longitudinal edge of the rail tie plate supported on the flipping conveyor run when the rail tie plate is advanced onto the flipping assembly conveyor from the feed conveyor.

* * * * *